United States Patent [19]

Kadosumi et al.

[11] Patent Number: 5,652,906
[45] Date of Patent: Jul. 29, 1997

[54] DATA DRIVEN PROCESSOR WITH IMPROVED INITIALIZATION FUNCTIONS BECAUSE OPERATION DATA SHARES ADDRESS SPACE WITH INITIALIZATION DATA

[75] Inventors: Ryuji Kadosumi; Tsuyoshi Muramatsu, both of Tenri, Japan

[73] Assignee: Sharp Kabushiki Kaisha, Osaki, Japan

[21] Appl. No.: 465,333

[22] Filed: Jun. 5, 1995

[30] Foreign Application Priority Data

Jun. 6, 1994 [JP] Japan .................................. 6-123959

[51] Int. Cl.⁶ .................................................. G06F 15/82
[52] U.S. Cl. ........................ 395/800; 395/377; 395/651; 364/232.22
[58] Field of Search ....................... 395/800, 376, 395/377, 651, 652, 566, 500, 650; 364/131, 132, 133, 134

[56] References Cited

U.S. PATENT DOCUMENTS

| | | | |
|---|---|---|---|
| 4,130,885 | 12/1978 | Dennis | 395/427 |
| 4,972,315 | 11/1990 | Yamasaki et al. | 395/375 |
| 5,072,377 | 12/1991 | Asai et al. | 395/421.06 |
| 5,165,036 | 11/1992 | Miyata et al. | 395/800 |
| 5,327,569 | 7/1994 | Shima et al. | 395/800 |
| 5,404,539 | 4/1995 | Onozaki | 395/728 |
| 5,511,215 | 4/1996 | Terasaka et al. | 395/800 |
| 5,577,256 | 11/1996 | Muramatsu et al. | 395/800 |

*Primary Examiner*—Tod R. Swann
*Assistant Examiner*—Keith W. Saunders

[57] ABSTRACT

A data driven type information processor includes a firing control unit, an operation unit, and a program storage unit. Each of these units has a function of initializing itself in response to an initialization data packet in a specific form. The data driven type information processor further includes a static memory connected to the operation unit for storing in the same address space data required for operation and data for generating an initialization data packet for initializing the firing control unit, the operation unit, and the program storage unit; an initialization information read unit responsive to an initialization request for generating an initialization data packet based on the data for generating an initialization data packet read out from the memory and applying the generated data packet to at least one of the firing control unit, the operation unit, and the program storage unit; a merge unit for merging externally applied data packets and data packets generated in the data driven type information processor for applying the merged data packets to the firing control unit; and a branch unit for providing to the merge unit or to the outside of the data driven type information processor the data packets provided from the program storage unit according to destination information included therein.

27 Claims, 29 Drawing Sheets

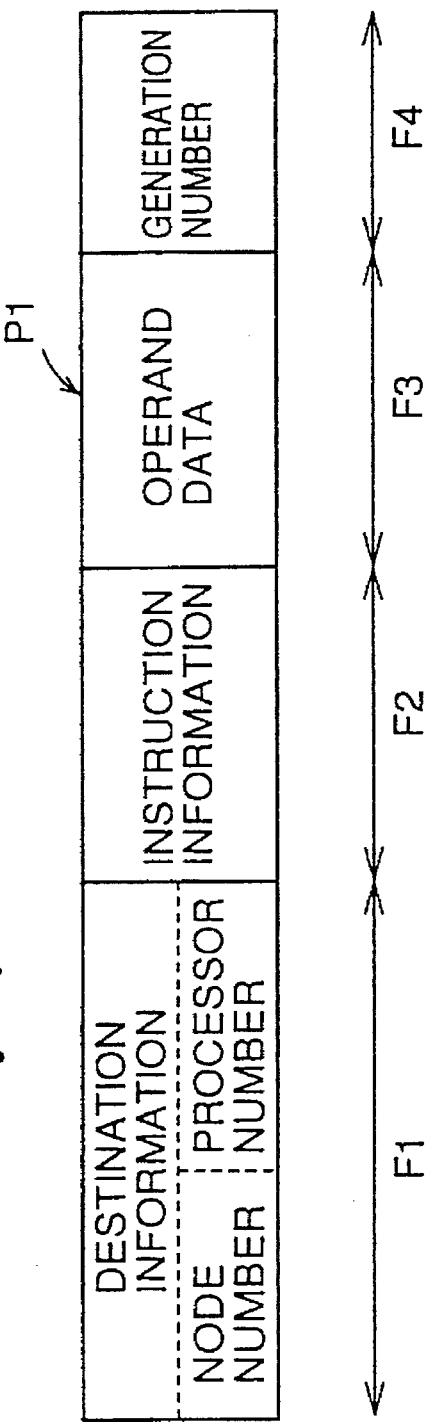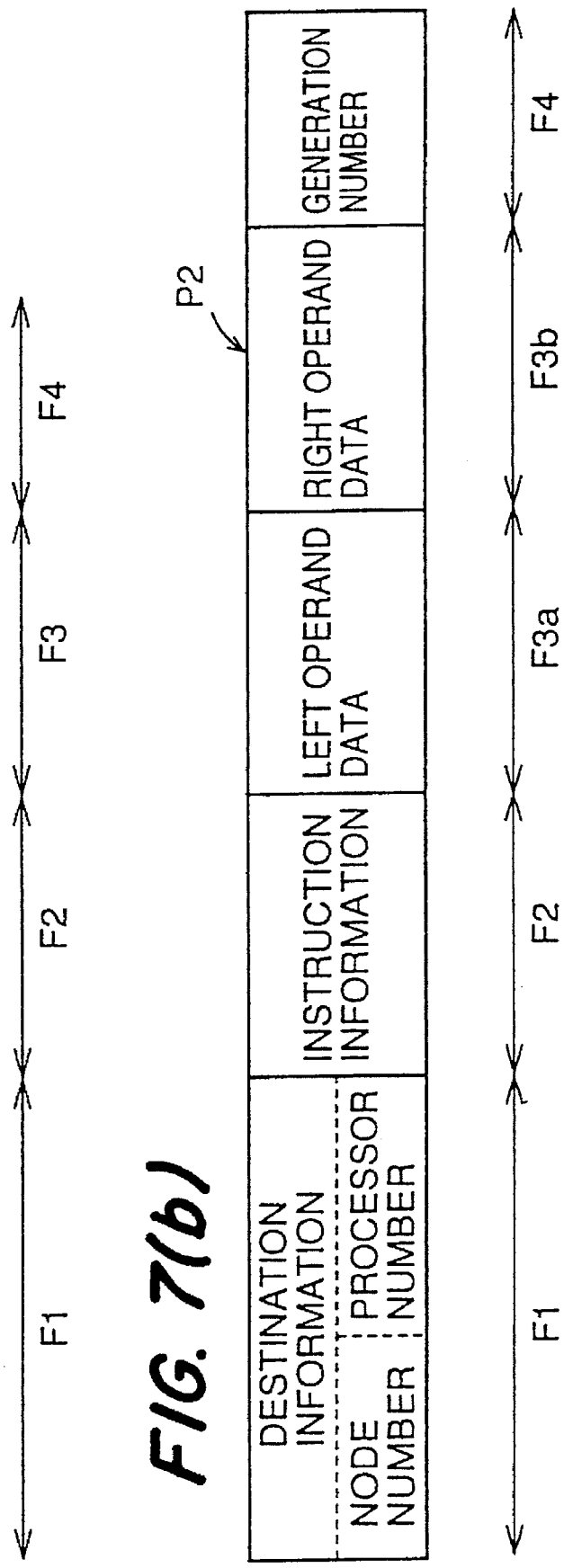
FIG. 7(a)
FIG. 7(b)

DATA DRIVEN PROCESSOR WITH IMPROVED INITIALIZATION FUNCTIONS BECAUSE OPERATION DATA SHARES ADDRESS SPACE WITH INITIALIZATION DATA

BACKGROUND OF THE INVENTION

1. Field of the Invention

The present invention generally relates to data driven type information processors performing processing when all the data required for an action are available, and more particularly, to a data driven type information processor having an improved initialization function.

2. Description of the Related Art

In fields such as image processing and various simulations, there is a need for improvement of performance of an information processor. One system for improving the processing performance of the information processor is parallel processing. The data driven type information processor is of an architecture employing the parallel processing system.

In a conventional yon Neumann type information processor, various instructions are prestored in a memory as programs. By a program counter specifying addresses of the memory sequentially, individual instructions are read out in a sequence to be executed.

On the other hand, a data driven type information processor employing the parallel processing system is one kind of non Neumann type information processors not having a concept of a sequential execution of instructions by the program counter. The data driven type information processor operates according to a simple rule that "when all the data needed for an action are available and hardware resources such as an operation unit required for the action are assigned thereto, the action is carried out." Therefore, the data driven type information processor can perform operations associated with a plurality of instructions simultaneously according to a flow of data, that is, can execute data flow programs in parallel. With the data driven type information processor, parallel processing of programs is considered to substantially shorten a time required for operation.

Note that a state where all the data needed for an action are available is called "firing". To match input data in order to provide data is called "matching control" or "firing control".

Input/output of data to/from the data driven type information processor and transmission of data within the data driven type information processor are carried out in a form of a data packet. A data packet includes operand data, instruction information, destination information, and generation information, for example.

The operand data is data to be processed. The instruction information specifies the processing content. The destination information specifies a destination to which a data packet is to be sent. The generation information identifies the same set of data when firing control is made to a plurality of sets of data.

FIG. 1 is a block configuration diagram of a general data driven type information processor. A data driven type information processor 91 (hereinafter simply referred to as a "processor 91") matches two operand data if required when carrying out processing. Processor 91 includes a junction unit 901, a firing control unit 902 making matching control, an operation unit 905, a data memory 906, a program storage unit 907, and a branch unit 909.

Junction unit 901 merges input paths of data packets from the outside and the inside of processor 91, and sends the applied data packets to firing control unit 903.

When processing specified by instruction information included in a data packet requires two operand data, firing control unit 903 matches operand data included in two different data packets. Firing control unit 903 includes a memory (not shown) for matching the operand data. As soon as two operand data required are provided, firing control unit 903 stores the two operand data in one data packet, and sends the data packet to operation unit 905.

Operation unit 905 performs arithmetic operation, logic operation, or the like based on the instruction information to the operand data. Data memory 906 stores data for operation (hereinafter referred to as "operation information") which the operation unit 905 uses to perform operation. Operation unit 905 reads out operation information from data memory 906, or writes data in data memory 906 as required. Operation unit 905 stores the operation result in a data packet as operand data, and sends the data packet to program storage unit 907.

Program storage unit 907 prestores a plurality of data flow programs. In this specification, a data flow program refers to an instruction for specifying processing carried out at one node and information associated therewith, when the entire processing is represented in a data flow graph. Program storage unit 907 provides a corresponding data flow program based on destination information included in the data packet. The data flow program includes the next instruction information and the next destination information. Program storage unit 907 stores the read instruction information and destination information as the next instruction information and the next destination information in a data packet, and sends the data packet to branch unit 909.

Branch unit 909 branches an output path of the data packets into a path to the outside of processor 91 or to the inside of processor 91. More specifically, based on destination information of the data packet, branch unit 909 determines whether the data packet should be sent to the outside of processor 91 or to junction unit 901 in processor 91.

An initialization unit 911, an initialization information memory 912, and a reset signal input unit 913 are provided external to processor 91 as peripheral devices. Initialization unit 911 generates a data packet for initializing (hereinafter referred to as an "initialization data packet") processor 91 based on initialization information read out from initialization information memory 912, and applies the data packet to processor 91. Reset signal input unit 913 includes a switch such as a push button. Reset signal input unit 913 is connected to junction unit 901, firing control unit 903, operation unit 905, program storage unit 907, and branch unit 909 within processor 91 through a signal line 915.

Immediately after power-on, processor 91 carries out initialization processor for entering a state where processor 91 itself operates properly. When changing the processing content of processor 91, the user forces processor 91 to carry out initialization processing in order to download another data flow program in program storage unit 907 for example. Description will now be given of initialization of the data driven type information processor.

FIGS. 2 (a) and 2 (b) are schematic diagrams showing transition of states of the data driven type information processor. In the following description, the state of each unit included in the data driven type information processor falls into four states of (1) Unknown (an indefinite state immediately after power-on), (2) Cold (a state where reset processing (Reset) is carried out in the Unknown state), (3) Warm (a state where initialization processing (Initialize) is performed in the Cold state), and (4) Hot (a state where a data packet is applied in the Warm state, and processing is being executed (Execute)).

Reset clears data stored in a register, an internal memory, or the like included in each unit. If there is a program being executed, the program is stopped. If reset processing is performed in any state of Unknown, Warm, or Hot, the state transitions to the Cold state. Initialization means to set data in a register, an internal memory, or the like, and to bring each unit to a state where normal processing is carried out upon application of a data packet. When each unit is in the Unknown state or the Cold state, proper processing is not carried out generally, although a data packet can be input to the data driven type information processor.

Firing control unit 903, operation unit 905, and program storage unit 907 of processor 91 shown in FIG. 1 transition among four states of Unknown, Cold, Warm, and Hot, as shown in FIG. 2 (a). On the other hand, for junction unit 901 and branch unit 909, the Cold state and the Warm state are not separate. As shown in FIG. 2 (b), junction unit 901 and branch unit 909 transitions among three states of Unknown, Cold/Warm, and Hot. Junction unit 901 and branch unit 909 do not have to prestore data needed for the operations in internal memories. Therefore, it is not necessary to perform initialization processing to these units. If reset processing is carried out, these units operate properly in response to application of a data packet.

When processor 91 is to be initialized, an initialization data packet is applied to processor 91 with initialization unit 911 external to processor 91. When initialization processing is carried out to the entire processor 91, that is, to firing control unit 903, operation unit 905, and program storage unit 907, it is necessary to reset internal circuitry of processor 91 before application of an initialization data packet, and to bring each unit in any state of Unknown, Cold, Warm, Cold/Warm or Hot to the Cold state. This is because the remaining program or data in processor 91 might cause processor 91 to abnormally stop or run out of control. It should be noted that junction unit 901 and branch unit 909 do not have to be initialized, as described before.

The operator applies a reset signal to processor 91 with reset signal input unit 913 to reset each unit. The reset signal is applied to each unit through signal line 915. Each unit resets itself in response to the reset signal, and enters the Cold state or the Cold/Warm state. After sufficient time for the entire processor 91 to enter the Cold state or the Cold/Warm state, the operator starts initialization unit 911, applies an initialization data packet to processor 91, and causes initialization unit 911 to perform initialization processing.

The initialization data packet applied to processor 91 is sent to firing control unit 903, operation unit 905, and program storage unit 907 in this order via junction unit 901. If there is no instruction information in the sent initialization data packet which is to initialize themselves, firing control unit 903, operation unit 905, and program storage unit 907 send the initialization data packet to the next unit. If there is instruction information in the received initialization data packet which is to initialize themselves, firing control unit 903, operation unit 905, and program storage unit 907 initialize themselves according to the instruction information. Each of firing control unit 903, operation unit 905, and program storage unit 907 discards the initialization data packet after initialization processing is complete.

Accordingly, when the initialization data packet applied to processor 91 arrives at a corresponding functional unit, the unit is initialized.

On the other hand, if initialization is performed to change only part of processor 91, for example, part of the data flow programs of program storage unit 907, reset processing is not required. The operator causes initialization unit 911 to generate an initialization data packet for initializing part of processor 91, and applies the initialization data packet to processor 91. When the applied initialization data packet arrives at a corresponding functional unit, for example, program storage unit 907, the functional unit is initialized.

Note that, when the data driven type information processor is initialized, a peripheral device for generating an initialization data packet must be provided as an initialization unit, as shown in the above described configuration example of processor 91. This is because the data driven type information processor accepts only a data packet as input. The initialization unit is generally configured of an information processor such as a computer system. Therefore, using the initialization unit as a peripheral device complicates the configuration of a system, a device, or the like in which the data driven type information processor is incorporated.

As a means for eliminating such a disadvantage, the following device may be contemplated.

FIG. 3 is a block configuration diagram of a data driven type information processor in which an initialization unit is incorporated. Units having the same functions as those of FIG. 1 have the same reference characters and the same names. Therefore, the detailed description thereof will not be repeated here as far as not required.

A processor 92 includes an initialization unit 921 and an initialization information memory 923 in addition to junction unit 901, firing control unit 903, operation unit 905, data memory 906, program storage unit 907, and branch unit 909. Reset signal input unit 913, a start address input unit 925, and an address number input unit 927 are provided external to processor 92.

Reset signal input unit 913 is connected to junction unit 901, firing control unit 903, operation unit 905, program storage unit 907, and branch unit 909 through a signal line 929 and a signal line 930. Start address input unit 925 is connected to initialization unit 921 through a signal line 933. Address number input unit 927 is connected to initialization unit 921 through a signal line 935. Initialization unit 921 is connected to initialization information memory 923 through a signal line 939 and a signal line 937.

Signal line 937 transmits an access signal and a read address for reading out initialization information from initialization unit 921 to initialization information memory 923. Signal line 939 transmits read initialization information from initialization information memory 923 to initialization unit 921.

An initialization data packet provided from initialization unit 921 is applied to junction unit 901 through signal lines 941.

FIG. 4 is a block configuration diagram of initialization unit 921. Initialization unit 921 includes a control unit 951, a counter unit 953, a comparison unit 955, and a data packet generation unit 957. A signal line 963 and a signal line 965 is branched from signal line 929 transmitting a reset signal. A signal line 929 is connected to control unit 951. Signal line 963 is connected to data packet generation unit 957. Signal line 965 is connected to counter unit 953 and comparison unit 955.

Control unit 951 generates a clock signal for generating an initialization data packet in response to a reset signal applied through signal line 929. The clock signal is applied to counter unit 953 through signal line 967. Counter unit 953 counts the number of pulses of the clock signal. First, counter unit 953 resets the count value to "0" in response to the reset signal. Then, counter unit 953 counts up the count value in response to the clock signal one by one, sends the count value to data packet generation unit 957 and comparison unit 955 through signal line 969 and signal line 971.

Data packet generation unit 957 adds a start address received from start address input unit 925 (cf. FIG. 3) through signal line 933 and a count value received from counter unit 953 through signal line 969, and generates a read address for reading out initialization information of initialization information memory 923. Data packet generation unit 957 sends the access signal and the read address to initialization information memory 923 through a signal line 939. The read initialization information is sent to data packet generation unit 957 from initialization information memory 923 through a signal line 937.

Data packet generation unit 957 generates an initialization data packet based on the read initialization information. The generated initialization data packet is sent to junction unit 901 through signal lines 941. The generation of an initialization data packet is continued as far as a clock signal is provided from control unit 951.

On the other hand, comparison unit 955 compares the count value sent from counter unit 953 with the address number sent from address number input unit 927 through signal line 935. When the count value is equal to the address number, comparison unit 955 sends a signal indicating that the count value is equal to the address number to control unit 951 through a signal line 973.

Control unit 951 stops generation of a clock signal in response to the signal sent from comparison unit 955. As a result, generation of an initialization data packet is complete.

In initializing processor 92, the operator sets a read start address and a read address number of initialization information with start address input unit 925 and address number input unit 927, and applies a reset signal to processor 92 with reset signal input unit 913 for a prescribed time.

In response to the reset signal, processor 92 is brought to the Cold state. After a prescribed time, initialization unit 921 starts the above described generation of an initialization data packet in response to the reset signal switching from an ON state to an OFF state (termination of the reset signal). Initialization of processor 92 is thus triggered by end of the reset signal.

Such a processor as described above is more advantageous than a conventional processor in that the former does not require a separate information processor. However, this processor has a following problem to be solved.

More specifically, processor 92 incorporates initialization unit 921 and initialization information memory 923 therein. Therefore, the configuration of the processor becomes complicated, and the size of the processor is larger. Since initialization unit 921 starts by being triggered by termination of the reset signal, the operator must input the reset signal to processor 92 when initializing the processor. Even if it is desired to initialize processor 92 without stopping the operation as is the case where part of the data flow programs stored in program storage unit 907 is changed, processor 92 is brought to the Cold state and stopped in response to input of the reset signal.

SUMMARY OF THE INVENTION

One object of the present invention is to provide a data driven type information processor capable of performing initialization processing easily, which can be implemented in a simple configuration and in a small circuit size.

Another object of the present invention is to provide a data driven type information processor capable of performing initialization processing easily even during execution of a program, which can be implemented in a simple configuration and in a small circuit size.

Still another object of the present invention is to provide a data driven type information processor capable of performing reset processing and initialization processing easily even during execution of a program, which can be implemented in a simple configuration and in a small circuit size.

In one aspect of the present invention, the data driven type information processor includes a firing control unit connected to receive data packets for matching information included in data packets required for operation, for detecting operation for which necessary information is available, and for providing a data packet including information required for execution of the operation; an operation unit connected to receive data packets from the firing control unit for performing operation according to information included in the data packet for storing the operation result in a data packet, and outputting the same; and a program storage unit storing data flow programs for applying to the firing control unit data packets each of which stores one piece of information required for operation according to the data flow program based on information included in the data packet provided from the operation unit. Each of the firing control unit, the operation unit, and the program storage unit has a function of initializing itself in response to an initialization data packet in a specific form. The data driven type information processor further includes a static memory connected to the operation unit for storing in the same address space data required for operation and data for generating an initialization data packet for initializing the firing control unit, the operation unit, and the program storage unit; an initialization information read unit responsive to an initialization request for generating an initialization data packet based on the data for generating an initialization data packet read out from the memory, and for applying the generated data packet to at least one of the firing control unit, the operation unit, and the program storage unit; a merge unit merging externally applied data packets and data packets generated in the data driven type information processor and directed to the data driven type information processor per se for applying the data packets to the firing control unit; and a branch unit for providing to the merge unit or the outside of the data driven type information processor the data packets provided from the program storage unit according to destination information included therein.

Since the data for initialization is stored in an internal memory, a separate device for generating the data packet for initialization is not required. Further, since the data for initialization is stored in the same address space of the memory as the data required for operation, an additional memory is not required.

By sharing a mechanism for accessing the memory between access from the operation unit and access from the initialization information read unit, increase in the amount of hardware can be further prevented.

The initialization request may be represented by termination of a reset signal, and alternatively/additionally, it may be represented in a form of a prescribed initialization request data packet. Representation of the initialization request in a form of a data packet allows initialization of the data driven type information processor during execution of a program.

In another aspect of the present invention, the initialization information read unit includes an initialization information read request generation unit for generating read data packets each of which contains information requesting to read out data for generating an initialization data packet from the memory in response to an initialization request; and a request detection unit provided between an output of the firing control unit and an input of the operation unit for merging data packets from the firing control unit and read data packets from the initialization information read request generation unit to apply the merged packets to the operation unit, and for applying, when detecting prescribed specific initialization request information being included in the applied data packet, an initialization request to the initialization information read request generation unit. The operation unit reads out initialization data from the memory when a read data packet is applied, according to information contained in the read data packet, and otherwise, carries out processing designated by the data packet, to provide respective results in a form of a data packet. The initialization information read unit further includes a data packet generation unit connected to the operation unit so as to receive data packets generated based on the read data packets provided from the operation unit for generating an initialization data packet based on the read data. The branch unit operates to receive also the data packets provided from the data packet generation unit to provide the received packets to a first merge unit.

The request detection unit may include an initialization request detection unit responsive to an initialization request data packet for applying an initialization request to the initialization information read request generation unit and directly providing other data packets. The request detection unit may further include a reset request detection unit responsive to a reset initialization request data packet for generating an internal reset signal to each unit in the data driven type information processor and to peripheral devices, and then generating an initialization request data packet after a prescribed time, and for directly providing other data packets.

Provision of the request detection unit allows automatic reset and initialization of the processor and peripheral devices upon application of the reset initialization request data packet and the initialization request data packet. Further, the processor can be initialized even during execution of a program.

Reading of data for the initialization data packet may be complete by externally applying a read address number and detecting data of the read address number having been read out. Alternatively, reading of data for the initialization data packet may be complete by preparing an end flag at the last of initialization data and detecting the end flag having a value indicating an end.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7 (a) and 7 (b), hereinafter collectively referred to as FIG. 7, are diagrams showing field configuration of a data packet.

DESCRIPTION OF THE PREFERRED EMBODIMENTS

Figure 1:
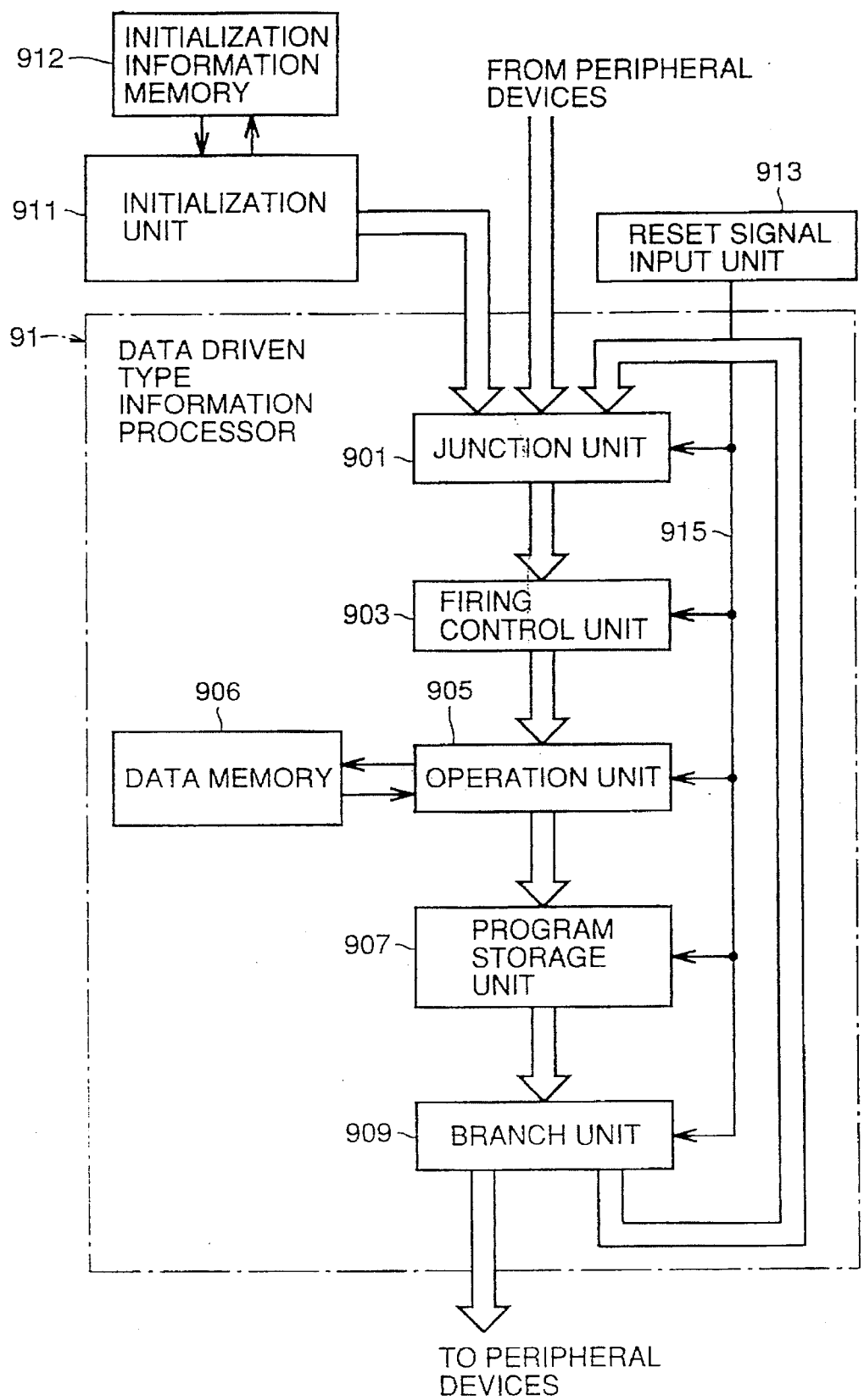
FIG. 1 is a block configuration diagram of a conventional general data driven type information processor.

Embodiments of the data driven type information processor of the present invention will be described hereinafter with reference to the drawings. In each of the following first to fifth embodiments, components having similar functions are labeled with the same reference characters.

[First Embodiment]

Figure 5:
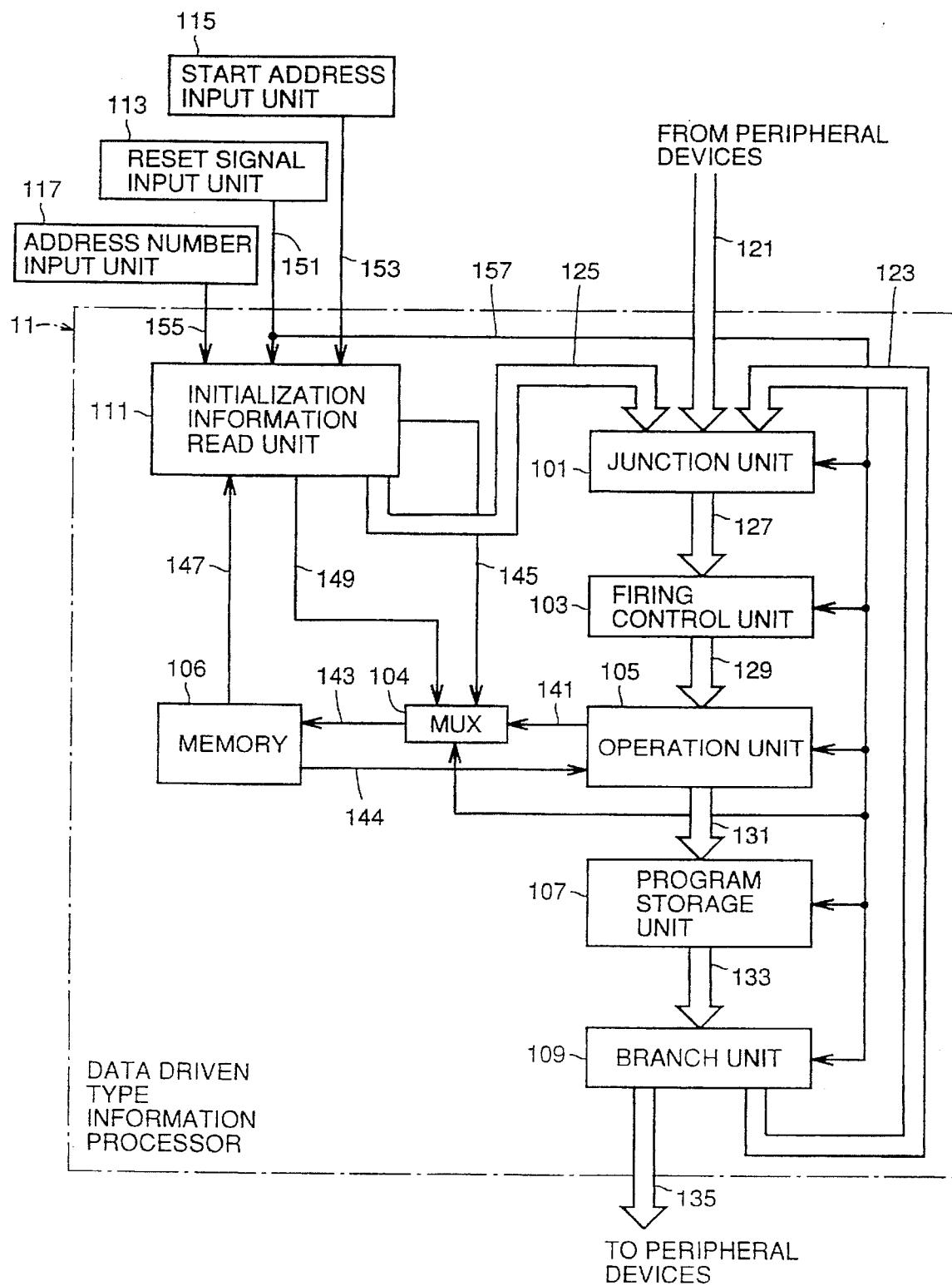
FIG. 5 is a block configuration diagram of a data driven type information processor according to a first embodiment of the present invention.

FIG. 5 is a block configuration diagram of the data driven type information processor according to the first embodiment of the present invention. A data driven type information processor 11 is simply referred to as a "processor 11" in the following description.

Referring to FIG. 5, processor 11 includes a junction unit 101, a firing control unit 103, a multiplexer (MUX) 104, an operation unit 105, a memory 106, a program storage unit 107, a branch unit 109, and an initialization information read unit 111. A reset signal input unit 113, a start address input unit 115, and an address number input unit 117 are provided external to processor 11.

Referring to FIG. 5, junction unit 101 is for merging a plurality of input paths of data packets from the outside and the inside of processor 11. Junction unit 101 receives data packets sent from peripheral devices such as other data driven type information processors or other information processors external to processor 11 through signal lines 121. Junction unit 101 receives data packets sent from branch unit 109 through signal lines 123. Further, junction unit 101 receives data packets for initializing processor 11 (each hereinafter referred as an "initialization data packet") sent from initialization information read unit 111 through signal lines 125. The data packets applied to junction unit 101 are sent to firing control unit 103 through signal lines 127.

Firing control unit 103 shown in FIG. 5 is for matching operand data included in two different data packets when processing specified by instruction information included in data packets require two operand data. Firing control unit 103 has a memory (not shown in FIG. 5) for matching operand data. As soon as two operand data to be provided are available, firing control unit 103 stores the two operand data in one data packet, and sends the data packet to operation unit 105 through signal lines 129.

Operation unit 105 shown in FIG. 5 is for performing operation such as arithmetic operation or logic operation based on instruction information to operand data. Operation unit 105 stores the operation result in a data packet as operand data, and sends the data packet to program storage unit 107 through signal lines 131.

Program storage unit 107 shown in FIG. 5 is for prestoring data flow programs, and for providing a corresponding data flow program according to destination information of the applied data packet. Program storage unit 107 is formed of a volatile memory. The data flow program provided from program storage unit 107 includes instruction information and destination information. Program storage unit 107 stores read instruction information and destination information as the next instruction information and the next destination information, respectively, in a data packet, and sends the data packet to branch unit 109 through signal lines 133.

Branch unit 109 shown in FIG. 5 branches an output path of data packets into a path to the outside of processor 11 or to the inside of processor 11. Branch unit 109 sends data packets either to the outside of processor 11 through signal lines 135 or to junction unit 101 through signal lines 123 based on destination information of the data packets.

Memory 106 stores data for operation (hereinafter referred to as "operation information") which operation unit 105 uses to perform operation, and initialization information used by initialization information read unit 111 to generate an initialization data packet. Multiplexer (MUX) 104 is provided in access paths of operation unit 105 and initialization information read unit 111 to memory 106. An access signal and a read address are sent from operation unit 105 to multiplexer 104 through a signal line 141. An access signal and a read address are sent from initialization information read unit 111 to multiplexer 104 through a signal line 145. Further, a read control signal is sent from initialization information read unit 111 to multiplexer 104 through a signal line 149.

When a read control signal is not applied to multiplexer 104, multiplexer 104 sends the access signal and the read address sent from operation unit 105 to memory 106 through a signal line 143. When a read control signal is applied to multiplexer 104, multiplexer 104 sends the read address sent from initialization information read unit 111 to memory 106 through signal line 143. Read data is sent from memory 106 to operation unit 105 and initialization information read unit 111 through a signal line 144 and a signal line 147, respectively. Accordingly, when processor 11 carries out normal operation, operation information is read out from memory 106 by operation unit 105, and when processor 11 carries out initialization processing, initialization information is read out from memory 106 by initialization information read unit 111.

Reset signal input unit 113 shown in FIG. 5 is a means for applying a reset signal to processor 11. Reset signal input unit 113 includes a switch such as a push button. A reset signal generated from reset signal input unit 113 is applied to initialization information read unit 111 through a signal line 151. Further, the reset signal is sent to junction unit 101, firing control unit 103, multiplexer 104, operation unit 105, program storage unit 107, and branch unit 109 through a signal line 157 branching from signal line 151. In response to the reset signal sent to each unit, each unit resets itself. Firing control unit 103, operation unit 105, and program storage unit 107 are brought to the Cold state (cf. FIG. 2) by resetting themselves. The other units enter the Cold/Warm state (cf. FIG. 2) by resetting themselves.

When the operator of processor 11 initializes processor 11, start address input unit 115 and address number input unit 117 specify a start address of reading of initialization information and the number of addresses to be read out. Start address input unit 115 and address number input unit 117 include, for example, a slide switch or a switch including a plurality of keys. A signal indicating the start address is sent from start address input unit 115 to initialization information read unit 111 through a signal line 153. Further, a signal indicating the number of addresses is sent from address number input unit 117 to initialization information read unit 111 through a signal line 155. Initialization information read unit 111 reads out initialization information from memory 106 based on the sent start address and number of addresses, and generates a prescribed initialization data packet.

Figure 6:
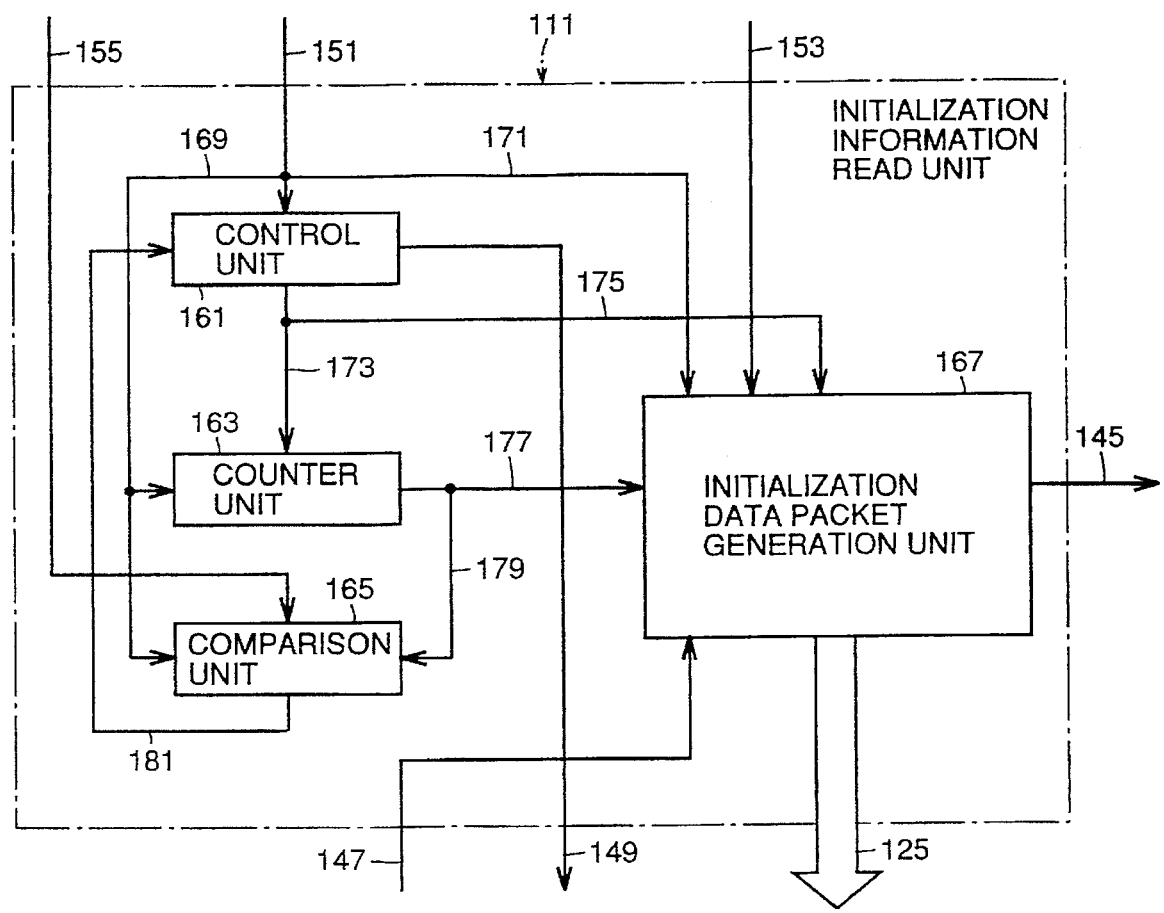
FIG. 6 is a block configuration diagram of an initialization information read unit.

Referring to FIG. 6, initialization information read unit 111 includes a control unit 161, a counter unit 163, a comparison unit 165, and an initialization data packet generation unit 167.

Control unit 161 resets itself in response to a reset signal sent through signal line 151. Then, control unit 161 starts operation for generating a clock signal for generating an initialization data packet (hereinafter referred to as an "initialization clock signal") in response to the reset signal changing from the ON state to the OFF state (termination of the reset signal).

The initialization clock signal generated by control unit 161 is sent to counter unit 163 through a signal line 173. Further, the initialization clock signal is sent to initialization data packet generation unit 167 through a signal line 175. Further, control unit 161 starts to provide a control signal to multiplexer 104 (cf. FIG. 5) through signal line 149 in response to termination of the reset signal.

Referring to FIG. 6, counter unit 163 is a means for generating a count value used to generate a read address of initialization information. Counter unit 163 resets itself in response to a reset signal sent through a signal line 169, and resets the count value to "0". Then, counter unit 163 counts up the count value one by one in response to an initialization clock signal sent through signal line 173. Whenever counter unit 163 counts up, counter unit 163 sends the count value to initialization data packet generation unit 167 through a signal line 177, and to comparison unit 165 through a signal line 179.

Referring to FIG. 6, a reset signal is applied to initialization data packet generation unit 167 through a signal line 171 branching from signal line 151. Initialization data packet generation unit 167 resets itself in response to the applied reset signal. Then, initialization data packet generation unit 167 operates in response to an initialization clock signal sent from control unit 161 through signal line 175. Initialization data packet generation unit 167 adds the start address sent through signal line 153 and the count value sent through signal line 177, and generates a read address for reading out initialization information from memory 106. Initialization data packet generation unit 167 sends the generated read address together with an access signal to multiplexer 104 (cf. FIG. 5) through a signal line 145.

Referring to FIG. 5, multiplexer 104 is supplied with a control signal from control unit 161. Therefore, multiplexer 104 applies the access signal and the read address from initialization data packet generation unit 167 to memory 106, and initialization information is read out from memory 106. The read initialization information is sent to initialization data packet generation unit 167 through signal line 147.

Referring to FIG. 6, initialization data packet generation unit 167 generates an initialization data packet based on the applied initialization information. Initialization data packet generation unit 167 sends the generated initialization data packet to junction unit 101 through signal lines 125. Initialization data packet generation unit 167 continues generating an initialization data packet as far as an initialization clock signal is provided from control unit 161.

Referring to FIG. 6, a reset signal is applied to comparison unit 165 through signal line 169 branching from signal line 151. Comparison unit 165 sets a comparison value to be compared with a count value to the value sent from address number input unit 117 (cf. FIG. 5) in response to the reset signal. Comparison unit 165 compares the count value sent from counter unit 163 with the address number sent through signal line 155. When the count value is equal to the address number, comparison unit 165 sends a signal for stopping generation of an initialization clock signal to control unit 161 through a signal line 181. In response to the signal, control unit 161 stops generation of an initialization clock signal.

FIG. 7 is a diagram showing a field configuration of a data packet used for input/output of data to/from processor 11 and transmission of data within processor 11. Referring to FIG. 7, in this embodiment, two kinds of forms of data packets of a data packet P1 shown at (a) and a data packet P2 shown at shown at (b) are used. Data packet P2 is a data packet form firing control unit 103 provides. When two operand data to be provided are available, data packet P2 stores the two operand data, and is sent to operation unit 105 from firing control unit 103.

When operation not requiring matching is performed, data packet P2 storing only one operand data is provided. Other data packets, for example, data packets externally applied to processor 11, data packets provided externally from processor 11, initialization data packets provided from initialization information read unit 111, data packets sent from junction unit 101 to firing control unit 103, data packets sent from operation unit 105 to program storage unit 107, data packets sent from program storage unit 107 to branch unit 109, data packets sent from branch unit 109 to junction unit 101, and the like are all in a form of data packet P1 shown in FIG. 7 (a).

Referring to FIG. 7 (a), data packet P1 includes a destination field F1, an instruction field F2, a data field F3, and a generation field F4. Destination information is stored in destination field F1. Instruction information is stored in instruction field F2. One operand data is stored in data field F3. A generation number is stored in generation field F4.

The destination information stored in destination field F1 includes a node number and a processor number. The node number corresponds to an identification number of an instruction included in the data flow program executed in processor 11. When data packet P1 is applied to a multiprocessor system including a plurality of data driven type information processors, the processor number specifies to which data driven type information processor data packet P1 should be supplied.

Referring to FIG. 7 shown at (b), data packet P2 includes destination field F1, instruction field F2, and generation field F4, similar to data packet P1. Data packet P2 further includes two data fields F3a and F3b. One operand data is stored in each of data fields F3a and F3b. The operand data stored in data field F3a is called left operand data. The operand data stored in data field F3b is called right operand data.

Figure 8:
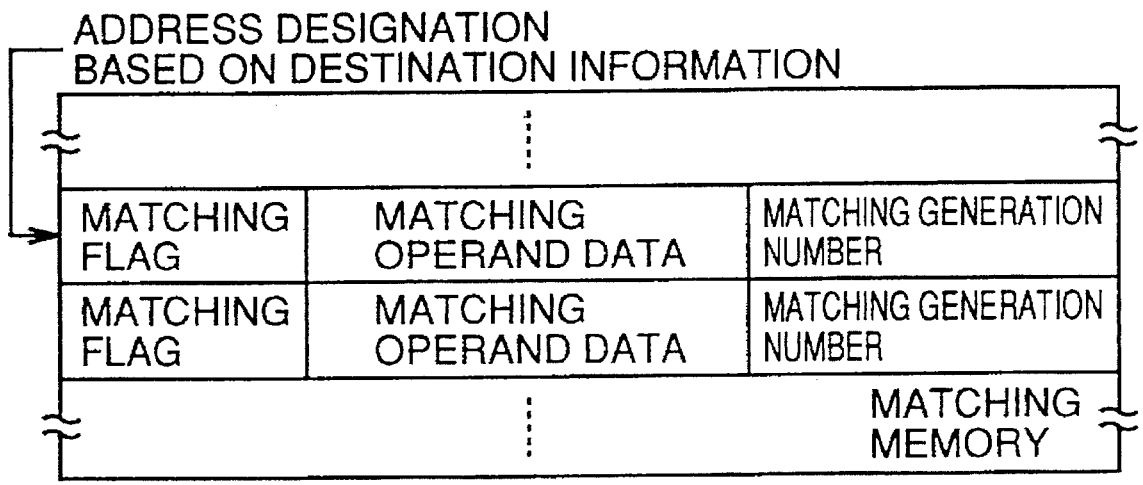
FIG. 8 is a diagram showing a field configuration of a storage area of a firing control unit.

FIG. 8 is a diagram showing a field configuration of a matching memory included in firing control unit 103. The matching memory is a memory for matching operand data. Referring to FIG. 8, the matching memory includes a plurality of areas each of which stores a matching flag, a matching operand data, and a matching generation number in each address. The matching operand data is operand data firing control unit 103 temporarily stores in the matching memory when operand data included in a data packet sent to firing control unit 103 matches operand data of other data packets. The matching generation number is a generation number of the matching operand data.

The matching flag is a flag for indicating whether the matching operand data and the matching generation number are stored in a corresponding address. When the matching operand data and the matching generation number are not stored in the corresponding address, the matching flag is reset to "0". When the matching operand data and the matching generation number are stored in the corresponding address, the matching flag is set to "1".

When instruction information included in a data packet is a two-input instruction, firing control unit 103 shown in FIG. 5 determines an address of the matching memory to be accessed based on destination information included in the sent data packet. Firing control unit 103 reads out the matching flag of the determined address.

If the matching flag is set to "1", firing control unit 103 determines that operand data of the applied data packet corresponds to operand data of a data packet previously applied to firing control unit 103, and reads out matching operand data of the address. Firing control unit 103 adds the read matching operand data to the applied data packet, and sends the resultant data packet to operation unit 105.

On the other hand, if the matching flag is "0", firing control unit 103 determines that there is no operand data corresponding to operand data of the applied data packet in the matching memory. In this case, firing control unit 103 stores the operand data and the generation number of the applied data packet in an address determined based on destination information as matching operand data and a matching generation number, and sets the matching flag of the address to "1".

Figure 9:
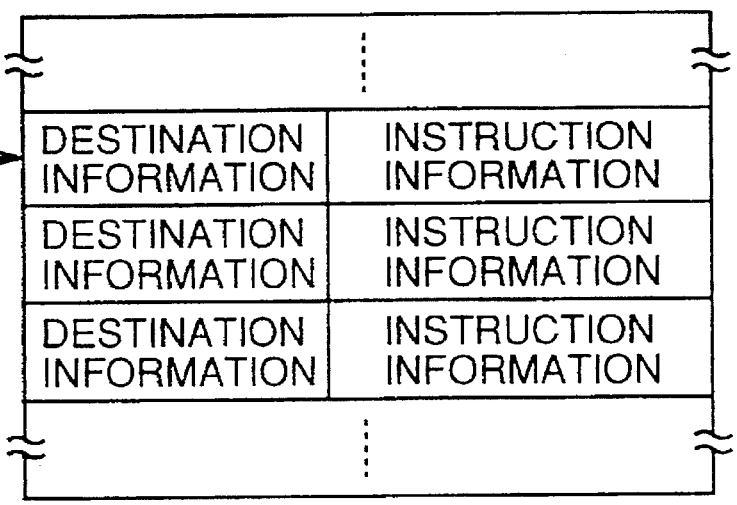
FIG. 9 is a diagram showing a field configuration of a storage area of a program storage unit.

FIG. 9 is a diagram showing a field configuration of a storage area of program storage unit 107. Data flow programs each formed of destination information and instruction information are prestored in the storage areas of program storage unit 107. Program storage unit 107 determines an address in the storage areas to be referred to based on the destination information of the sent data packet. Program storage unit 107 reads out destination information and instruction information of the determined address, and stores the same in a data packet as the next destination information and the next instruction information.

As a program storage unit in a data driven type information processor, an incorporated memory or an externally provided memory can be used. When the externally provided memory is used, there is a disadvantage of a slower access rate than the case of the incorporated memory. Further, when a plurality of data driven type information processors are included in one chip, a plurality of connection terminals must be provided on the chip for connecting respective data driven type information processors and the externally provided memory. Because of such disadvantages, the incorporated memory is generally used as a program storage unit in a data driven type information processor.

Memories are classified into two kinds of memories: a reloadable memory and a read only memory. When an incorporated read only memory is used, the content of data stored in the program storage unit cannot be changed. Therefore, a memory is required having a storage capacity capable of prestoring all data corresponding to functions carried out in the data driven type information processor. In this case, the larger storage capacity of the memory increases the assembly cost of the data driven type information processor. In view of the above, an incorporated reloadable memory is used as program storage unit 107 in this embodiment.

Figure 10A:
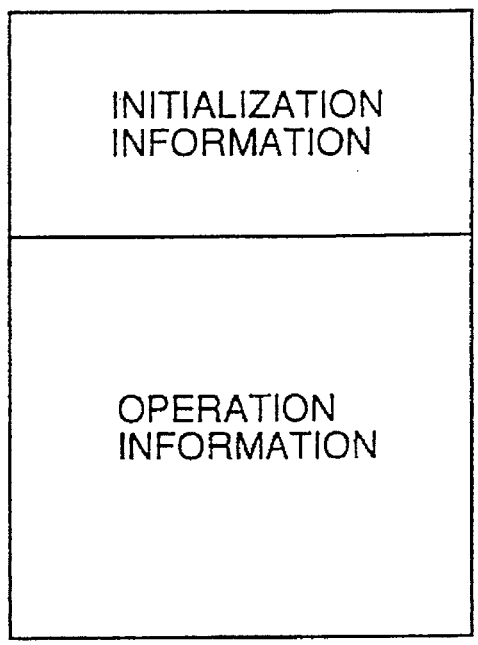
FIGS. 10 (a) and 10 (b), hereinafter collectively referred to as FIG. 10, are schematic diagrams showing state of initialization information and operation information stored in a memory.
Figure 10B:
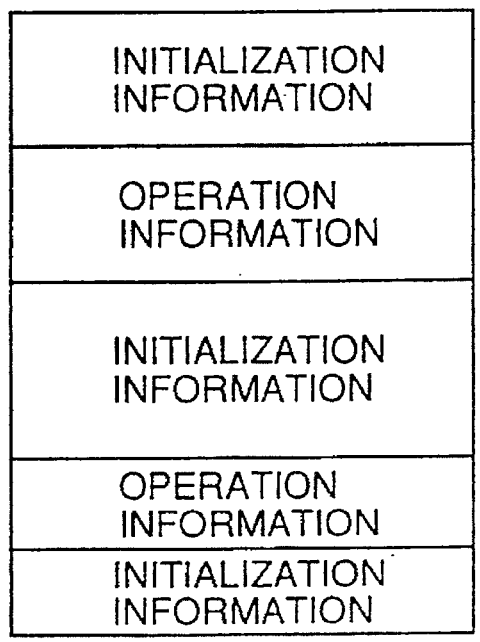

FIG. 10 is a diagram showing a field configuration of memory 106. In this embodiment, operation information which the operation unit 105 shown in FIG. 5 uses for operation and initialization information which the initialization information read unit 111 uses for generating an initialization data packet are stored in one memory 106. The operation information and the initialization information may be stored in two areas obtained by dividing the storage area into an area for the operation information and an area for the initialization information, as shown in FIG. 10 (a), or may be stored in the storage area in a mixed manner as shown in FIG. 10 shown at (b).

Figure 11:
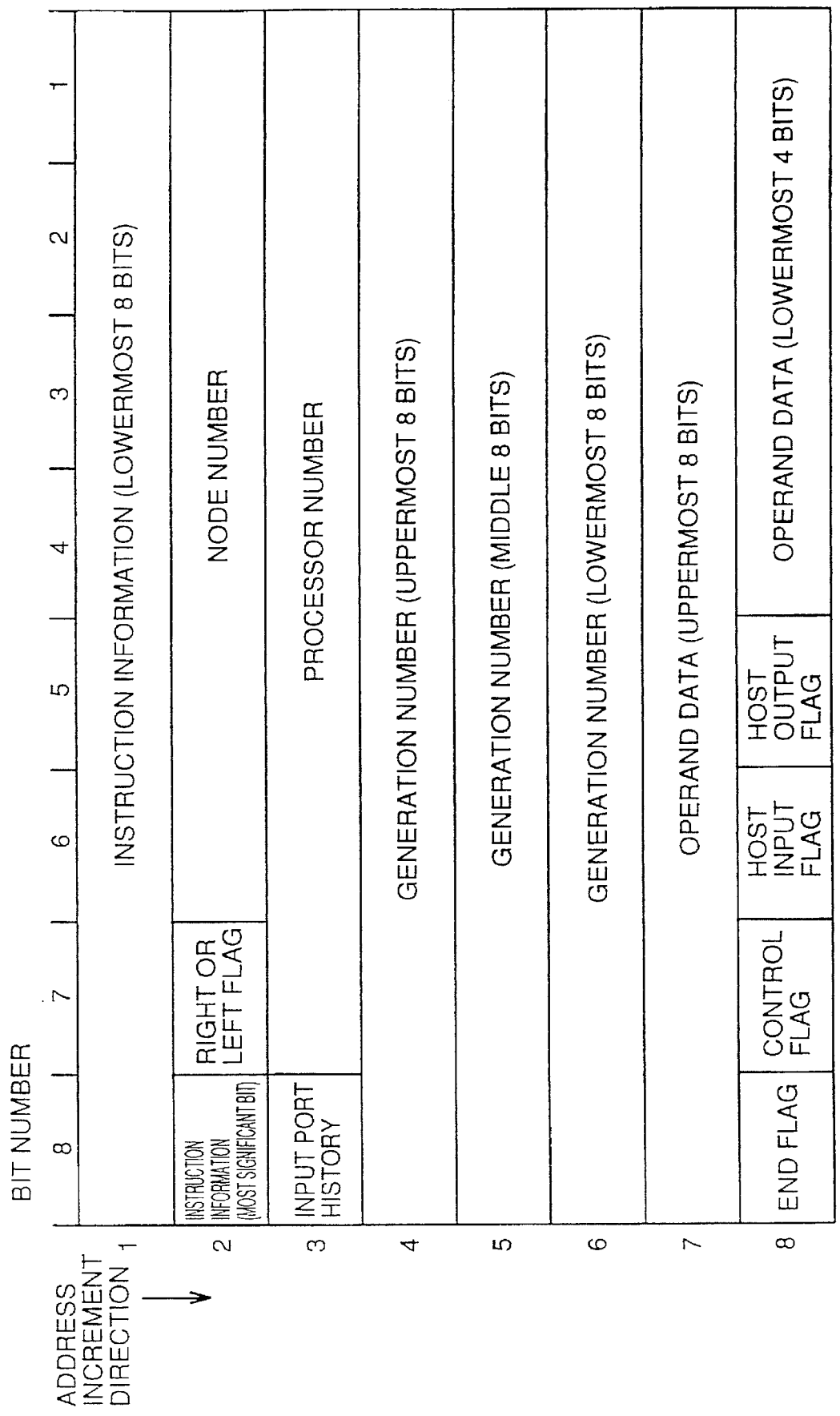
FIG. 11 is a diagram showing a state of initialization information used for generating one initialization data packet stored.

FIG. 11 is a diagram showing a state of initialization information used for generating one initialization data packet stored in memory 106 (cf. FIG. 5). Referring to FIG. 11, one initialization data packet is generated using eight words of initialization information. One word includes eight bits. In the figure, the downward direction indicates the address increment direction, and the leftward direction indicates the bit increment direction. For simplicity of description, the addresses and the bits are numbered 1–8.

Referring to FIG. 11, the initialization information includes instruction information, a right or left flag, a node number, an input port history, a processor number, a generation number, operand data, an end flag, a control flag, a host input flag, and a host output flag. The instruction information, the node number, the processor number, the generation number, and the operand data correspond to data of the same names included in data packet P1 shown in FIG. 7 (a), respectively.

Referring to FIG. 11, the instruction information is configured of nine bits, among which the lowermost eight bits are stored in the first address and the most significant bit is stored in the eighth bit of the second address. The seventh bit of the second address is the right or left flag. The right or left flag is the flag for selectively using left operand data and right operand data when operation is carried out to data packet P2 shown in FIG. 7 shown at (b). Consider the case where the instruction information is a subtraction instruction for example. When "0" is set to the right or left flag, the value of the left operand data is subtracted from the value of the right operand data. Conversely, when "1" is set to the right or left flag, the value of the right operand data is subtracted from the value of the left operand data. The first to sixth bits of the second address are the node number.

The eighth bit in the third address is the input port history. The input port history specifies the input port from which a data packet is sent. The first to seventh bits of the third address are the processor number. The uppermost eight bits, the middle eight bits, and the lowermost eight bits of the generation number are stored in the fourth to sixth addresses, respectively. Operand data is configured of 12 bits, among which the uppermost eight bits are stored in the seventh address, and the lowermost four bits are stored in the first to fourth bits of the eighth address.

The fifth bit of the eighth address is the host output flag. The host output flag is a flag for determining, when processor 11 is incorporated in a certain system for example, whether or not a data packet is to be provided to a host processor in the system. When the host output flag is set to "0", the data packet is provided to other than the host processor. When the host output flag is set to "1", the data packet is provided to the host processor.

The sixth bit of the eighth address is the host input flag. The host input flag indicates whether or not a data packet is sent from the host processor. When the host input flag is "0", the data packet is sent from other than the host processor. When the host input flag is "1", the data packet is sent from the host processor.

The seventh bit of the eighth address is the control flag. The control flag indicates whether a data packet including the same is to be provided to the outside of processor 11 or to be transmitted to the inside of processor 11. If the control flag is "0" when the data packet is sent to branch unit 109, the data packet is sent to junction unit 101 from branch unit 109 through signal lines 123, and subjected to processing in processor 11. If the control flag is "1" when the data packet is sent to branch unit 109, the data packet is provided externally through signal lines 135.

The eighth bit of the eighth address is the end flag. The initialization information is read out from each address in the form of an 8-bit word. One initialization data packet is generated from eight words. When data of eight words is read out and the end flag of the eighth word, that is, the eighth bit of the eighth address is "0", the data of the next eight words is further read out. When the end flag included in the eighth word is set to "1", reading of the initialization information is complete at the time. Accordingly, the initialization information required for generation of an initialization data packet carrying out a series of initialization processing is read out. Note that, when a head address and the number of addresses for reading are externally given in advance, or when the head address and the end address are given, it is not necessary to refer to the end flag.

In the diagrams showing field configurations of data packets P1 and P2 of FIG. 7, only principal data required for explaining operation of processor 11 is shown, and the left or right flag, the input port history, the host output flag, the host input flag, the control flag, and the end flag shown in FIG. 11 are not shown. Further, in the first embodiment, in reading processing of initialization information to be described later, termination of reading is not detected using the end flag. Termination of reading of initialization information is determined by the number of addresses applied from address number input unit 117 (cf. FIG. 5).

Figure 12:
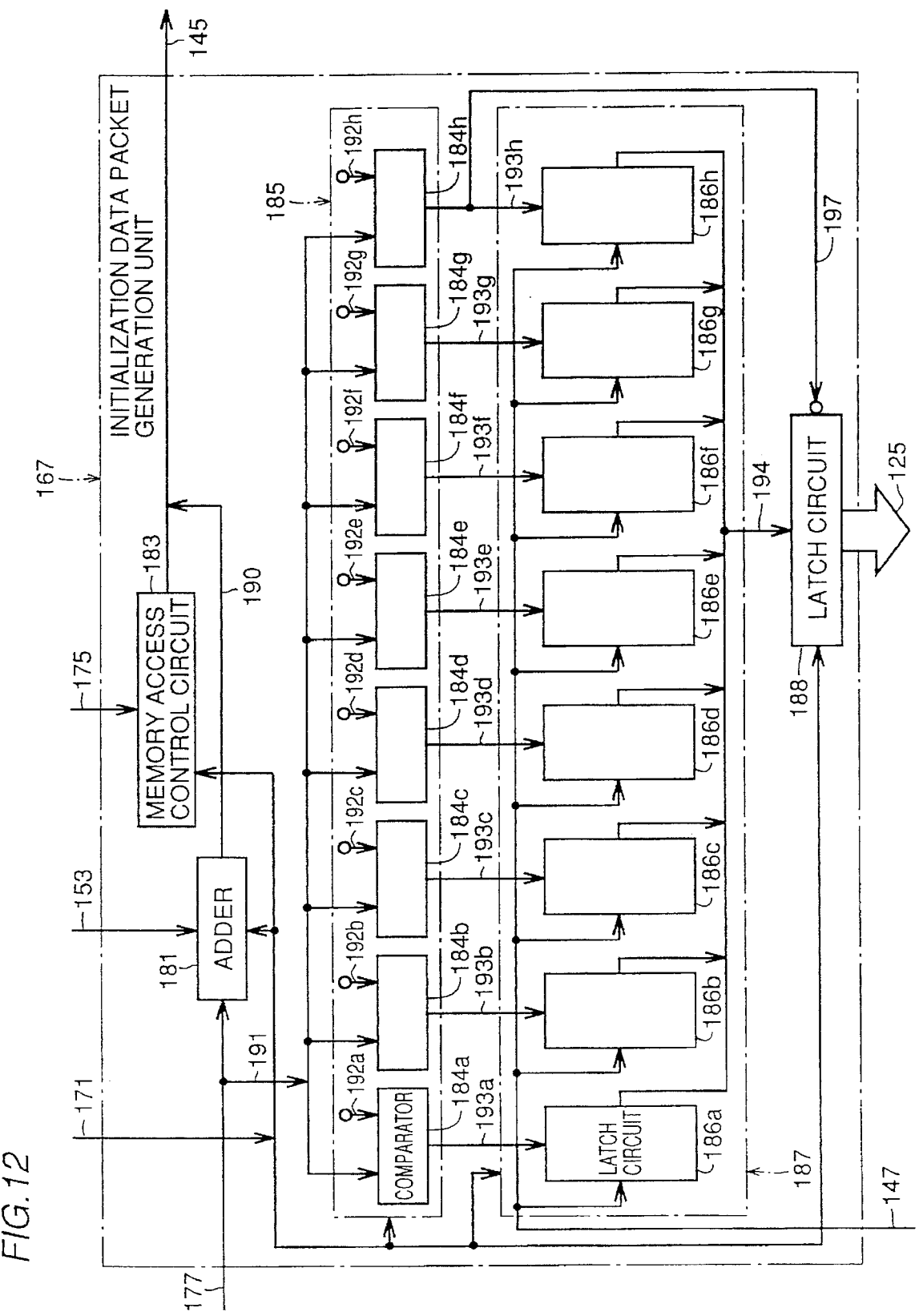
FIG. 12 is a diagram showing a circuit configuration of an initialization data packet generation unit.

FIG. 12 is a diagram showing a circuit configuration of initialization data packet generation unit 167. Referring to FIG. 12, initialization data packet generation unit 167 includes an adder 181, a memory access control circuit 183, a comparator group 185 including eight comparators 184a–184h, a latch circuit group 187 including eight latch circuits 186a–186h, and a latch circuit 188.

Referring to FIG. 12, to adder 181, a start address is applied through signal line 153, and a count value is applied through signal line 177. An output from adder 181 is provided to the outside of initialization data packet generation unit 167 through a signal line 190.

An initialization clock signal is applied to memory access control circuit 183 through signal line 175. An output from memory access control circuit 183 is provided to the outside of initialization data packet generation unit 167 through signal line 145.

A signal line 191 branches from signal line 177. Signal line 191 transmits the lowermost three bits of a signal (eight bits) sent through signal line 177. Signal line 191 is connected to one input terminal of each of eight comparators 184a–184h. To the other input terminal of each of comparators 184a–184h, one of fixed signals representing values of "1"–"7", "0" is sent through one of signal lines 192a–192h, respectively. Means for generating these signals is not shown. Outputs from comparators 184a–184h are sent to latch circuits 186a–186h through signal lines 193a–193h.

Initialization information is applied to latch circuits 186a–186h through signal line 147. A signal line 197 branches from signal line 193h from comparator 184h to latch circuit 186h. A signal on signal line 197 is inverted and applied to latch circuit 188. Outputs from latch circuits 186a–186h are applied to latch circuit 188 through signal line 194. An output from latch circuit 188 is provided externally through signal lines 125.

Referring to FIGS. 6 to 12, initialization information read unit 111 operates as follows. A reset signal generated by reset signal input unit 113 (cf. FIG. 5) is applied to initialization data packet generation unit 167 through signal line 171 to be applied to adder 181, memory access control circuit 183, comparator group 185, latch circuit group 187, and latch circuit 188. Each unit receiving the reset signal resets itself.

Then, when the reset signal is terminated, and transmission of an initialization clock signal from control unit 161 (cf. FIG. 6) is started, initialization information read unit 111 starts generating initialization data packets. Adder 181 adds a start address sent from signal line 153 and a count value sent from signal line 177, and generates a read address for reading out initialization information in memory 106 (cf. FIGS. 10 and 11). The read address generated by adder 181 is sent to signal line 145 through signal line 190.

Referring to FIG. 12, memory access control circuit 183 generates a signal for accessing memory 106 in response to an initialization clock signal sent through signal line 175. Among signals generated by memory access control circuit 183 are included a chip enable signal, an output enable signal, and a write enable signal. These signals are generically called access signals. Memory access control circuit 183 provides the generated signals through signal line 145. Accordingly, a signal indicating the read address provided from adder 181 and the access signals provided from memory access control circuit 183 are sent to memory 106 (cf. FIG. 5) through signal line 145.

Signal line 191 branching from signal line 177 sends only the lowermost three bits among the bits indicating the count value to comparator group 185. As a result, values of "1", "2", "3", . . . , "7", "0" are applied in this order to comparators 184a–184h through a respective one input terminal according to the magnitude of the count value. When a signal of the same value as one which has been applied to the other input terminal is sent from signal line 191, each of comparators 184a–184h transmits a signal to a corresponding one of latch circuits 186a–186h through a corresponding one of signal lines 193a–193h. When the value of "1" is entered through signal line 191 for example, a signal is provided from comparator 184a to latch circuit 186a. When the value of "3" is entered from signal line 191, a signal is provided from comparator 184c to latch circuit 186c.

On the other hand, referring to FIG. 12, in response to the access signals and the read address provided from signal line 145, initialization information of one word read out from memory 106 is sent to latch circuit group 187 through signal line 147. The initialization information of one word sent from signal line 147 is latched by any of latch circuits 186a–186h to which a latch signal is sent from a corresponding comparator at the time. As a result, initialization information sent on the one-word basis through signal line 147 is latched by latch circuit 186a, latch circuit 186b, . . . , and latch circuit 186h in this order. After the last latch circuit 186h latches data in response to rising of a pulse of a signal sent from comparator 184h through signal line 193h, latch circuit 188 latches data sent from latch circuits 186a–186h through a signal line 194 in response to falling of a pulse sent through signal line 197 branching from signal line 193h. As a result, initialization information of eight words is combined, and one initialization data packet is generated, and provided externally through signal lines 125.

Description will now be given of a procedure in which an ordinary data packet for operation is processed in processor 11. As an example, consider the case where a data packet is input through signal lines 121 from the outside of processor 11. The applied data packet is called a data packet PA. The field configuration of data packet PA is the same as that of data packet P1 shown in FIG. 7 (a). It is assumed that instruction information included in data packet PA is to specify processing requiring two operand data such as a binary operation, for example.

Referring to FIG. 5, junction unit 101 receives data packet PA sent from the outside of processor 11 through signal lines 121. Junction unit 101 sends data packet PA to firing control unit 103 through signal lines 127.

Firing control unit 103 determines whether or not the instruction information included in data packet PA requires two operand data. When the instruction information specifies processing requiring two operand data, firing control unit 103 matches operand data. Based on the destination information included in data packet PA, firing control unit 103 determines an address the matching memory (cf. FIG. 8) should access. According to a value of the matching flag of a corresponding address, firing control unit 103 determines whether or not data packet PA matches the operand data of a data packet previously applied to firing control unit 103.

When the matching flag is set to "1", and matching operand data waiting for operand data of data packet PA is stored, firing control unit 103 reads out the matching operand data. Firing control unit 103 generates a data packet PB of a field configuration similar to that of data packet P2 shown in FIG. 7 shown at (b). Firing control unit 103 stores the destination information, the instruction information, and the generation number included in data packet PA in destination field F1, instruction field F2, and generation field F4 of data packet PB, respectively. Firing control unit 103 stores operand data of data packet PA in data field F3a of data packet PB as left operand data, and the read matching operand data in data field F3b as right operand data.

On the other hand, when the matching flag of a corresponding address is "0", and corresponding matching operand data is not stored, firing control unit 103 stores operand data of data packet PA in the matching memory as matching operand data. At the time, the matching flag of the corresponding address is set to "1".

A procedure from this time on will be described assuming that operand data corresponding to the operand data of data packet PA has already been in the matching memory. Firing control unit 103 sends the generated data packet PB to operation unit 105 through signal lines 129.

Operation unit 105 performs operation based on instruction information to two left and right operand data of data packet PB. In performing operation, operation unit 105 reads out operation information from memory 106, and write data in memory 106, if necessary. After completing the operation, operation unit 105 generates a data packet PC having a field configuration similar to that of data packet P1 (cf. FIG. 7 (a)). Operation unit 105 stores the operation result in data field F3 of data packet PC as operand data. Operation unit 105 sends data packet PC to program storage unit 107 through signal lines 131.

Referring to FIG. 5, program storage unit 107 determines an address to be referred to in a storage area of a data flow program (cf. FIG. 9) based on the destination information of the received data packet PC. Program storage unit 107 reads out the destination information and the instruction information stored in a corresponding address, and stores the same in destination field F1 and instruction field F2 of data packet PC, respectively. The newly stored destination information and instruction information correspond to the next destination information and the next instruction information of data packet PC. Program storage unit 107 sends data packet PC to branch unit 109 through signal lines 133.

Referring to FIG. 5, branch unit 109 externally provides data packet PC through signal lines 135, or sends data packet PC to junction unit 101 through signal lines 123, bared on the destination information included in data packet PC. When data packet PC is sent to junction unit 101, data packet PC is processed within processor 11 according to the above described procedure.

Description will now be given of transition of states in each of firing control unit 103, operation unit 105, and program storage unit 107. The above described four states of Unknown, Cold, Warm, and Hot of each unit will be described separately.

The state of firing control unit 103 will be described. Firing control unit 103 includes a matching memory (cf. FIG. 8). A matching flag is included in data of each address of the matching memory. Consider the case where firing control unit 103 is in the Hot state. In this case, when matching operand data is stored in a certain storage area, the matching flag of the area is set to "1". When matching operand data is not stored in a certain storage area, the matching flag of the area is set to "0". When firing control unit 103 is in the Warm state, the matching flags of all addresses are set to "0". When firing control unit 103 is in the Warm state, it cannot be determined based on the values of the matching flags whether matching operand data is stored or not. Therefore, firing control unit 103 cannot match operand data normally.

When firing control unit 103 is in the Cold state, the value of the matching flag of each address is indefinite. In this case, firing control unit 103 cannot sometimes perform matching processing of operand data normally. When firing control unit 103 is in the Unknown state, the content of the entire matching memory is indefinite. In this case, firing control unit 103 cannot sometimes retrieve the matching flags per se.

Figure 2A:
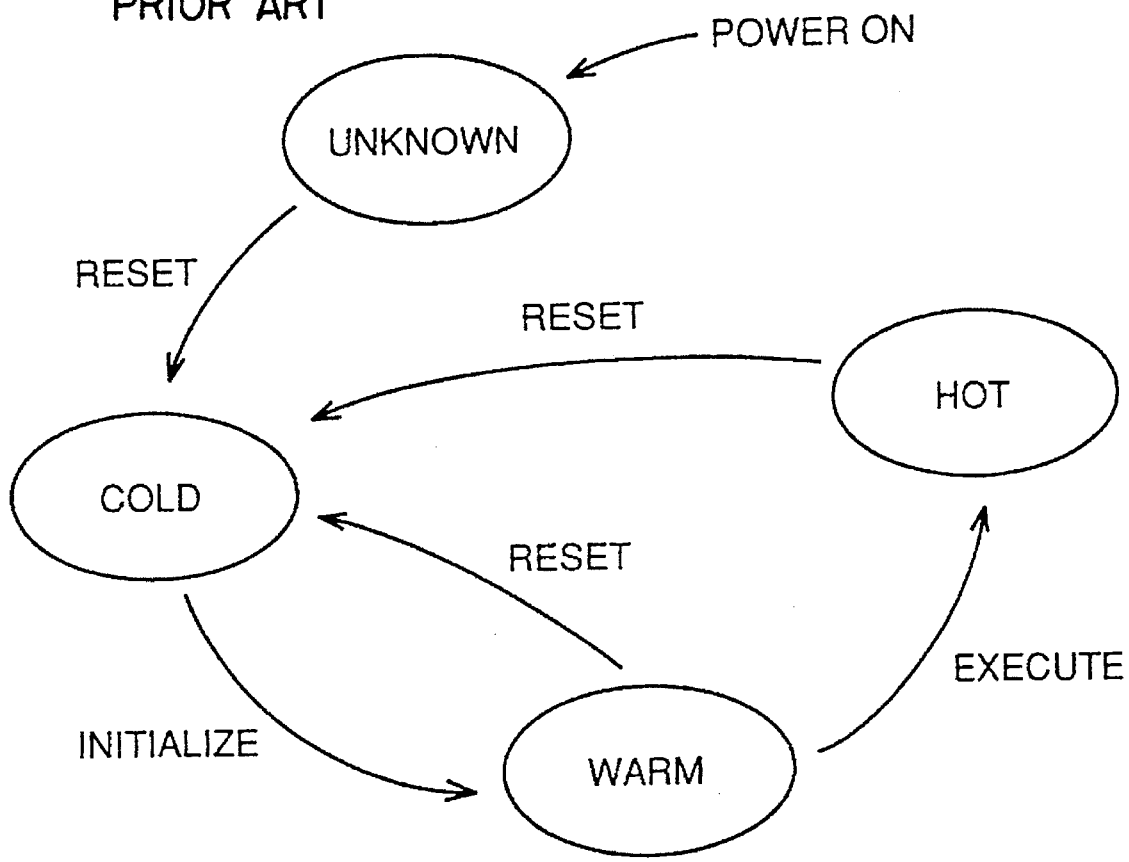
FIGS. 2 (a) and 2 (b), hereinafter collectively referred to as FIG. 2, are schematic diagrams showing transition of states of the data driven type information processor.
Figure 2B:
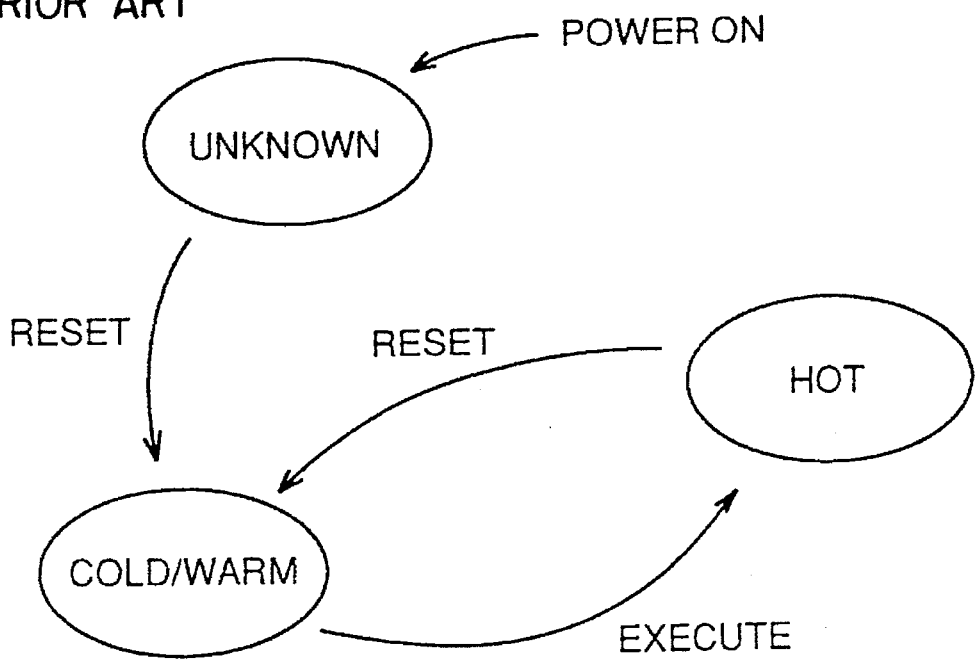
Figure 3:
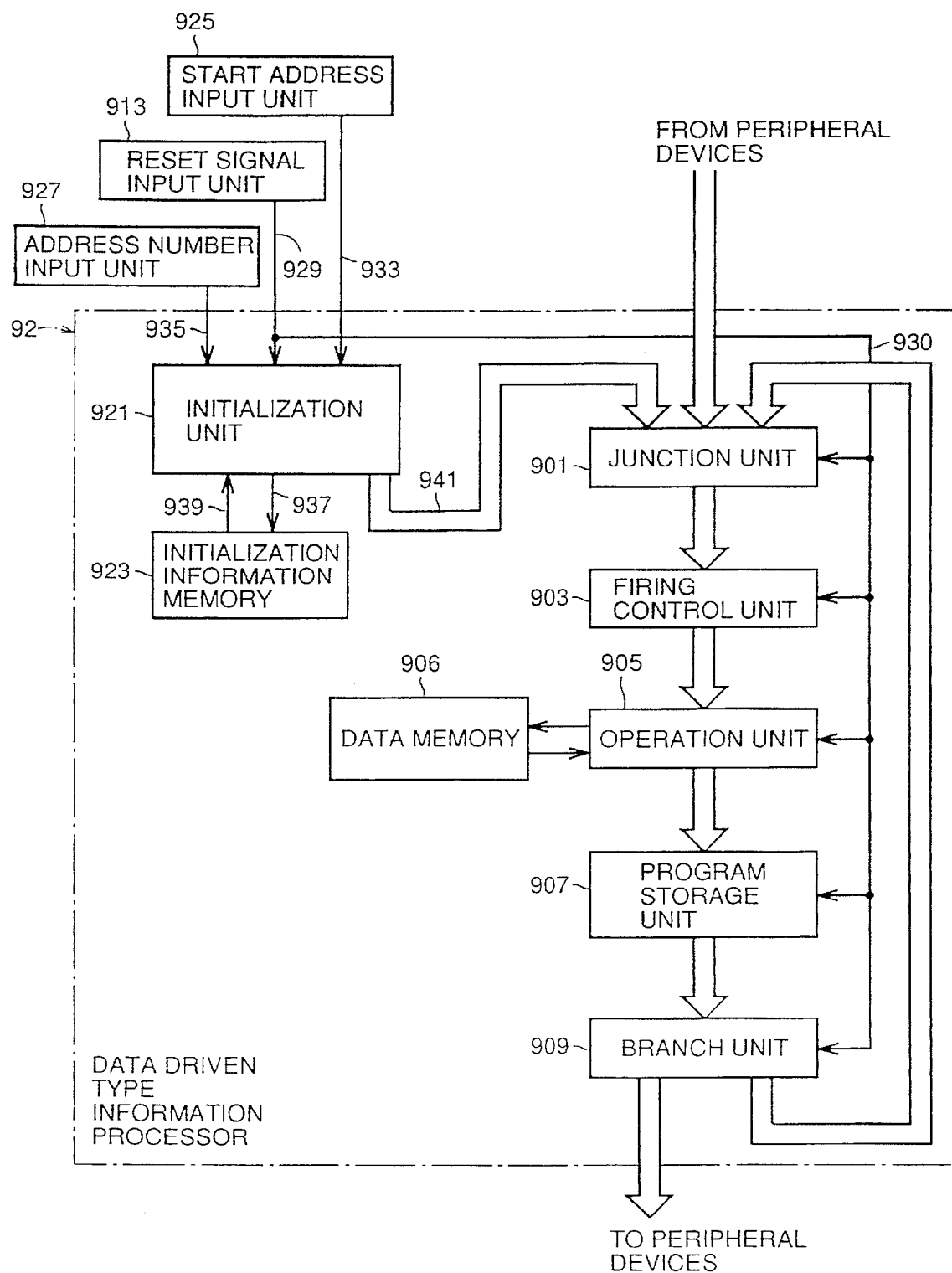
FIG. 3 is a block configuration diagram of a data driven type information processor according to one example of the prior art of the present invention.
Figure 4:
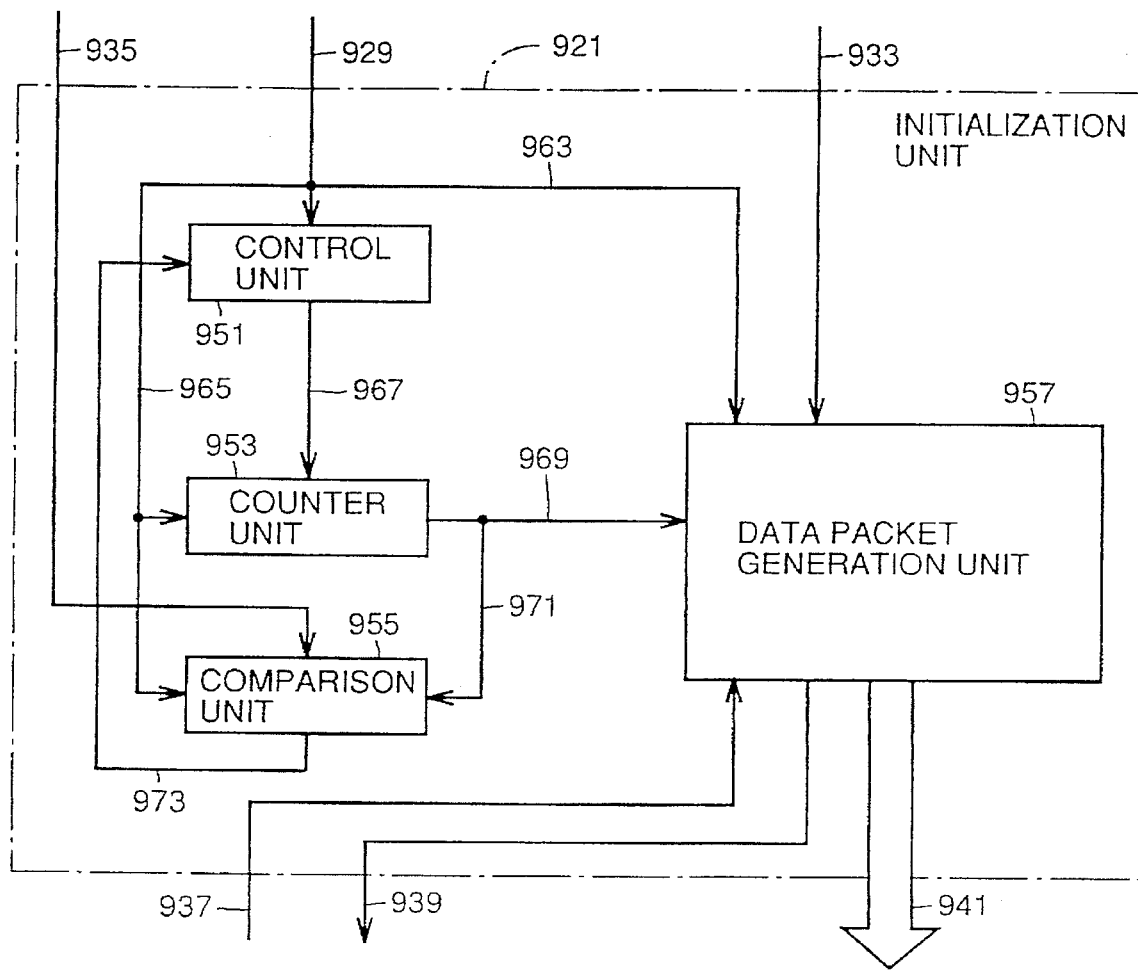
FIG. 4 is a block configuration diagram of an initialization unit included in the data driven type information processor of the prior art.

In this embodiment, an SRAM is used as a matching memory. Therefore, application of a reset signal to firing control unit 103 cannot force the matching flag of each address to be set to "0". Accordingly, in this embodiment, an initialization data packet for firing control unit is applied to firing control unit 103, and the matching memory is initialized. If a memory capable of initializing data by application of a reset signal is used as a matching memory, firing control unit 103 transitions among three states of Unknown, Cold/Warm, and Hot shown in FIG. 2 shown at (b). In this case, firing control unit 103 does not require initialization processing using an initialization data packet.

Description will now be given of the state of operation unit 105 shown in FIG. 5. Operation unit 105 includes a constant storage unit and an arithmetic and logic unit therein. Since operation unit 105 has the same internal configuration as the conventional data driven type information processor, illustration of operation unit 105 is omitted. The arithmetic and logic unit performs operation to operand data of a data packet sent to operation unit 105 based on the instruction information. The constant storage unit is connected to the arithmetic and logic unit, and prestores constants required for operation the arithmetic and logic unit carries out. The arithmetic and logic unit reads out the constants from the constant storage unit if necessary, and uses the values of the constants for operation.

When operation unit 105 is in the Hot state or the Warm state, prescribed values are stored in the constant storage unit. When operation unit 105 is in the Cold state, the values stored in the constant storage unit are cleared. Since the arithmetic and logic unit cannot sometimes carry out normal operation in this case, operation unit 105 is brought to the indefinite state. When operation unit 105 is in the Unknown state, the values stored in the constant storage unit become indefinite. Since the arithmetic and logic unit cannot sometimes carry out normal operation also in this case, operation unit 105 enters the indefinite state.

Note that there is a case where operation unit 105 carries out only operation not using the prestored constants, and therefore operation unit 105 does not include the constant storage unit. In this case, operation unit 105 transitions among three states of Unknown, Cold/Warm, and Hot shown in FIG. 2 shown at (b). Therefore, initialization using an initialization data packet is not required.

The state of program storage unit 107 shown in FIG. 5 will now be described. Program storage unit 107 includes storage areas (cf. FIG. 9) for storing data flow programs. When program storage unit 107 is in the Hot state, data flow programs are stored in the storage areas, and the data flow programs are read out. When program storage unit 107 is in the Warm state, data flow programs are stored in the storage areas, and the data flow programs are not read out. When program storage unit 107 is in the Cold state, data in the storage areas is cleared.

When program storage unit 107 is in the Unknown state, the contents of the storage areas are indefinite. When all the data flow programs of the storage areas of program storage unit 107 are initialized or changed, a reset signal is applied to program storage unit 107, and then, an initialization data packet is input to download the data flow programs to program storage unit 107. When part of the data flow programs of the storage areas of program storage unit 107 are changed, a reset signal is not input, and an initialization data packet for changing part of the data flow programs is input.

When a read only memory is used as program storage unit 107, the contents of the storage areas are not changed. Therefore, initialization for program storage unit 107 is not required.

The processing procedure in the case where processor 11 is initialized will now be described. Referring to FIG. 5, the operator sets a start address and an address number in start address input unit 115 and address number input unit 117, respectively. Then, the operator applies a reset signal to processor 11 for a prescribed time using reset signal input unit 113. The reset signal is applied to initialization information read unit 111 through signal line 151. Further, the reset signal is sent to junction unit 101, firing control unit 103, multiplexer (MUX) 104, operation unit 105, program storage unit 107, and branch unit 109 through signal line 157 branching from signal line 151. Each of junction unit 101, firing control unit 103, multiplexer 104, operation unit 105, program storage unit 107, and branch unit 109 resets itself in response to the reset signal.

Referring to FIG. 6, in initialization information read unit 111, the reset signal sent through signal line 151 is applied to control unit 161. Further, the reset signal is applied to counter unit 163 and comparison unit 165 through signal line 169 branching from signal line 151. Further, the reset signal is sent to initialization data packet generation unit 167 through signal line 171 branching from signal line 151. Each of control unit 161, counter unit 163, comparison unit 165, and initialization data packet generation unit 167 resets itself in response to the sent reset signal.

Counter unit 163 clears its own count value to "0" in response to the reset signal. Comparison unit 165 clears the address number which has been stored in response to the reset signal. The reset signal applied to initialization data packet generation unit 167 is sent to each circuit (cf. FIG. 12) in initialization data packet generation unit 167. Each circuit resets itself in response to the reset signal.

After a certain time, control unit 161 starts output of an initialization clock signal for every certain time in response to termination of the reset signal. The initialization clock signal is applied to counter unit 163 through signal line 173. Further, the initialization clock signal is applied to initialization data packet generation unit 167 through signal line 175.

Counter unit 163 counts up the count value one by one whenever the initialization clock signal is applied thereto. Counter unit 163 sends the count value to initialization data packet generation unit 167 through signal line 177, and to comparison unit 165 through signal line 179.

The start address is applied to initialization data packet generation unit 167 through signal line 153. In initialization data packet generation unit 167, an access signal and a read address for reading out initialization information (cf. FIGS. 10 and 11) are generated based on the start address, the initialization clock signal, and the count value, as described above, and provided to the outside of initialization information read unit 111 through signal line 145. On the other hand, a signal indicating that generation of an initialization data packet is started is provided from control unit 161 to the outside of initialization information read unit 111 through signal line 149.

Referring to FIG. 5, the access signal and the read address provided from initialization information read unit 111 are applied to multiplexer 104 through signal line 145. The signal indicating that generation of an initialization data packet is started provided from initialization information read unit 111 is applied to multiplexer 104 through signal line 149.

Application of a read control signal through signal line 149 causes multiplexer 104 to switch from the normal state where the access signal and the read address sent from operation unit 105 through signal line 141 are sent to memory 106 through signal line 143 to the initialization state where the access signal and the read address sent from initialization information read unit 111 through signal line 145 are sent to memory 106 through signal line 143. As a result, initialization information of memory 106 is read out. The initialization information is stored in memory 106 in the state shown in FIG. 11. The initialization information is read out word by word whenever the access signal and the read address are sent from initialization information read unit 111 through signal line 145, and sent to initialization information read unit 111 through signal line 147.

Referring to FIG. 6, the initialization information on the one word basis sent through signal line 147 is applied to the inside of initialization data packet generation unit 167, and combined to sets each including eight words by operation of comparator group 185, latch circuit group 187, and latch circuit 188 described before. The combined initialization information is provided to initialization data packet generation unit 167 through signal lines 125 as one initialization data packet, and further provided to the outside of initialization information read unit 111. Generation of an initialization data packet by initialization data packet generation unit 167 is continued as far as an initialization clock signal is provided from control unit 161.

On the other hand, comparison unit 165 sequentially compares the address number sent through signal line 155 and the count value sent from counter unit 163 through signal line 179. Comparison unit 165 sends a signal for stopping generation of an initialization clock signal to control unit 161 through signal line 181 when the count value is equal to the address number. In response to this signal, control unit 161 stops output of an initialization clock signal. As a result, initialization information corresponding to the address information the operator sets using start address input unit 115 and address number input unit 117 is read out, and an initialization data packet is generated based on the read initialization information.

Referring to FIG. 5, the initialization data packets provided from initialization information read unit 111 are sent to junction unit 101 through signal lines 125 one by one. Note that the field configuration of the initialization data packet is the same as that of data packet P1 shown in FIG. 7 (a). Junction unit 101 sends the received initialization data packet to firing control unit 103 through signal lines 127 similar to the case of a data packet for normal operation.

Firing control unit 103 shown in FIG. 5 resets the matching flag of the storage address of the matching memory (cf. FIG. 8) to "0", if a firing control unit initialization instruction is stored in instruction field F2 of the sent initialization data packet. Accordingly, firing control unit 103 is initialized to enter the Warm state. On the other hand, if a firing control unit initialization instruction is not stored in instruction filed F2 of the initialization data packet, firing control unit 103 directly sends the initialization data packet to operation unit 105 through signal lines 129.

When the initialization data packet is sent to operation unit 105, operation unit 105 reads out instruction information from the initialization data packet. The arithmetic and logic unit determines whether or not the read instruction information is an operation unit constant set instruction. If the instruction information is an operation unit constant set instruction, the arithmetic and logic unit reads out operand data from data field F3 of the initialization data packet. Constant values to be set to the constant storage unit of operation unit 105 are stored as operand data in data field F3 of the initialization data packet for initializing operation unit 105. The arithmetic and logic unit stores the read constant values in the constant storage unit. As a result, operation unit 105 is initialized to enter the Warm state. On the other hand, if the instruction information of the initialization data packet is not an operation unit constant set instruction, operation unit 105 directly sends the initialization data packet to program storage unit 107 through signal lines 131.

When the initialization data packet is sent to program storage unit 107, program storage unit 107 reads out instruction information from instruction field F2 of the initialization data packet, and determines whether or not the instruction information is a data flow program initialization instruction. If the instruction information is a data flow program initialization instruction, program storage unit 107 reads out operand data from data field F3 of the initialization data packet. A data flow program configured of destination information and instruction information to be downloaded is stored in data field F3 of the initialization data packet for initializing program storage unit 107.

Program storage unit 107 stores the read data flow program in a storage area of an address designated by instruction information. As a result, the data flow program transmitted by the initialization data packet is downloaded to program storage unit 107. When plural ones or all of the data flow programs of program storage unit 107 are initialized, initialization data packets for program storage unit 107 of the number of the data flow programs are generated by initialization information read unit 111, and sent to program storage unit 107.

With external application of a reset signal, and subsequent termination of the reset signal as a trigger, an initialization data packet is generated in processor 11 according to the above procedure, and initialization processing using the initialization data packet is carried out. Processor 11 according to this embodiment incorporates a mechanism for generating an initialization data packet in response to external application of a signal. Therefore, it is not necessary to provide a separate peripheral device for generating an initialization data packet external to the data driven type information processor, unlike the conventional case. As a result, the configuration of a system, device, or the like incorporating processor 11 is simplified.

Further, in this embodiment, initialization information used for generating an initialization data packet is stored in memory 106 together with operation information which the operation unit 105 uses for operation. Therefore, although the processor 11 incorporates the mechanism for generating an initialization data packet, it does not need to incorporate a dedicated memory for storing initialization information therefor. The disadvantage that the configuration of processor 11 becomes complicated or processor 11 becomes larger in size can be alleviated.

[Second Embodiment]

The second embodiment of the data driven type information processor according to the present invention will now be described.

Figure 13:
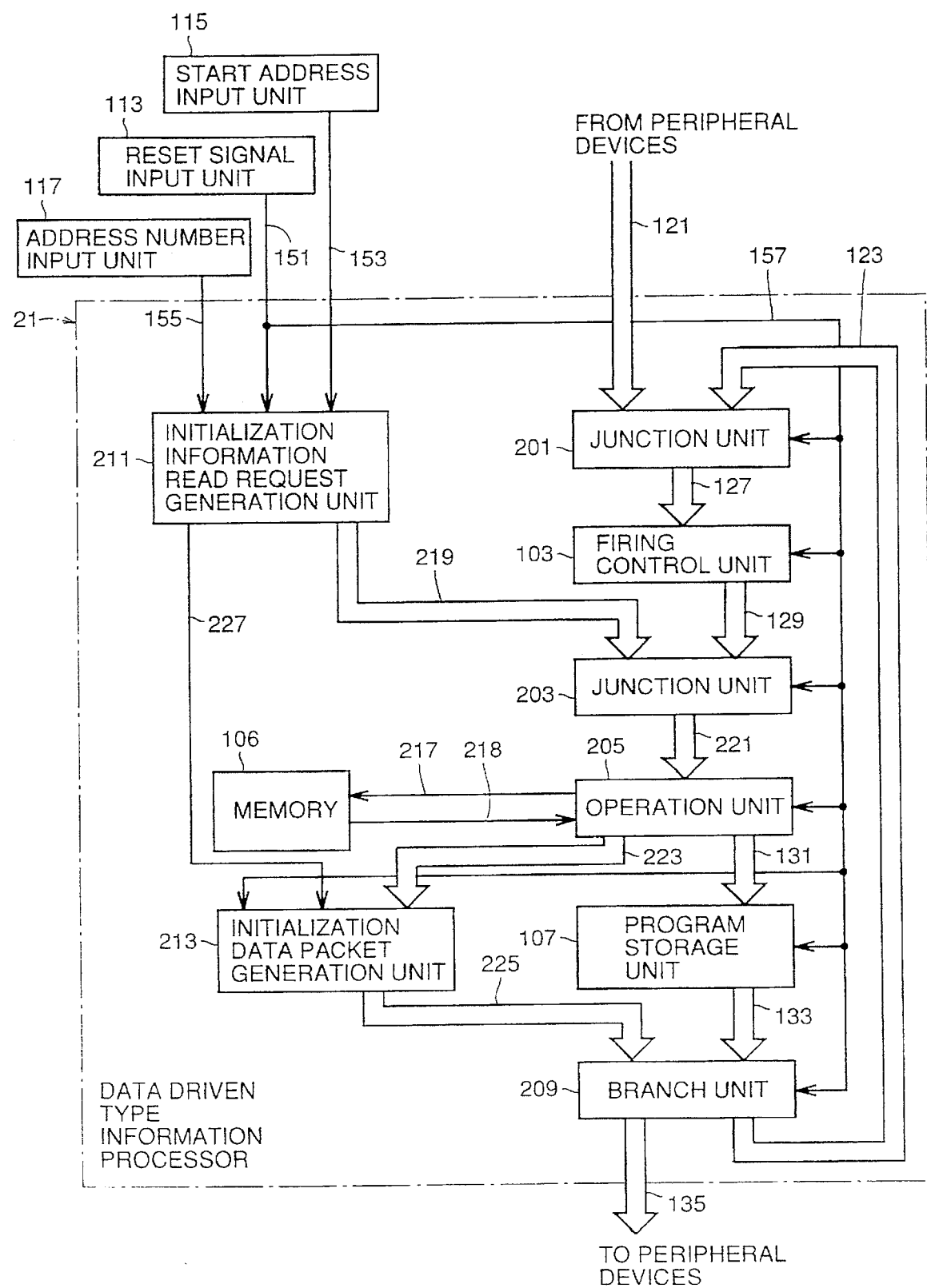
FIG. 13 is a block configuration diagram of a data driven type information processor according to a second embodiment of the present invention.

FIG. 13 is a block configuration diagram of a data driven type information processor 21 according to the second embodiment. Note that data driven type information processor 21 is simply referred to as "processor 21" in the following description. Components having the same functions as those shown in the first embodiment are labeled with the same reference characters.

Referring to FIG. 13, processor 21 includes firing control unit 103, memory 106, and program storage unit 107 similar to those of processor 11 of the first embodiment. Processor 21 further includes a junction unit 201, a junction unit 203, an operation unit 205, a branch unit 209, an initialization information read request generation unit 211 generating a data packet for requesting to read out initialization information stored in memory 106, and an initialization data packet generation unit 213 combining pieces of initialization information read out from memory 106 to generate an initialization data packet. External to processor 21 are provided reset signal input unit 113, start address input unit 115, and address number input unit 117 similar to those of the first embodiment.

Firing control unit 103, operation unit 205, and program storage unit 107 transfer among four states of Unknown, Cold, Warm, and Hot. When the entire processor 21 is initialized, the above three units are all supplied with corresponding initialization data packets, and initialized. When any one of the above three units is initialized, a corresponding initialization data packet is sent to the unit. The above three units enter the Warm state by being initialized.

The other units other than the above three units transfer among three states of Unknown, Cold/Warm, and Hot. These units enter the Cold/Warm state by resetting themselves in response to a reset signal. Therefore, these units do not have to be initialized using an initialization data packet.

Initialization information read request generation unit 211 generates a data packet for requesting to read out initialization information stored in memory 106. Initialization data packet generation unit 213 combines pieces of initialization information read out from memory 106, and generates an initialization data packet.

Junction unit 201 receives data packets sent from the external peripheral devices through signal lines 121, and data packets sent from branch unit 201 in processor 21 through signal lines 123, and sends data packets to firing control unit 103 through signal lines 127.

Junction unit 203 receives data packets sent from firing control unit 103 through signal lines 129, and read request data packets sent from initialization information read request generation unit 211 through signal lines 219, and sends data packets to operation unit 205 through signal lines 221.

Operation unit 205 sends an access signal and a read address to memory 106 through a signal line 217, and reads out initialization information or operation information (cf. FIG. 10) from memory 106. Data read out from memory 106 is sent to operation unit 205 through a signal line 218. Operation unit 205 reads out initialization information from memory 106 if the data packet sent from junction unit 203 is a read request data packet generated by initialization information read request generation unit 211. The configuration of initialization information is as shown in FIG. 11. Operation unit 205 stores the read initialization information in data field F3 of the read request data packet, and sends the data packet to initialization data packet generation unit 213 through signal lines 223.

If the data packet sent from junction unit 203 is a data packet for normal operation (hereinafter referred to as an "operation data packet"), operation unit 205 carries out operation such as arithmetic operation and logic operation based on instruction information stored in the operation data packet, and sends a data packet storing the operation result to program storage unit 107 through signal lines 131.

Program storage unit 107 reads out a data flow program from a storage area based on destination information of the sent data packet. Program storage unit 107 stores destination information and instruction information included in the read data flow program in destination field F1 and instruction field F2 of a data packet as the next destination information and the next instruction information, respectively, and sends the data packet to branch unit 209 through signal lines 133.

Initialization data packet generation unit 213 combines a predetermined number of pieces of initialization information stored in the read request data packets sent from operation unit 205, and generates an initialization data packet. Initialization data packet generation unit 213 sends the generated initialization data packet to branch unit 209 through signal lines 225.

Branch unit 209 sends the sent data packet to the outside of processor 21 through signal lines 135, or to junction unit 201 of processor 21 through signal lines 123. If the sent data packet is an initialization data packet generated by initialization data packet generation unit 213, branch unit 209 sends the initialization data packet to junction unit 201. A control flag (cf. FIG. 11) for controlling an output destination is included in the initialization data packet. Referring to the control flag, branch unit 209 determines whether the sent data packet is an initialization data packet or not.

A reset signal generated from reset signal input unit 113 is applied to processor 21, and to initialization information read request generation unit 211 through signal line 151. Further, the reset signal is applied to junction unit 201, firing control unit 103, junction unit 203, operation unit 205, program storage unit 107, initialization data packet generation unit 213, and branch unit 209 through signal line 157 branching from signal line 151. Each unit resets itself in response to the reset signal.

Set signals provided from start address input unit 113 and address number input unit 117 are applied to initialization information read request generation unit 211 through signal line 153 and signal line 155, respectively.

Referring to FIGS. 14 to 17, the detailed configurations of operation unit 205, initialization information read request generation unit 211, and initialization data packet generation unit 213 will be described.

Figure 14:
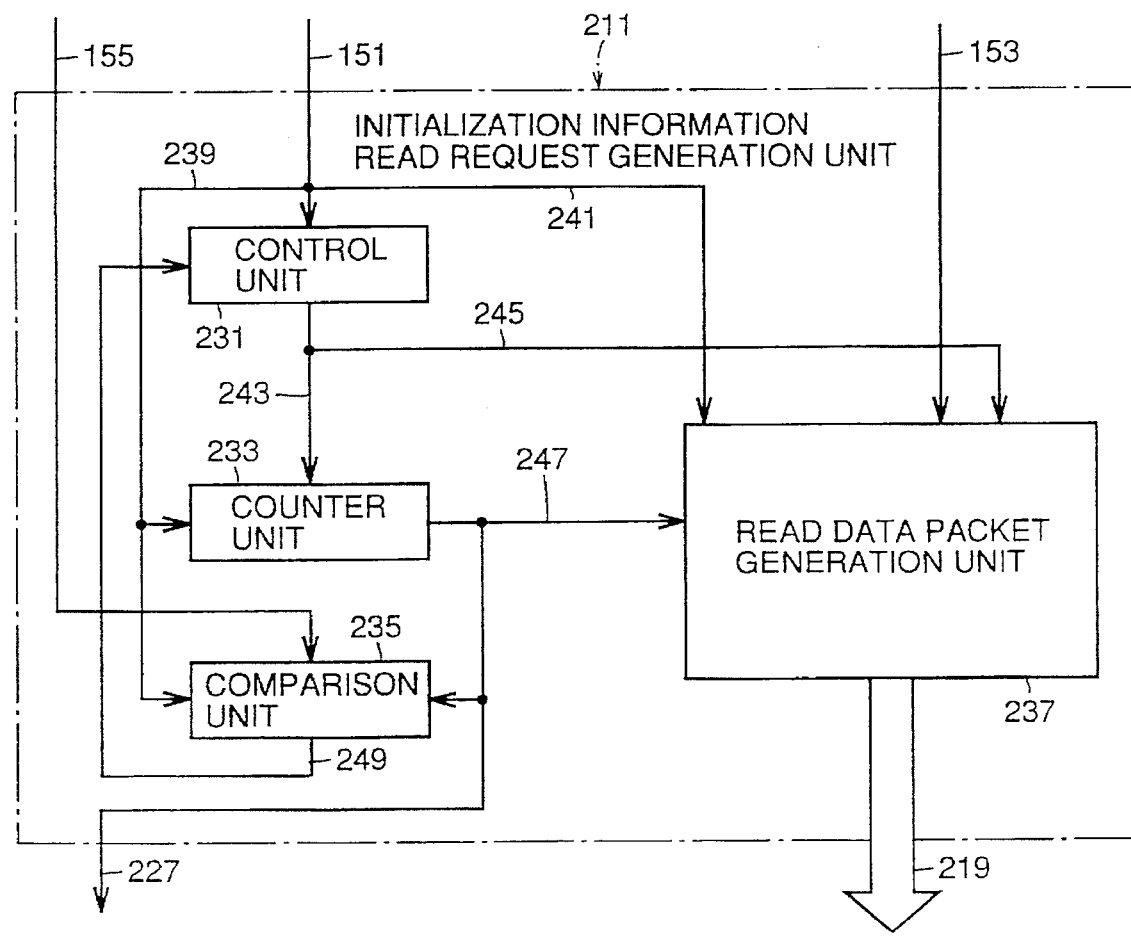
FIG. 14 is a block configuration diagram of an initialization information read unit.

Referring to FIG. 14, initialization information read request generation unit 211 includes a control unit 231, a counter unit 233, a comparison unit 235, and a read data packet generation unit 237.

Control unit 231 receives a reset signal through signal line 151. The reset signal is applied to counter unit 233 and comparison unit 235 through a signal line 239 branching from signal line 151. Further, the reset signal is applied to read data packet generation unit 237 through a signal line 241 branching from signal line 151. In response to application of the reset signal, control unit 231, counter unit 233, comparison unit 235, and read data packet generation unit 237 reset themselves, and enter the Cold/Warm state.

Control unit 231 starts generation of an initialization clock signal in response to the reset signal being turned OFF a certain time after being turned ON. Control unit 231 sends the initialization clock signal to counter unit 233 through a signal line 243, and to read data packet generation unit 237 through a signal line 245. Counter unit 233 counts up the count value one by one whenever the initialization clock signal is applied thereto. Counter unit 233 resets itself in response to application of the reset signal, and clears the count value to "0". Counter unit 233 sends the count value to read data packet generation unit 237 through a signal line 247. Further, counter unit 233 sends the count value to comparison unit 235 and to the outside of initialization information read request generation unit 211 through a signal line 227 branching from signal line 247.

A start address is applied to read data packet generation unit 237 through signal line 153. Whenever it receives the count value from counter unit 233, read data packet generation unit 237 adds the count value and the start address to generate a read address for reading out initialization information. Read data packet generation unit 237 generates read request data packets each storing the generated read address. Read data generation unit 237 provides the read request data packets to the outside of initialization information read request generation unit 211 through signal lines 219.

Read data packet generation unit 237 continues generation of read request data packets as far as an initialization clock signal is provided from control unit 231, and a count value is provided from counter unit 233. Read data packet generation unit 237 sequentially generates read request data packets each including one read address, and outputs the same.

An address number is applied to comparison unit 235 through signal line 155. Comparison unit 235 compares the count value sent from counter unit 233 and the address number. When the count value is equal to the address number, comparison unit 235 provides a signal for stopping generation of an initialization clock signal to control unit 231 through signal line 249. In response to the signal sent from comparison unit 235, control unit 231 stops output of an initialization clock signal. As a result, generation of read request data packets is complete.

Figure 15:
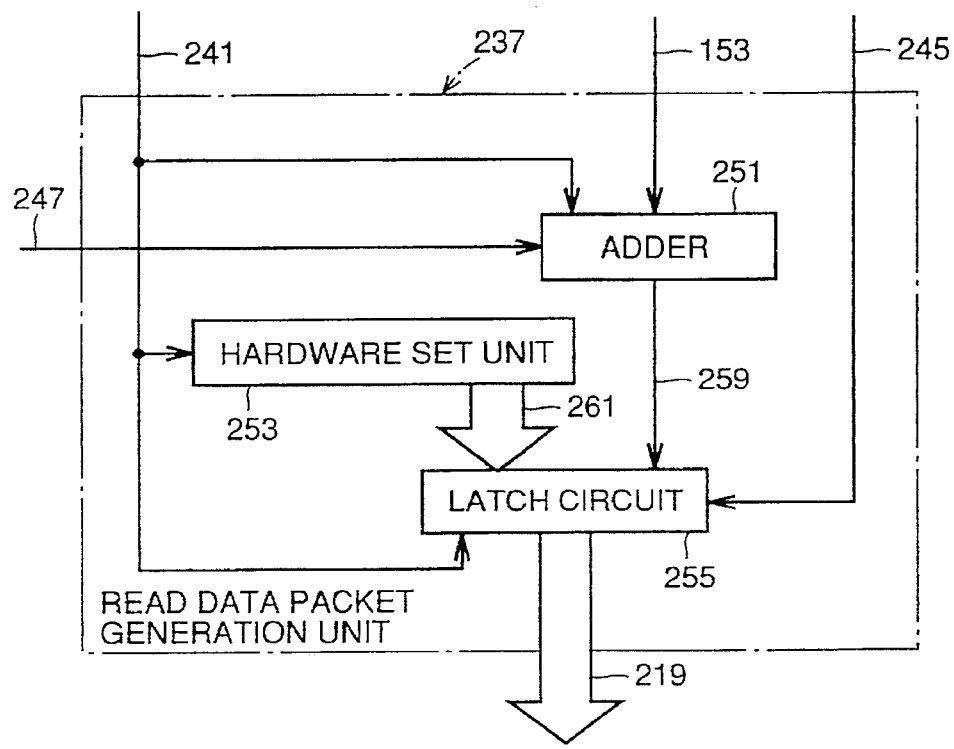
FIG. 15 is a diagram showing a circuit configuration of a read data packet generation unit.

Referring to FIG. 15, read data packet generation unit 237 includes an adder 251, a hardware set unit 253, and a latch circuit 255. Adder 251, hardware set unit 253, and latch circuit 255 reset themselves in response to a reset signal applied through signal line 241.

Adder 251 adds the start address sent through signal line 153 and the count value sent through signal line 247, and sends the result through a signal line 259. The output of adder 251 is a read address for reading out initialization information.

Hardware set unit 253 generates necessary data for generating read request data packets other than the read address. Hardware set unit 253 sends the generated data to latch circuit 255 through signal lines 261. An initialization clock signal is applied to latch circuit 255 through signal line 245. Latch circuit 255 latches the read address sent from adder 251 and the data sent from hardware set unit 253 in response to the initialization clock signal. The data latched to latch circuit 255 is provided as a read request data packet to signal lines 219.

Figure 16:
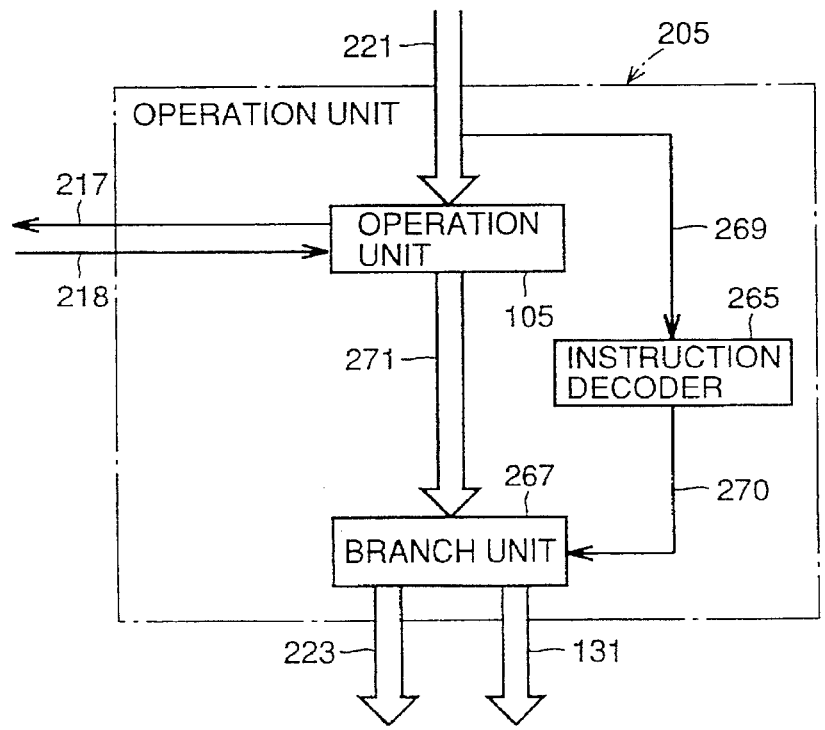
FIG. 16 is a block configuration diagram of an operation unit including a function of reading out initialization information.

Referring to FIG. 16, operation unit 205 includes operation unit 105 similar to the operation unit included in processor 11 of the first embodiment. In this embodiment, operation unit 205 carries out reading processing of initialization information as well as ordinary operation processing. Operation unit 205 includes an instruction decoder 265 and a branch unit 265 in addition to operation unit 105.

When a data packet is applied to operation unit 205 through signal lines 221, operation unit 105 performs processing according to instruction information included in the data packet. Operation unit 105 sends an access signal and a read address to memory 106 (cf. FIG. 13) through signal line 217 if necessary. Data read out from memory 106 is sent to operation unit 105 through signal line 218. If the data packet sent to operation unit 205 is a read request data packet, operation unit 105 reads out initialization information specified by a read address included in the read request data packet from memory 106.

On the other hand, instruction decoder 265 decodes instruction information of the data packet received through a signal line 269. Instruction decoder 265 sends the decoded result to branch unit 267 through a signal line 270. Operation unit 105 sends a data packet storing the ordinary operation result, or a read request data packet storing the read initialization information to branch unit 267 through signal lines 271.

Branch unit 267 determines the decoded result of the instruction sent from instruction decoder 265. If the instruction is to request to read out initialization information, branch unit 265 provides the data packets sent from operation unit 105 to signal lines 223 connected to initialization data packet generation unit 213. If the instruction does not request to read out initialization information, branch unit 267 provides the data packets sent from operation unit 105 to signal lines 131 connected to program storage unit 107.

Figure 17:
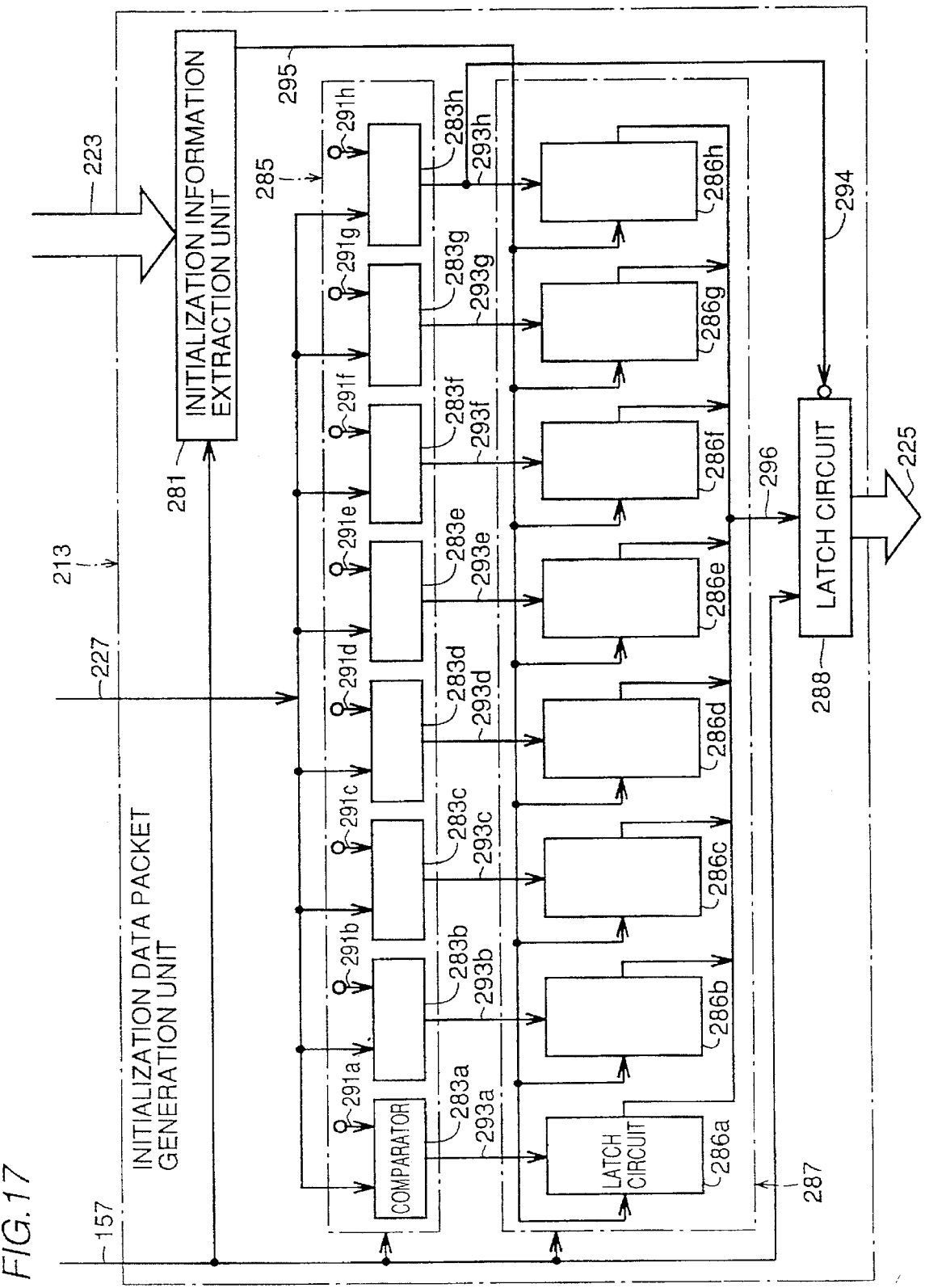
FIG. 17 is a diagram showing a circuit configuration of an initialization data packet generation unit.

FIG. 17 is a circuit diagram of initialization data packet generation unit 213. Initialization data packet generation unit 213 includes an initialization information extraction unit 281, a comparator group 285 including eight comparators 283a–283h, a latch circuit group 287 including eight latch circuits 286a–286h, and a latch circuit 288. Each of initialization information extraction unit 281, comparator group 285, latch circuit group 287, and latch circuit 288 resets itself in response to a reset signal sent through signal line 157.

The lowermost three bits among the bits of the count value sent from initialization information read request generation unit 211 through signal line 227 are applied to one input terminal of each of comparators 283a–283h. Fixed signals representing values of "1"–"7", "0" are sent to the other input terminals of comparators 283a, 283b, and 283h through signal lines 291a–291h, respectively. Therefore, when signals of "1""7", "0" are sequentially sent through signal line 227 according to the count value provided from initialization information read request generation unit 211, one of comparators 283a–283h which receives the same signal through corresponding one of signal lines 291a–291h sends a signal to corresponding one of latch circuits 283a–283h through corresponding one of signal lines 283a–283h.

Read request data packet storing initialization information are sent from operation unit 205 (cf. FIG. 13) to initialization data packet generation unit 213 through signal lines 223. Initialization information extraction unit 281 receives the read request data packets, and reads out the stored initialization information. Initialization information extraction unit 281 sends the read initialization information to latch circuit group 287 through a signal line 295.

In latch circuit group 287, one of latch circuits 286a–286h which receives a latch signal from a corresponding comparator latches initialization information sent from initialization information extraction unit 281 at the time. As a result, in response to the count value sent through signal line 227, initialization information included in the read request data packets sent through signal lines 223 is sequentially latched by latch circuits 283a–283h.

When a pulse of a signal sent to the eighth latch circuit 286h through signal line 293h rises, and the eighth initialization information is latched to latch circuit 286h, the similar pulse signal is sent by latch circuit 288 through a signal line 294 branching from signal line 293h. In response to the falling edge of the pulse signal, latch circuit 288 latches eight pieces of initialization information sent from latch circuits 286a–286h through a signal line 296.

Latch circuit 288 combines the eight pieces of initialization information, and provides the combined information externally through signal lines 225 as an initialization data packet. As a result, the pieces of initialization information read out word by word from memory 106 (cf. FIG. 5) are combined by initialization data packet generation unit 213 with eight pieces as one set, and initialization data packets are generated.

Referring to FIG. 13, the initialization data packet provided from initialization data packet generation unit 213 is sent to branch unit 209 through signal lines 225. Branch unit 209 sends the initialization data packet to junction unit 201 through signal lines 123. The initialization data packet sent to junction unit 201 is sequentially transmitted to firing control unit 103, junction unit 203, operation unit 205, and program storage unit 107 until the data packet arrives at a functional unit to be initialized.

When the initialization data packet arrives at a functional unit to be initialized, the functional unit reads out instruction information and data necessary for initialization included in the initialization data packet, and initializes itself. Note that, in this embodiment, functional units to be initialized using the initialization data packet include firing control unit 103, operation unit 205, and program storage unit 107. The content of initialization of each of these units is similar to the case of the first embodiment.

According to the second embodiment of the present invention described above, a mechanism for generating an initialization data packet is incorporated in processor 21, and initialization information and operation information are pre-stored in one memory 106. Further, in the second embodiment, operation unit 205 carries out processing of reading initialization information from memory 106. Therefore, it is not necessary to provide means for reading out initialization information separately in processor 21, making it possible to simplify the configuration of processor 21, and to decrease the size of processor 21.

[Third Embodiment]

The third embodiment of the data driven type information processor of the present invention will now be described. In this embodiment, an external request for initialization to the data driven type information processor can also be made by application of a data packet. Note that components having the same functions as those of the first embodiment and the second embodiment are labeled with the same reference characters in the following description.

Figure 18:
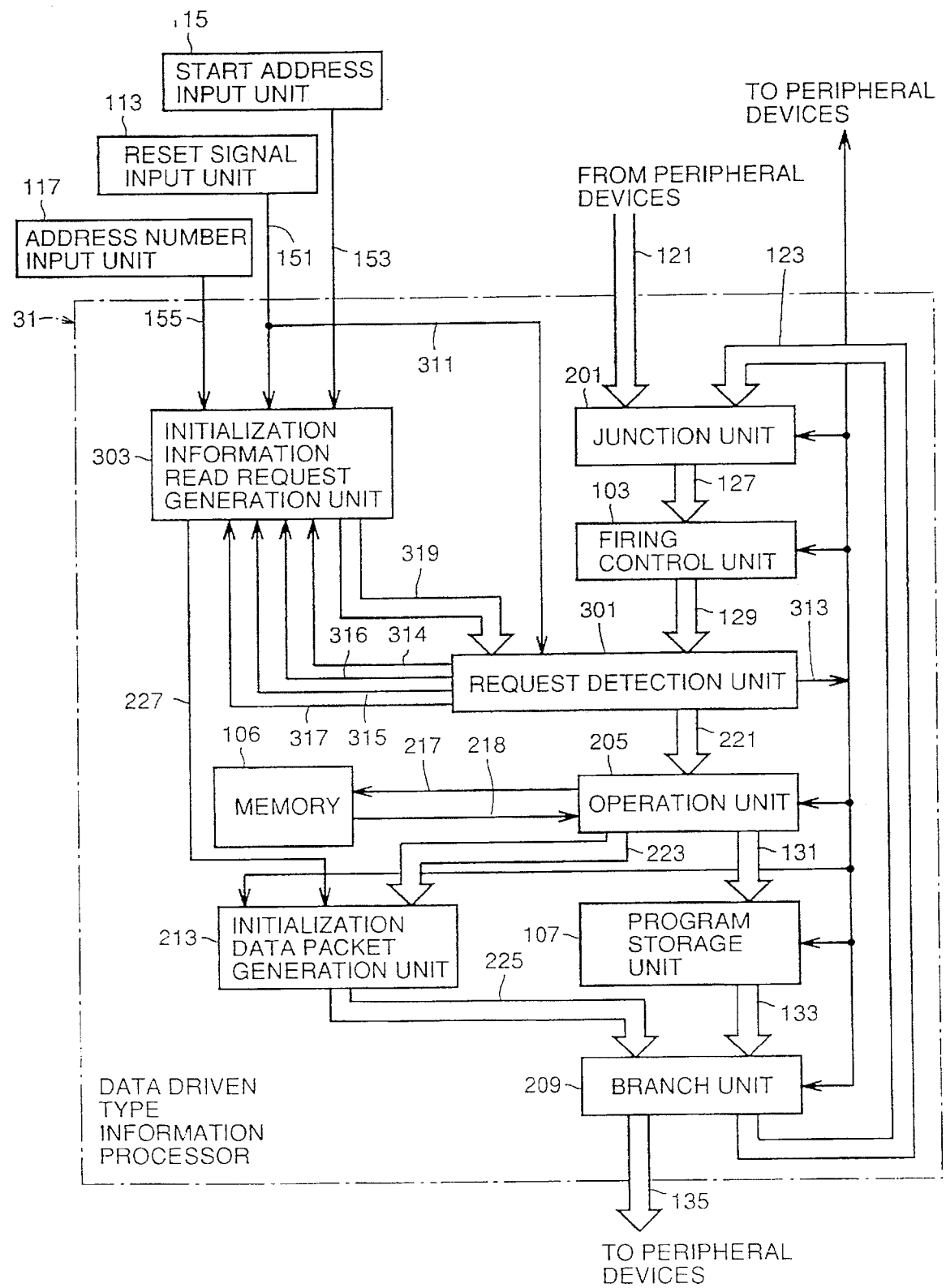
FIG. 18 is a block configuration diagram of a data driven type information processor according to a third embodiment of the present invention.

FIG. 18 is a block configuration diagram of a data driven type information processor 31 according to this embodiment. Referring to FIG. 18, processor 31 includes junction unit 201, firing control unit 103, operation unit 205, memory 106, program storage unit 107, branch unit 209, and initialization data packet generation unit 213 combining pieces of initialization information read out from memory 106 to generate an initialization data packet. The configurations of these units are similar to those of the second embodiment. Processor 31 further includes a request detection unit 301 carrying out predetermined processing in response to any of a reset signal, a reset initialization request data packet, or an initialization request data packet, and an initialization information read request generation unit 303 generating read request data packets each requesting to read out data for generating an initialization data packet from memory 106 to apply the same to request detection unit 301. External to processor 31 are provided reset signal input unit 113, start address input unit 115, and address number input unit 117, similar to the case of the first embodiment and the second embodiment.

Figure 19:
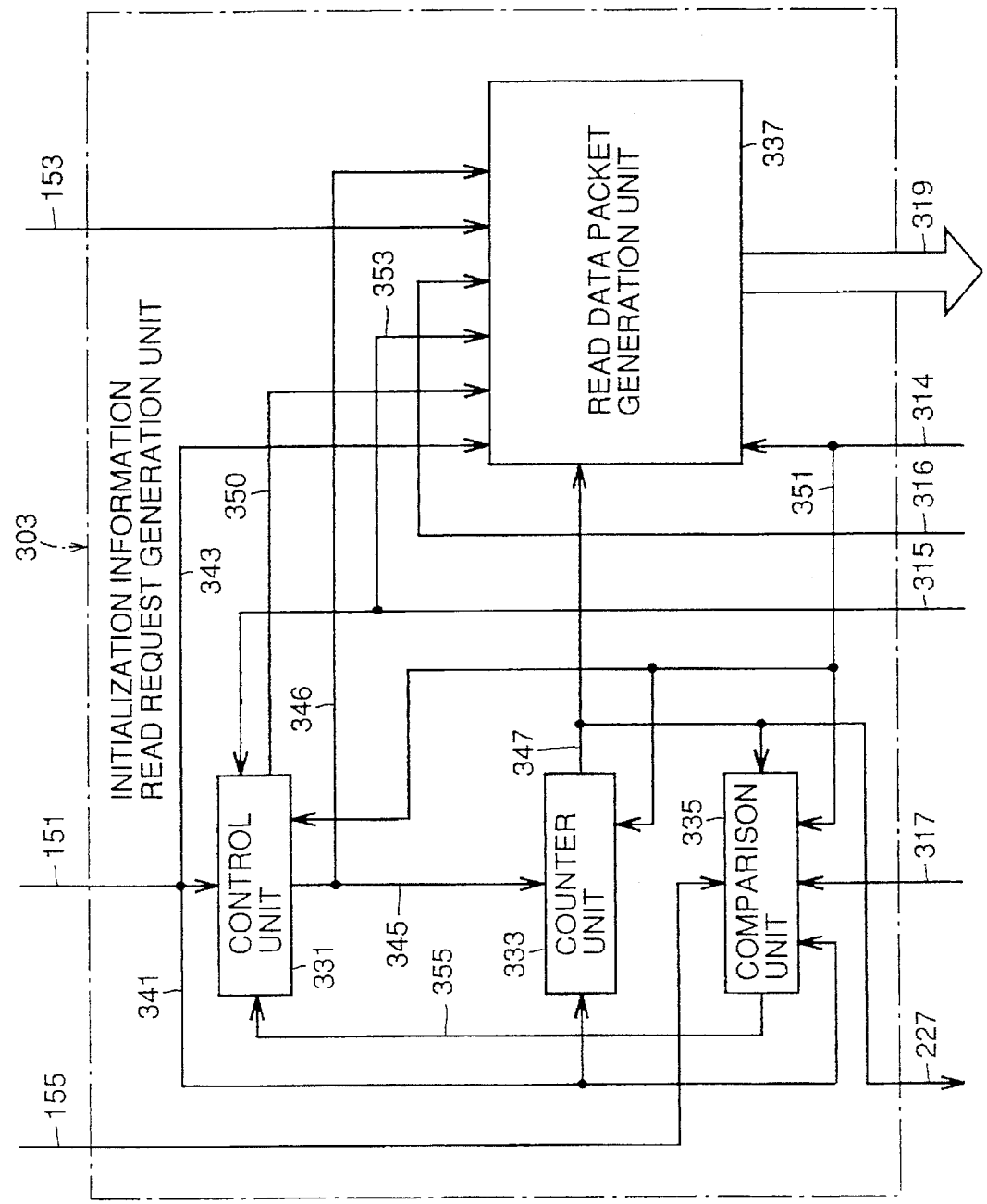
FIG. 19 is a block configuration diagram of an initialization information read request generation unit.

Referring to FIG. 19, initialization information read request generation unit 303 includes a control unit 331 for providing an initialization clock signal through a signal line 345 in response to the applied reset signal being switched from the ON state to the OFF state, a counter unit 333 for counting the initialization clock signal, a comparison unit 335 comparing an address number sent through signal line 155 and a count value sent through signal line 227, and applying a signal for stopping output of the initialization clock signal to control unit 331 when the address number is equal to the count value, and a read data packet generation unit 337 generating a read address of initialization information based on a start address sent through signal line 153 and a count value sent from counter unit 333 through signal line 347 in response to an initialization clock signal and a system clock signal for generating read request data packets each storing the read address. Each of these units starts generation of read request data packets in response to the reset signal sent through signal line 151 or a request detect signal sent through signal line 315.

Figure 20:
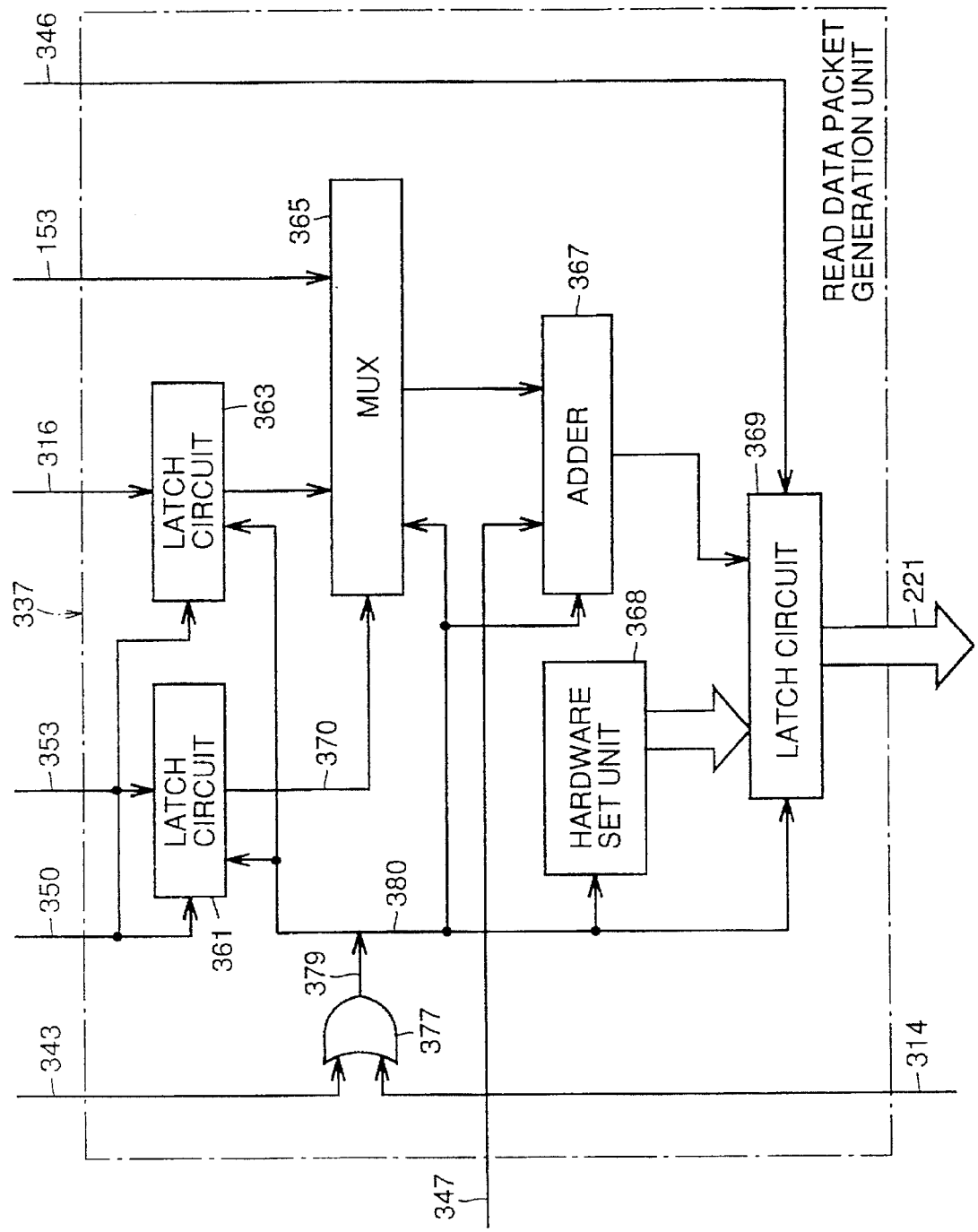
FIG. 20 is a diagram showing a circuit configuration of a read data packet generation unit.

Referring to FIG. 20, read data packet generation unit 337 includes a latch circuit 361 having its input connected to a signal line 353 for latching the request detect signal in response to the system clock signal, a latch circuit 363 having its input connected to signal line 316 for latching the start address in response to the system clock signal, a multiplexer (MUX) 365 having two inputs connected to the output of latch circuit 363 and signal line 153 transmitting the start address for selecting either of the inputs in response to the request detect signal sent from latch circuit 361, an adder 367 having an input connected to the output of counter unit 333 shown in FIG. 19 through signal line 347 and an input connected to the output of multiplexer 365, a hardware set unit 368 for providing fixed data of a read data packet by hard wiring, a latch circuit 369 having an input connected to the output of hardware set unit 368 and an input connected to the output of adder 367 for concatenating the output of hardware set unit 368 and the output of adder 367 to generate read data packets and to output the same to signal lines 221, and an OR circuit 377 having two inputs to which signal lines 343 and 314 both transmitting a reset signal are connected, respectively. Signal line 343 transmits a reset signal applied from the outside of processor 31. Signal line 314 transmits a reset signal provided from request detection unit 301.

Figure 21:
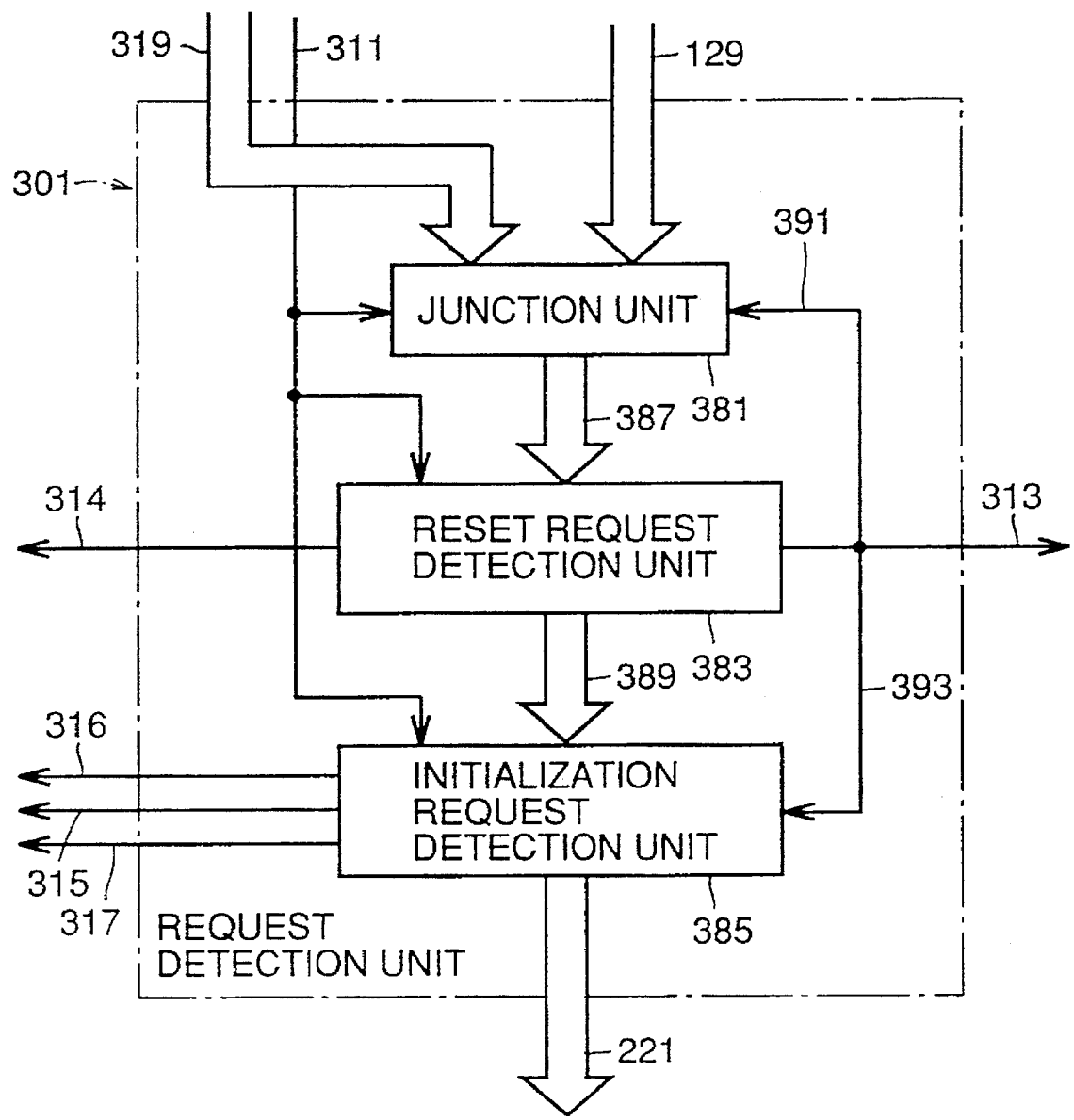
FIG. 21 is a block configuration diagram of a request detection unit.

Referring to FIG. 21, request detection unit 301 includes a junction unit 381 merging data packets from initialization information read request generation unit 303 and data packets from firing controlling unit 103 to provide the merged data packets onto signal lines 387, a reset request detection unit 383 for detecting a reset request data packet among data packets applied through signal lines 387, if existing, performing predetermined processing, generating an initialization request data packet, and providing the same onto signal lines 389, and for directly providing other data packets onto signal lines 389, and an initialization request detection unit 385 for detecting an initialization request data packet among data packets applied through signal lines 389, if existing, and performing predetermined processing, and for directly providing other data packets onto signal lines 221. Reset request detection unit 383 is also for providing a reset signal on signal line 313 when a reset signal is applied through signal line 311, and when detecting a reset request data packet. Reset request detection unit 383 further provides a reset signal onto signal line 314 when detecting a reset request data packet.

Figure 22:
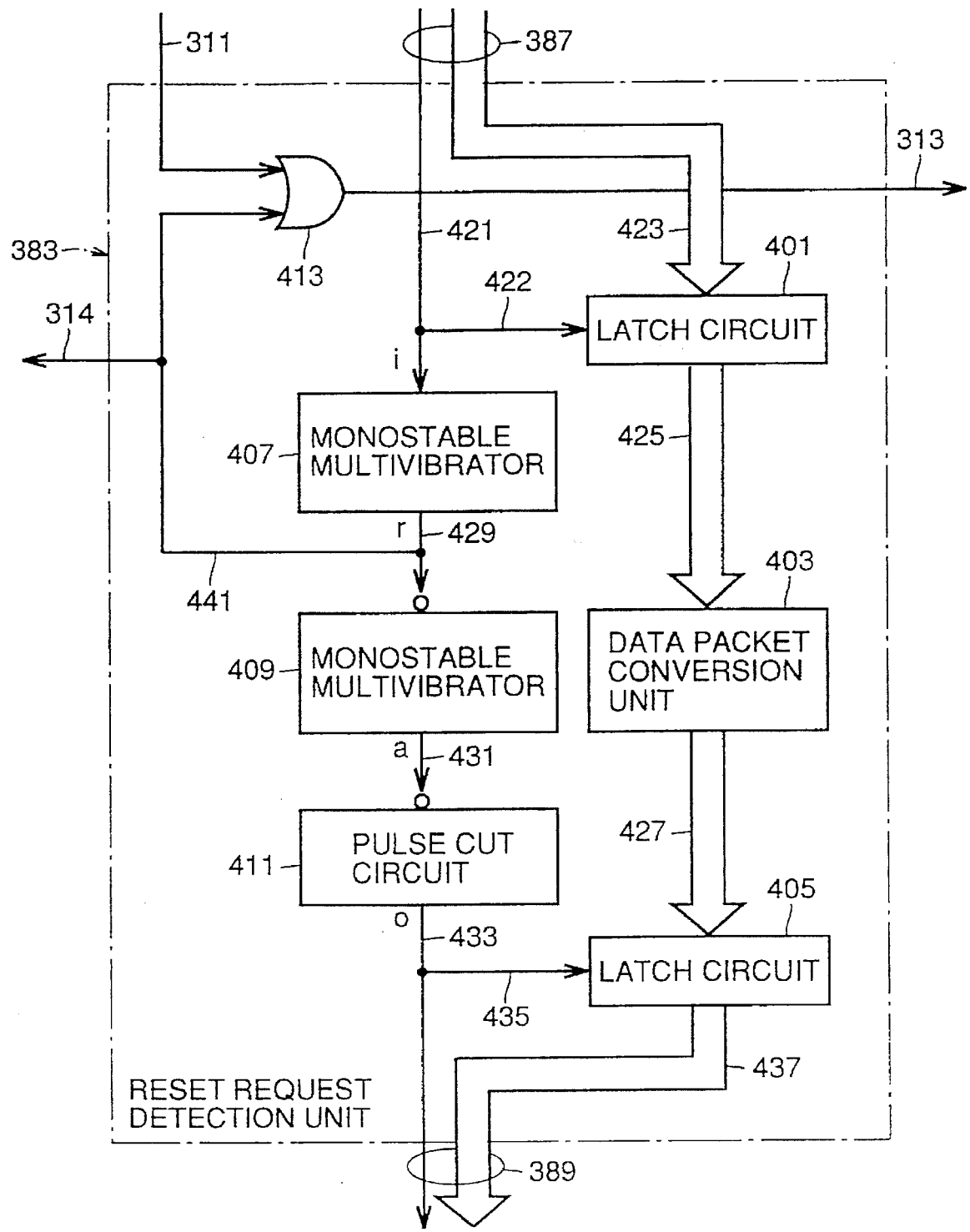
FIG. 22 is a diagram showing a circuit configuration of a reset request detection unit.

Referring to FIG. 22, reset request detection unit 383 includes a latch circuit 401 connected to signal lines 423 transmitting data packets among signal lines 387 for latching data in response to a transmission timing signal applied through signal lines 421 and 422, a data packet conversion unit 403 for converting a reset request data packet among data packets applied through signal lines 425 from latch circuit 401 into an initialization request data packet, a latch circuit 405 having its input connected to the output of data packet conversion unit 403 through signal lines 427 for latching data packets provided from data packet conversion unit 403 in response to a timing signal applied through a signal line 435, a monostable multivibrator 407 having its input connected to signal line 421, a monostable multivibrator 409 having its input connected to the output of monostable multivibrator 407, a pulse cut circuit 411 having its input connected to the output of monostable multivibrator 409, and an OR circuit 413.

A signal line 441 branching from signal line 429 from monostable multivibrator 407 is connected to one input terminal of OR circuit 413. Signal line 311 is connected to another input terminal of OR circuit 413. Output of OR circuit 413 is provided externally through signal line 313. Signal line 314 branching from signal line 441 is connected to initialization information read request generation unit 303 (cf. FIG. 18). A signal sent through signal line 429 is sent to signal line 441 when the data packet sent through signal lines 423 is a reset initialization request data packet. A mechanism is not shown for determining whether to output a signal to signal line 441 or not according to whether or not the data packet sent through signal lines 423 is a reset initialization request data packet.

In the figure, i, r, a, and o attached to signal lines 421, 429, 431 and 433 are signs indicating the kind of the signal line. Change of the i signal, r signal, a signal, and o signal will be described later with reference to FIG. 24.

Figure 23:
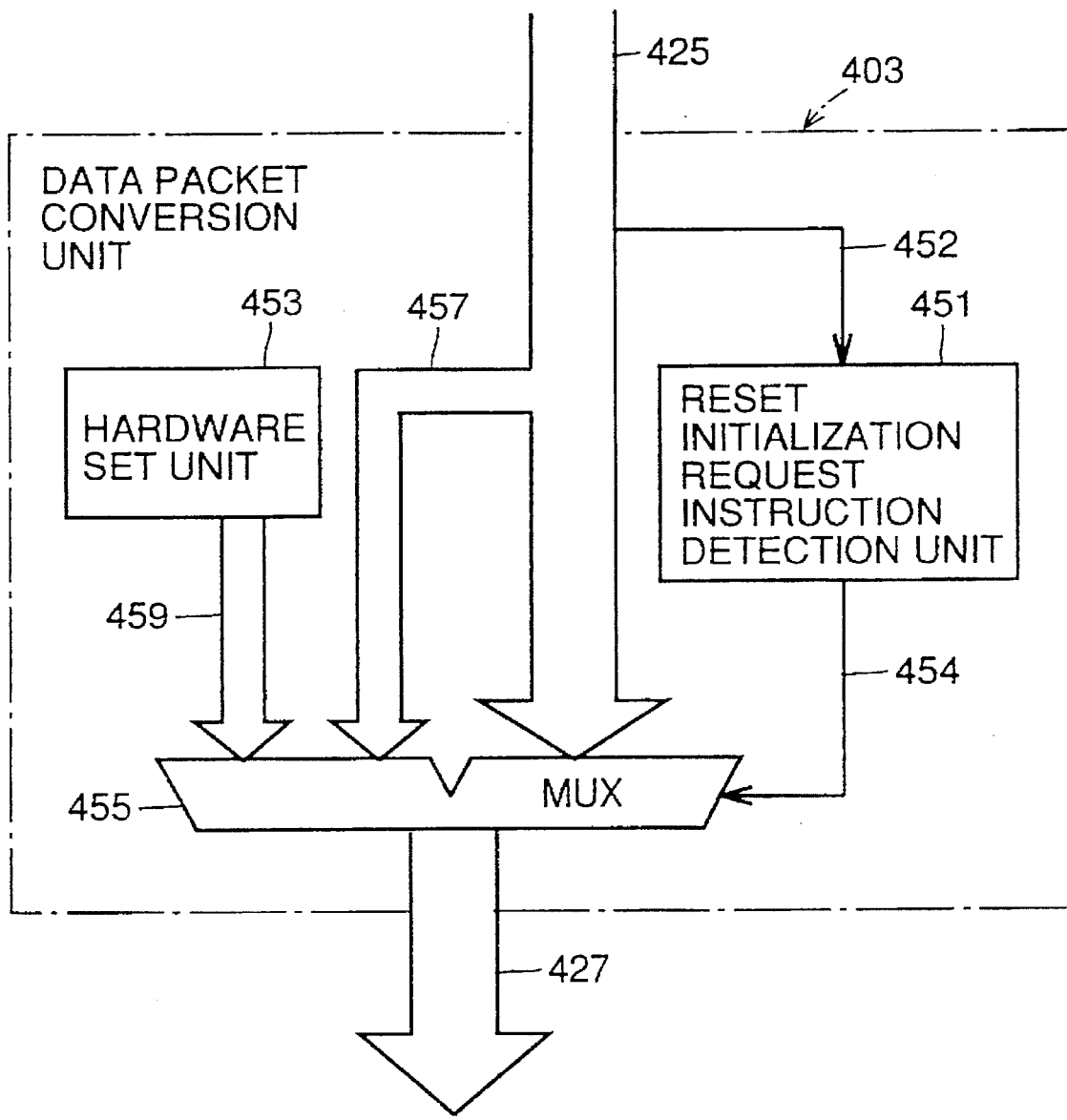
FIG. 23 is a diagram showing a circuit configuration of a data packet conversion unit.

Referring to FIG. 23, data packet conversion unit 403 includes a reset initialization request instruction detection unit 451, a hardware set unit 453, and a multiplexer (MUX) 455. Data packets sent through signal lines 425 are applied to one input of multiplexer 455. Signal lines 457 branch from signal lines 425. Signal lines 457 are for sending data other than instruction information of the data packets to another input of multiplexer 455. Hardware set unit 453 is provided for generating an initialization request instruction. The output of hardware set unit 453 is connected through signal lines 459 to one of the two input units of multiplexer 455 to which signal lines 457 are connected.

Figure 25:
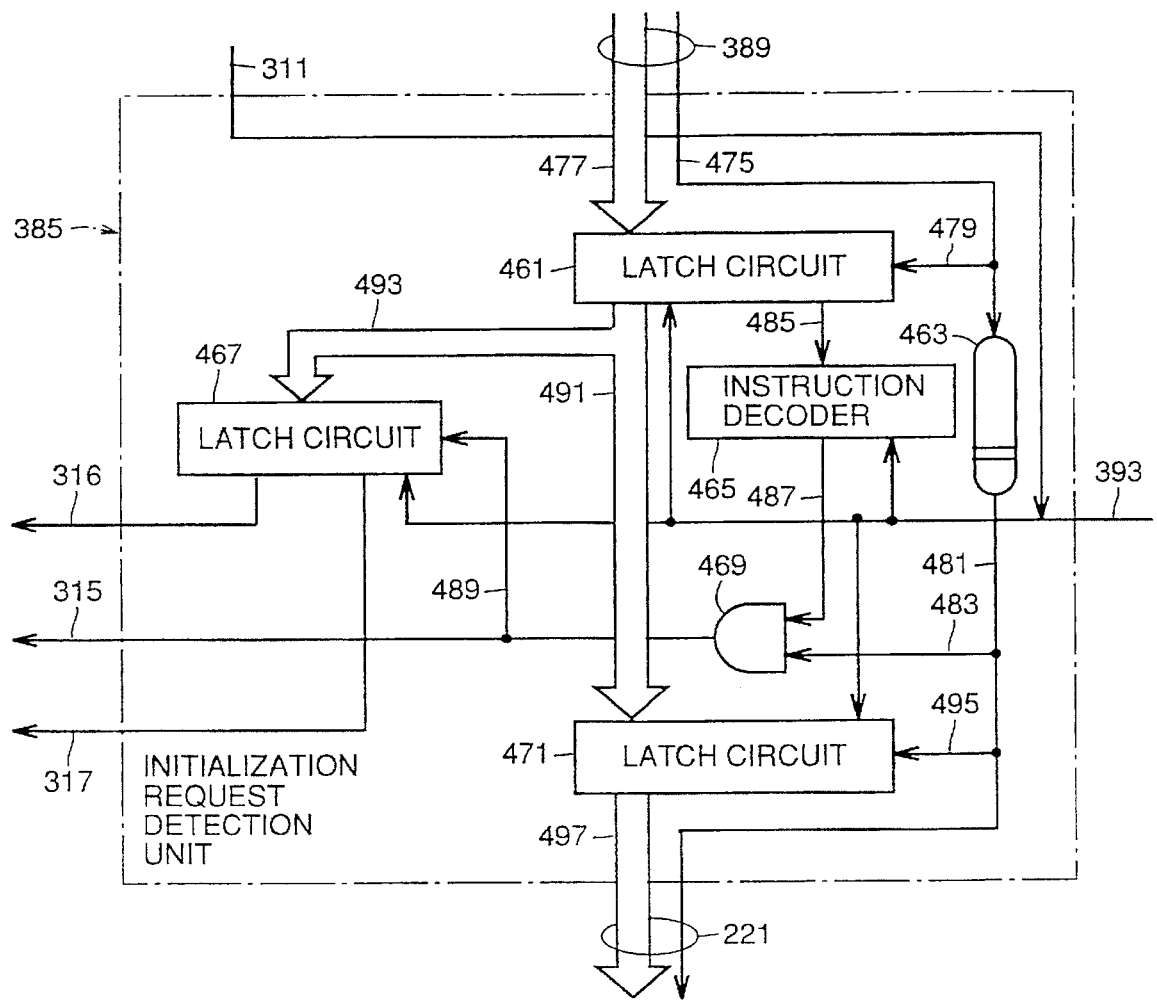
FIG. 25 is a diagram showing a circuit configuration of an initialization request detection unit.

Referring to FIG. 25, initialization request detection unit 385 includes a latch circuit 461 for latching data packets sent through signal lines 477, a delay element 463 for providing through a signal line 481 a signal sent through a signal line 475 after delay of a predetermined time, an instruction decoder 465 for providing a predetermined signal onto a signal line 487 when instruction information of the data packet latched by latch circuit 461 is an initialization request instruction, a latch circuit 467 for receiving a start address and an address number included in the data packet latched by latch circuit 461 through signal lines 493 to latch the same, and for providing the start address and the address number through signal lines 316 and 317, respectively, an AND circuit 469 having two inputs connected to the output of instruction decoder 465 through signal line 487 and the output of delay element 463 through signal lines 483 and 481, respectively, and a latch circuit 471 for latching the data packet sent through signal lines 491 in response to a signal sent through a signal line 495 branching from signal line 481. Each circuit has a function of resetting itself in response to a reset signal sent through signal line 311 and a reset signal sent through signal line 393. Signal lines 389 includes signal line 475 for sending a pulse signal for transmitting a data packet, and signal lines 477 for sending a data packet.

Similar to the case of the second embodiment, when the entire processor 31 is initialized, firing control unit 103, operation unit 205, and program storage unit 107 are all supplied with a corresponding initialization data packet, and initialized. When any one of the above three units is to be initialized, an initialization data packet corresponding to the unit is sent. The units other than the above three units enter the Cold/Warm state by resetting themselves in response to a reset signal. Therefore, the other units need not be initialized using an initialization data packet.

Data packets are applied to processor 31 through signal lines 121 from the external peripheral devices. The data packet to be applied includes, in addition to an operation data packet and an initialization data packet, an initialization request data packet and a reset initialization request data packet. The initialization request data packet stores an instruction for requesting initialization (hereinafter referred to as an "initialization request instruction") to processor 31. The reset initialization request data packet stores an instruction for requesting reset and initialization (hereinafter referred to as a "reset initialization request instruction") to processor 31.

When a reset signal provided by reset signal input unit 113 is sent to request detection unit 301 through a signal line 311 branching from signal line 151, request detection unit 301 sends the reset signal to junction unit 201, firing control unit 103, operation unit 205, program storage unit 107, initialization data packet generation unit 213, branch unit 209, and the external peripheral devices through a signal line 313. If the data packet sent through signal lines 129 is a reset initialization request data packet, request detection unit 301 sends a reset signal to each of the above described units in processor 31 and the peripheral devices through signal line 313, similarly to the case where a reset signal is sent to request detection unit 301. Further, request detection unit 301 sends a reset signal also to initialization information read request generation unit 303 through signal line 314.

Request detection unit 301 sends a signal to initialization information read request generation unit 303 through signal lines 315, 316 and 317 in response to an initialization request data packet or a reset initialization request data packet being sent. Signal line 315 sends a request detection signal indicating that an instruction requesting initialization was detected. Signal line 316 sends a start address for reading out initialization information. Signal line 317 sends an address number reading out initialization information. Read request data packets are sent to request detection unit 301 from initialization information read request generation unit 303 through signal lines 319. Request detection unit 301 sends the read request data packets to operation unit 205 through signal lines 221 similarly to the operation data packet sent through signal lines 129.

Initialization information read request generation unit 303 receives a reset signal from reset signal input unit 113 through signal line 151, and starts generation of read request data packets in response to termination of the reset signal. Initialization information read request generation unit 303 starts generation of read request data packets also when a request detect signal is sent from request detection unit 301 through signal line 315.

In generating read request data packets in response to termination of input of the reset signal, initialization information read request generation unit 303 determines a read address of initialization information to be stored in each of the read request data packets based on a start address sent from start address input unit 115 through signal line 153. In this case, initialization information read request generation unit 303 detects an end timing of generation of the read request data packets based on an address number sent from address number input unit 117 through signal line 155.

On the other hand, when generating read request data packets in response to the request detect signal sent through signal line 315, initialization information read request generation unit 303 determines a read address of initialization information to be stored in each of the read request data packets based on the start address sent through signal line 316. In this case, initialization information read request generation unit 303 detects an end timing of generation of the read request data packets based on the address number sent through signal line 317.

The configuration of initialization data packet generation unit 213 is similar to that of the second embodiment. Initialization data packet generation unit 213 generates an initialization data packet in response to a count value sent from initialization information read request generation unit 303 through signal line 227.

Referring to FIG. 19, when a reset signal is applied through signal line 151, the reset signal is sent to control unit 331. Further, the reset signal is sent to counter unit 333 and comparison unit 335 through a signal line 341 branching from signal line 151. The reset signal is further sent to read data packet generation unit 337 through a signal line 343 branching from signal line 151. Control unit 331 provides an initialization clock signal through signal line 345 in response to the sent reset signal being switched from the ON state to the OFF state.

Control unit 331 provides a system clock signal to read data packet generation unit 337 through a signal line 350. The system clock signal is a signal used for synchronizing the entire processor 31. Means for generating the system clock signal is provided internal or external to processor 31. The system clock signal sent to initialization information read request generation unit 303 from the means is applied to control unit 331, and sent to other units from control unit 331. Note that the means for generating the system clock signal and other signal lines for sending the signal are not shown.

Counter unit 333 clears the count value to "0" in response to the reset signal. Then, counter unit 333 counts up the count value one by one in response to the sent initialization clock signal. The count value is sent to read data packet generation unit 337 through signal line 347, and further sent to comparison unit 335 and the outside of initialization information read request generation unit 303 through signal line 227.

In response to the initialization clock signal and the system clock signal, read data packet generation unit 337 generates a read address of initialization information based on a start address sent through signal line 153 and a count value sent through signal line 347, and generates read request data packets each storing the read address. Read data packet generation unit 337 provides the generated read request data packets to the outside of initialization information read request generation unit 303 through signal lines 319.

Comparison unit 335 compares the address number sent through signal line 155 and the count value sent through signal line 227. Comparison unit 335 sends a signal for stopping output of the initialization clock signal to control unit 331 through a signal line 355 when the count value is equal to the address number. Control unit 331 stops output of the initialization clock signal in response to this signal. Accordingly, generation of the read request data packets is stopped.

The procedure for generating the read request data packets in response to a request detect signal sent through signal line 315 will now be described. The request detect signal is generated when an initialization request data packet or a reset initialization request data packet is applied to processor 31. When the reset initialization request data packet is applied to processor 31, a reset signal is sent from request detection unit 301 through signal line 314 before the request detect signal is sent to initialization information read request generation unit 303 through signal line 315. The reset signal is applied to read data packet generation unit 337, and further applied to control unit 331, counter unit 333, and comparison unit 335 through a signal line 351 branching from signal line 314.

Control unit 331 only resets itself in response to the reset signal sent through signal line 351. More specifically, control unit 331 does not start operation for generating the initialization clock signal even if the reset signal is released. Then, after a certain time, the request detect signal is sent to control unit 331 through signal line 315, and further sent to read data packet generation unit 337 through a signal line 353 branching from signal line 315. By the request detect signal being sent, generation of the read request data packets is started.

Operation of control unit 331 and counter unit 333 after generation of the read request data packets is started is similar to generation operation in response to termination of the reset signal applied through signal line 151. Read data packet generation unit 337 uses the start address sent from request detection unit 301 through signal line 316, instead of the start address sent through signal line 153. Further, comparison unit 335 uses the address number sent from request detection unit 301 through signal line 317, instead of the address number sent through signal line 155. As far as the initialization clock signal is provided from control unit 331, the read request data packets are sequentially generated and provided through signal lines 319. When a signal is sent from comparison unit 335 to control unit 331, generation of the read request data packets is stopped.

Referring to FIG. 20, if a reset signal is sent through either signal line 343 or signal line 314, the reset signal is provided from the output terminal of OR circuit 377. The reset signal is sent to each unit of read data packet generation unit 337 through a signal line 379 and a signal line 380. Each unit resets itself in response to the reset signal being sent.

Then, latch circuit 361 latches the request detect signal sent through signal line 353 in response to the system clock signal sent through signal line 350. Latch circuit 363 further latches the start address sent through signal line 316 in response to the system clock signal sent through signal line 350. Multiplexer 365 receives the start address sent from latch circuit 363 and the start address sent through signal line 153.

When the request detect signal sent from latch circuit 361 is in the ON state, multiplexer 365 sends the start address sent from latch circuit 363 to adder 367. When the request detect signal is in the OFF state, multiplexer 365 sends the start address sent through signal line 153 to adder 367. As a result, selection is made between the start address sent through signal line 153 and the start address sent through signal line 316 according to whether the request to initialize processor 31 is made by external application of a reset signal, or by application of an initialization request data packet or a reset initialization request data packet.

Adder 367 adds the start address from multiplexer 365 and the count value from counter unit 333, and sends the result value to latch circuit 369. The result value is a read address of initialization information. Hardware set unit 368 generates data required for generation of the read request data packets other than the read address, and sends the data to latch circuit 369.

In response to the initialization clock signal sent through a signal line 346, latch circuit 369 latches the read address sent from adder 367 and the data sent from hardware set unit 368, and combines them to provide the same as a read request data packet. The read request data packet is sent externally through signal lines 221.

Referring to FIG. 21, junction unit 381 sends data packets sent from firing control unit 103 (cf. FIG. 18) through signal lines 129, and read request data packets sent from initialization information read request generation unit 303 through signal lines 319 to reset request detection unit 383 through signal lines 387.

If the data packet sent through signal lines 387 is a reset initialization request data packet, or if a reset signal is sent through signal line 311, reset request detection unit 383 provides a reset signal in response to the reset initialization request data packet or the reset signal. The reset signal provided from reset request detection unit 383 is provided to the outside of request detection unit 301 through signal line 313 and signal line 314. The reset signal is further sent to junction unit 381 through a signal line 391 branching from signal line 313, and sent to initialization request detection unit 385 through a signal line 393.

Junction unit 381 and initialization request detection unit 385 reset themselves in response to the reset signal. The reset signal provided through signal line 314 is sent to initialization information read request generation unit 303. The reset signal provided through signal line 313 is sent to firing control unit 103, operation unit 205, program storage unit 107, and the like as described before.

If the sent data packet is a reset initialization request data packet, reset request detection unit 383 converts the reset initialization request data packet into an initialization request data packet to send the resultant data packet to initialization request detection unit 385 through signal lines 389. If the sent data packet is a data packet other than a reset initialization request data packet, reset request detection unit 383 directly sends the data packet to initialization request detection unit 385 through signal lines 389.

If the sent data packet is an initialization request data packet, initialization request detection unit 385 sends a request detect signal to initialization information read request generation unit 303 through signal line 315. Further, initialization request detection unit 385 sends a start address and an address number included in the initialization request data packet to initialization information read request generation unit 303 through signal lines 316 and 317, respectively. After the above processing is complete, initialization request detection unit 385 discards the initialization request data packet. If the sent data packet is a data packet other than an initialization request data packet, initialization request detection unit 385 directly sends the data packet to operation unit 205 (cf. FIG. 18) through signal lines 221.

Referring to FIG. 22, in reset request detection unit 383, an output from monostable multivibrator 407 is sent to monostable multivibrator 409 through signal line 429. An output from monostable multivibrator 409 is sent to pulse cut circuit 411 through a signal line 431.

An output from pulse cut circuit 411 is provided externally through a signal line 433. Data packets sent through signal lines 423 are applied to latch circuit 401. Latch circuit 401 latches the data packets in response to a signal sent through signal line 422 branching from signal line 421. Latch circuit 401 sends the latched data packets to data packet conversion unit 403 through signal lines 425.

If the sent data packet is a reset initialization request data packet, data packet conversion unit 403 converts the data packet into an initialization request data packet to send the resultant data packet to latch circuit 405 through signal lines 427. If the sent data packet is not a reset initialization request data packet, data packet conversion unit 403 directly sends the data packet to latch circuit 405. Latch circuit 405 latches the data packet sent from latch circuit 401 in response to a signal sent through signal line 435 branching from signal line 433. The data packet latched by latch circuit 405 is provided externally through signal lines 437. Signal lines 437 and signal line 433 form signal lines 389.

Referring to FIG. 23, the data packets sent through signal lines 425 are applied to one input of multiplexer 455. Signal lines 457 branch from signal lines 425. Signal lines 457 send data of the data packets other than instruction information to another input of multiplexer 455. Hardware set unit 453 generates an initialization request instruction. The initialization request instruction provided from hardware set unit 453 is sent through signal lines 459 to one of the two inputs of multiplexer 455, to which signal lines 457 are connected.

On the other hand, instruction information of the data packet sent through signal lines 425 is decoded by reset initialization request instruction detection unit 451 through a signal line 452. If the instruction information included in the data packet is a reset initialization request instruction, reset initialization request instruction detection unit 451 sends a signal indicating that the instruction information is a reset initialization request instruction to multiplexer 455 through a signal line 454.

If the signal sent through signal line 454 is in the ON state, multiplexer 455 combines data sent through signal lines 457 and data sent through signal lines 459 to generate an initialization request data packet, and provides the same externally through signal lines 427. If the signal sent through signal line 454 is in the OFF state, multiplexer 455 directly provides the data packets sent through signal lines 425 externally through signal lines 427. As a result, only reset initialization request data packets among the data packets sent to data packet conversion unit 403 are converted into initialization request data packets.

Figure 24:
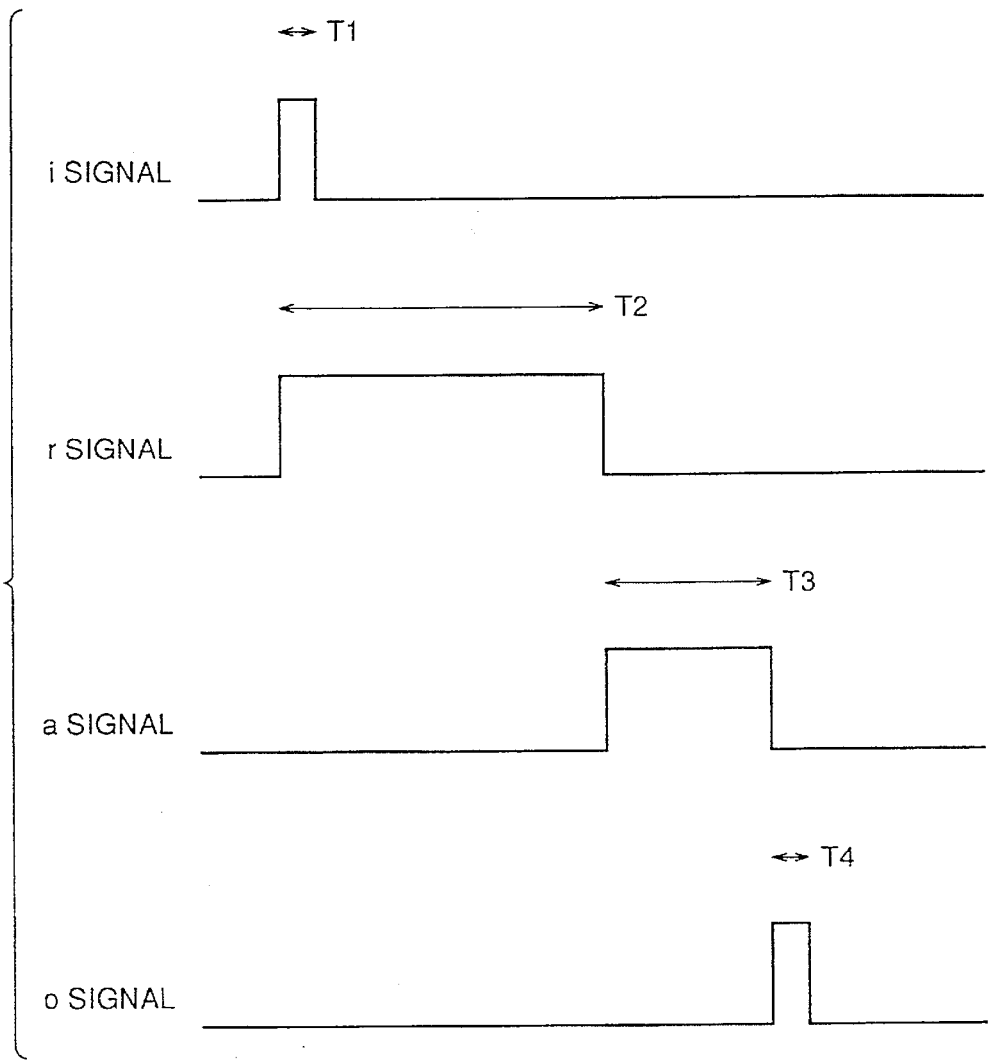
FIG. 24 is a timing chart showing change of signals in the reset request detection unit.

FIG. 24 is a timing chart showing change of signals in reset request detection unit 383. Referring to the figure, operation of reset request detection unit 383 will be described. Shown are the i signal which is a pulse signal used for transmission of a data packet, the r signal provided from monostable multivibrator 407, the a signal provided from monostable multivibrator 409, and the o signal provided from pulse cut circuit 411.

When the i signal which is a pulse signal for transmission of a data packet is input, the r signal having a period T2 is provided from monostable multivibrator 407 in response to the rising of the i signal. When the data packet sent through signal lines 423 is a reset initialization request data packet, the r signal is sent to OR circuit 413 through signal line 441, and further sent to initialization information read request generation unit 303 through signal line 314. The r signal forms a reset signal generated in response to the reset initialization data packet.

In response to the falling of the r signal, the a signal having a period T3 is provided from monostable multivibrator 409. In response to the falling of the a signal, the o signal having a period T4 is provided from pulse cut circuit 411. The o signal triggers latch circuit 405 to latch a data packet.

When the reset initialization request data packet is sent to reset request detection unit 383, the output period t2 of the r signal is a reset period during which a reset signal is provided from reset request detection unit 383. A period T3 from the rising to the falling of the a signal is a stand-by period from end of the reset period to output of the initialization request data packet. The stand-by period may be set by adjusting monostable multivibrator 409 so that it will be long enough for reset processing to complete, depending on the configuration of processor 31 or the configuration of the system, the device, or the like incorporating processor 31.

When all the internal units and the external peripheral devices to be reset reset themselves in response to the rising of a pulse of a reset signal, the following modification can be made. For example, the r signal may be provided from monostable multivibrator 407 for a sufficiently long period, without using monostable multivibrator 409, and pulse cut circuit 515 may provide the o signal in response to the falling of the r signal.

Referring to FIG. 25, in initialization request detection unit 385, latch circuit 461 latches a data packet sent through signal lines 477 in response to a signal sent through a signal line 479 branching from signal line 475. The data packet latched by latch circuit 461 is sent to latch circuit 471 through signal lines 491. A signal sent through signal line 475 is provided through signal line 481 after being delayed by delay element 463 by a prescribed time.

Referring to FIG. 25, instruction information of the data packet latched by latch circuit 461 is sent to instruction decoder 465 through a signal line 485. When the instruction information is an initialization request instruction, instruction decoder 465 sends a prescribed signal to one input terminal of AND circuit 469 through signal line 487. A signal is applied to another input terminal of AND circuit 469 through signal line 483 branching from signal line 481. When an output signal from instruction decoder 465 is in the ON state, and a pulse signal delayed by a prescribed time is sent through signal line 483 from delay element 463, a signal is provided from AND circuit 469 through signal line 315. The signal is provided externally through signal line 315 as a request detect signal, and sent to latch circuit 467 through a signal line 489 branching from signal line 315.

Referring to FIG. 25, a start address and an address number included in the data packet latched by latch circuit 461 are sent to latch circuit 467 through signal lines 493. Latch circuit 467 latches the start address and the address number in response to a signal sent through a signal line 489. Latch circuit 467 provides the start address externally through signal line 316, and provides the address number externally through signal line 317. In response to a signal sent through signal line 495 branching from signal line 481, latch circuit 471 latches a data packet sent through signal lines 491, and provides the same externally through signal lines 497.

As a result, when an initialization request data packet is sent to initialization request detection unit 385, the request detect signal is provided through signal line 315, and the start address and the address number included in the initialization request data packet are provided externally through signal lines 316 and 317. Although the initialization request data packet is discarded after prescribed processing with respect to initialization request detection unit 385 is complete, a mechanism for discarding the data packet is not shown.

According to the third embodiment described above, request to initialize the data driven type information processor is made by applying a reset signal, and then terminating the application. In addition, the request is also made by application of a data packet including an initialization request instruction. Further, by applying a data packet including an instruction requesting reset and initialization to the data driven type information processor, the entire data driven type information processor can be reset prior to initialization.

In response to application of a reset signal or a reset initialization request data packet, request detection unit 301 provides a reset signal to the internal circuitry of processor 31 and the peripheral devices. If a request to reset is applied to processor 31, for example, the entire system, device, or the like incorporating processor 31 can be reset. Further, in this embodiment, when the reset initialization request data packet is applied, operation of generating read request data packets can be started after a sufficient stand-by time for processor 31 and the external peripheral devices all to be reset after termination of the reset period. Therefore, an initialization data packet will not be generated during reset processing, and initialization processing will not be hindered.

Note that request detection unit 301 includes reset request detection unit 383 and initialization request detection unit 385 in this embodiment. However, request detection unit 301 may include only initialization request detection unit 385. In this case, when the entire processor 31 is initialized, an initialization request data packet is applied to the data driven type information processor through signal lines 121 after a sufficient time for reset processing to be completed since application of a reset signal from reset signal input unit 113.

[Fourth Embodiment]

The fourth embodiment of the data driven type information processor according to the present invention will now be described. In the fourth embodiment, the data driven type information processor includes a mechanism for generating an initialization request data packet in the data driven type information processor in response to external application of a reset signal being terminated. In the following description and figures regarding the fourth embodiment, components having the same functions as those of the above described first to third embodiments are labeled with the same reference characters.

Figure 26:
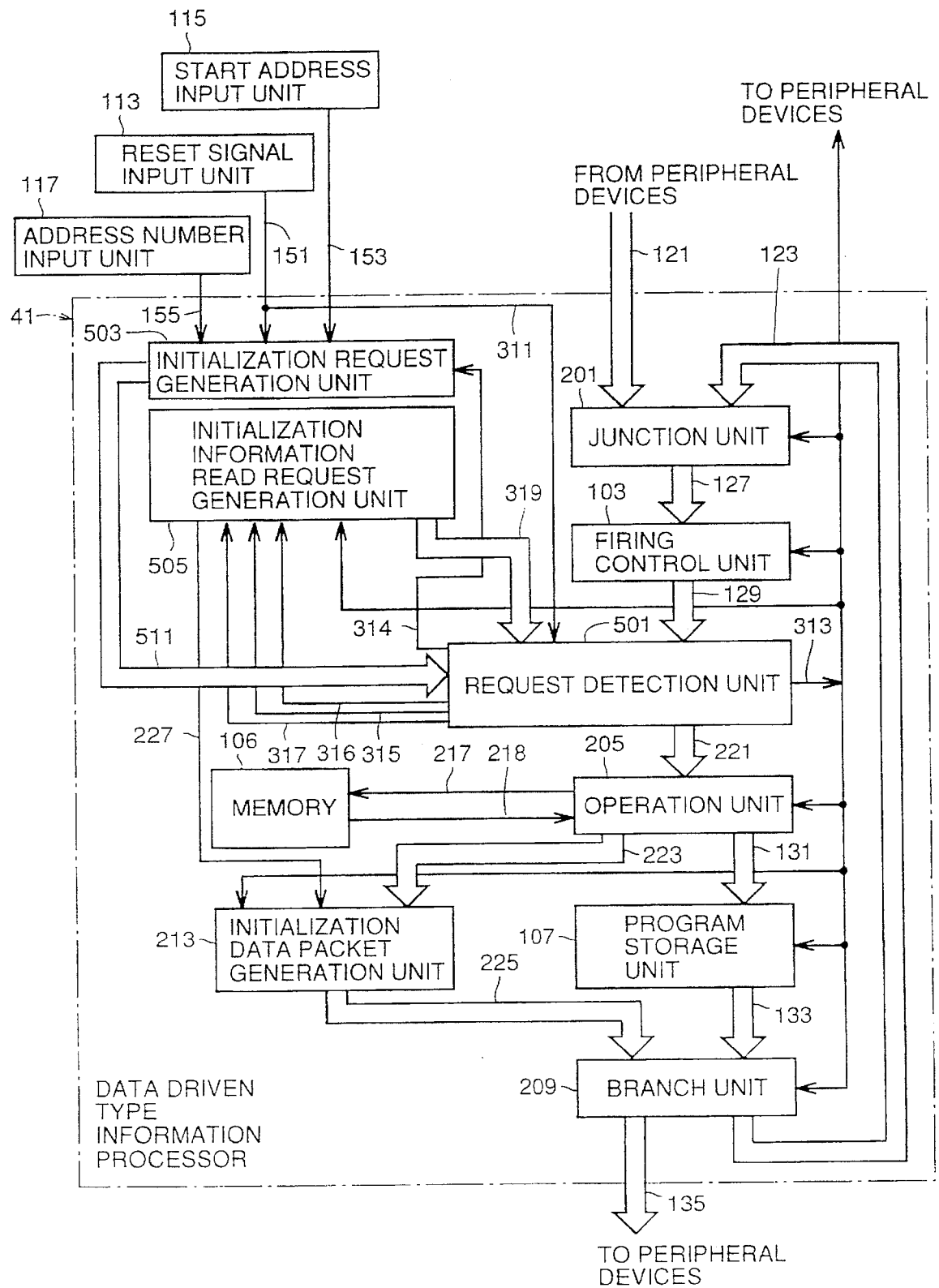
FIG. 26 is a block configuration diagram of a data driven type information processor according to a fourth embodiment of the present invention.

Referring to FIG. 26, a data driven type information processor 41 according to the fourth embodiment includes junction unit 201 for merging externally applied data packets and data packets generated in processor 41 and directed to processor 41 per se, firing control unit 103 for making firing control to the data packets from junction unit 201, operation unit 205 for carrying out processing to data in the applied data packets according to instruction information included in the data packets and providing the resultant data packets, static memory 106 storing in the same address space information required for operation and data for generating an initialization data packet, program storage unit 107 reading out internally stored data flow programs according to destination information of the applied data packets, and providing data packets each storing the next instruction information, the next data, and the next destination information, branch unit 209 branching the data packets provided from program storage unit 107 into the outside and the inside of processor 41 according to the destination information, and applying the data packets branched into the inside to junction unit 201, and initialization data packet generation unit 213 for receiving data packets which the operation unit 205 reads out from memory 106 and generates in response to read request data packets, and for generating an initialization data packet. The configuration of each of these units is similar to that included in processor 31 of the third embodiment.

Processor 41 further includes a request detection unit 501 carrying out prescribed processing in response to any one of a reset signal, a reset initialization request data packet, and an initialization request data packet, an initialization request generation unit 503 for generating an initialization request data packet storing prescribed data in response to a reset signal applied through signal line 151, and providing the generated data packet onto signal lines 511, and an initialization information read request generation unit 505 for generating read request data packets requesting to read out initialization data from memory 106 in response to an output from request detection unit 501. External to processor 41, provided are reset signal input unit 113, start address input unit 115, and address number input unit 117, which are similar to those of the above described embodiments.

Figure 27A:
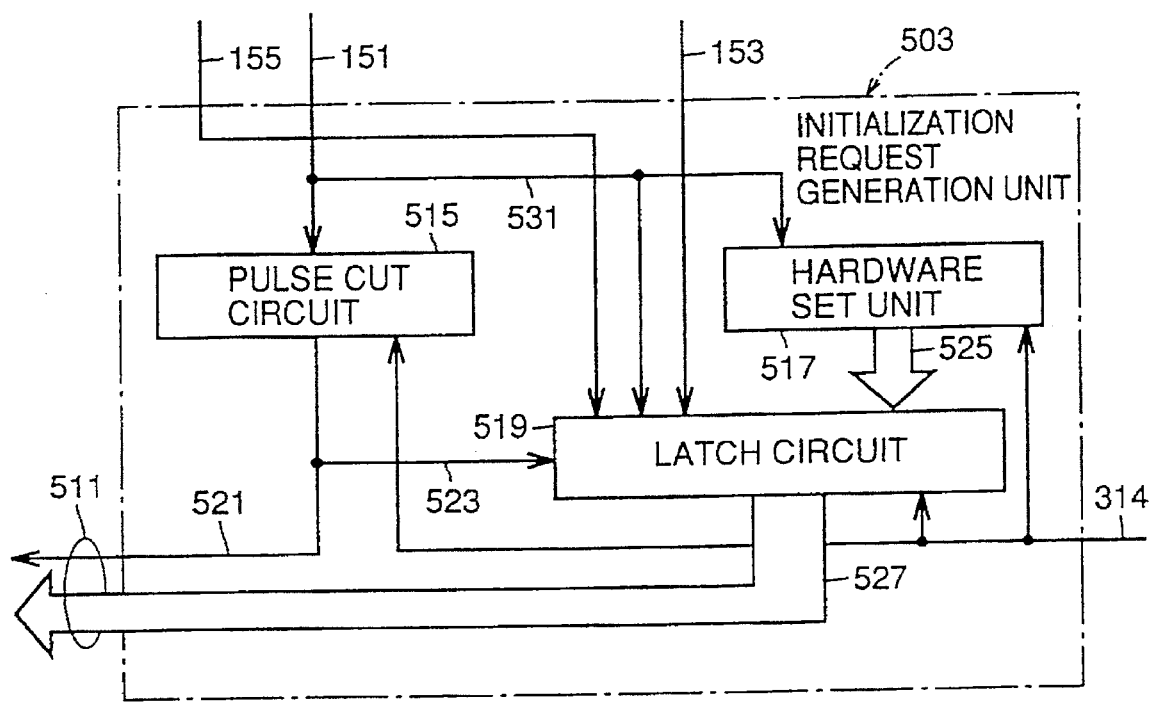
FIG. 27 (a) is a diagram showing a circuit configuration of an initialization request generation unit, and FIG. 27 (b) is a timing chart showing change of input and output signals of a pulse cut circuit.
Figure 27B:
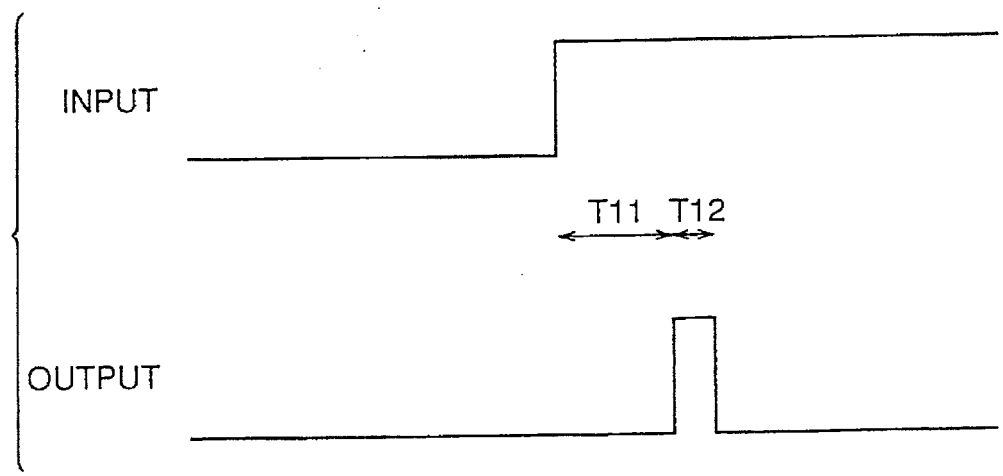

Referring to FIG. 27 (a), initialization request generation unit 503 includes a pulse cut circuit 515, a hardware set unit 517 for providing fixed data, and a latch circuit 519 combining an output from hardware set unit 512, a start address, and an address number to assemble an initialization request data packet. A reset signal is applied to pulse cut circuit 515 through signal line 151.

Figure 28:
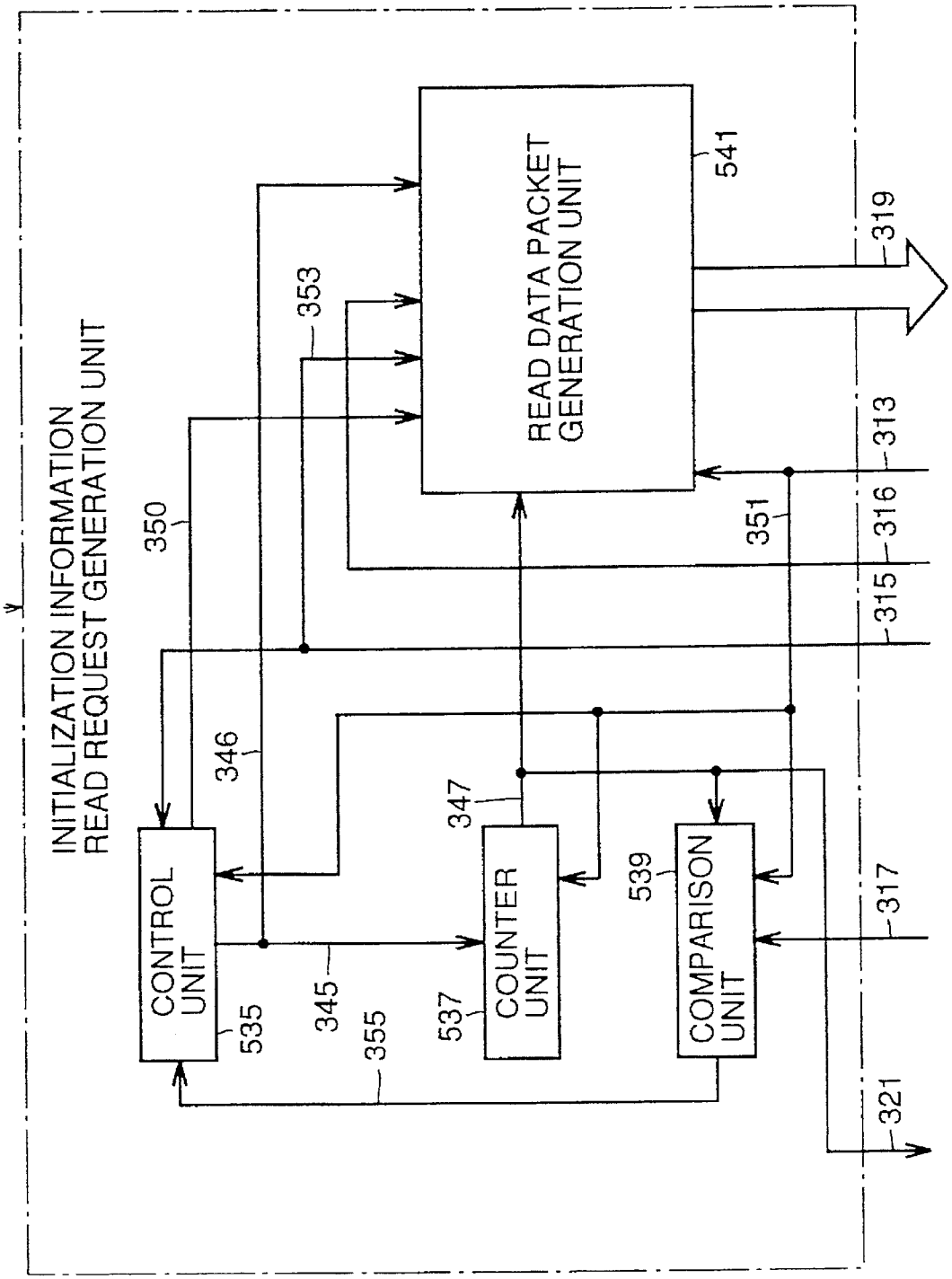
FIG. 28 is a block configuration diagram of an initialization information read request generation unit.

Referring to FIG. 28, initialization information read request generation unit 505 includes a control unit 535, a counter unit 537, a comparison unit 539, and a read data packet generation unit 541. These units correspond to control unit 331, counter unit 333, comparison unit 335, and read data packet generation unit 337 of the third embodiment shown in FIG. 19. The same signals or data packets as those of the third embodiment are sent to each unit or from each unit through signal lines 313, 315, 316, 317, 321, 345, 346, 350, 351, 353, 355, and 319 having the same reference characters as those of the third embodiment. Note that signal line 313 corresponds to signal line 314 of the third embodiment.

Initialization information read request generation unit 505 is different from initialization information read request generation unit 303 of the third embodiment in that a reset signal, a start address, and an address number are not applied to initialization information read request generation unit 505 from the outside of processor 41.

Figure 29:
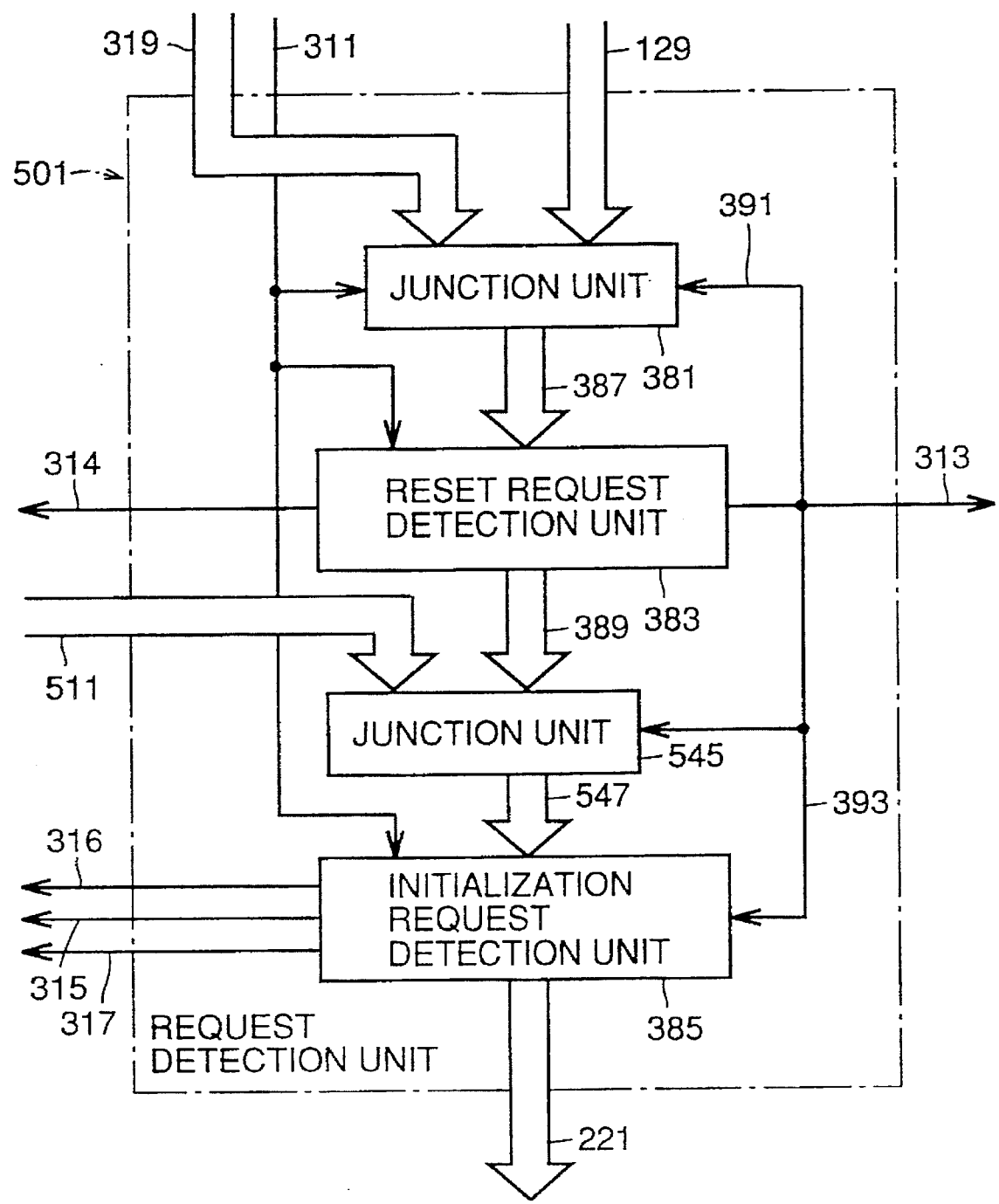
FIG. 29 is a block configuration diagram of a request detection unit.

Referring to FIG. 29, request detection unit 501 further includes, in addition to the units of request detection unit 301 of the third embodiment shown in FIG. 21, a junction unit 545 provided between the output of reset request detection unit 383 and the input of initialization request detection unit 385 for merging data packets applied through signal lines 511 from initialization request generation unit 503 and data packets provided from reset request detection unit 383 to apply the resultant data packets to initialization request detection unit 385. Junction unit 545 has a function of receiving a reset signal provided from reset request detection unit 383 through signal line 393, and resetting itself in response to the reset signal.

When the entire processor 41 or part of processor 41 is initialized, an initialization data packet must be sent to firing control unit 103, operation unit 205, and program storage unit 107, similar to the case of the third embodiment. Data packets sent to junction unit 201 through signal lines 121 from the external peripheral devices, or through signal lines 123 from branch unit 209 in processor 41 are processed according to the similar procedure as that of the third embodiment through firing control unit 103, request detection unit 501, operation unit 205, program storage unit 107 or initialization data packet generation unit 213, and branch unit 209. Request detection unit 501 and initialization information read request generation unit 505 of processor 41 correspond to request detection unit 301 and initialization information read request generation unit 303 of processor 31 of the third embodiment, respectively.

A reset signal provided from reset signal input unit 113 is applied to initialization request generation unit 503 through signal line 151. Further, a start address provided from start address input unit 115 and an address number provided from address number input unit 117 are applied to initialization request generation unit 503 through signal line 153 and signal line 155, respectively.

Initialization request generation unit 503 generates an initialization request data packet in response to the reset signal applied through signal line 151. Initialization request generation unit 503 stores an initialization request instruction, the start address, and the address number in the initialization request data packet, and sends the initialization request data packet to request detection unit 501 through signal lines 511.

In response to the initialization request data packet sent through signal lines 511, request detection unit 501 sends a request detect signal, the start address, and the address number to initialization information read request generation unit 505 through signal line 315, signal line 316, and signal line 317, respectively. A reset signal is applied to request detection unit 501 through signal line 311 branching from signal line 151. When a reset signal is applied, request detection unit 501 provides the reset signal to junction unit 201, firing control unit 103, operation unit 205, program storage unit 107, initialization data packet generation unit 213, branch unit 209, and the peripheral devices external to processor 41 through signal line 313. Further, request detection unit 501 sends the reset signal to initialization request generation unit 503 through signal line 314 only when it receives a reset initialization request data packet.

To request detection unit 501, operation data packets, initialization data packets, initialization request data packets, reset initialization request packets, and the like are sent from firing control unit 103 through signal lines 129. Further, read request data packets are sent to request detection unit 501 from initialization information read request generation unit 505 through signal lines 319. When data packets are sent through signal lines 129 and 319, request detection unit 501 carries out processing similar to that of request detection unit 301 (FIG. 18) of the third embodiment.

Request detection unit 501 is different from request detection unit 301 (FIG. 18) in that request detection unit 501 receives an initialization request data packet from initialization request generation unit 503, and, in response to this, sends the request detect signal, the start address, and the address number to initialization information read request generation unit 505.

The relationship between an input signal and an output signal of pulse cut circuit 515 is shown in a timing chart of FIG. 27 shown at (b). Pulse cut circuit 515 provides a pulse having a period T12 a period T11 after the rising of a pulse of a reset signal sent through signal line 151. The pulse signal is sent through a signal line 521.

In response to the pulse signal, an initialization request data packet is generated and provided according to the procedure to be described later. Period T11 is a stand-by time from the rising of a reset signal to output of a pulse signal. This stand-by time may be set by adjusting pulse cut circuit 515 so that it will be long enough for reset processing to be completed, according to the structure of a system, device, or the like incorporating processor 41. Note that, in this embodiment, each unit to be reset resets itself in response to the rising of the reset signal.

The pulse signal provided from pulse cut circuit 515 is sent to latch circuit 519 through a signal line 523 branching from signal line 521. In response to this pulse signal, latch circuit 519 latches a start address sent through signal line 153, an address number sent through signal line 155, and data sent through signal lines 525 from hardware set unit 517. Hardware set unit 517 provides necessary data for generating an initialization request data packet, other than the start address and the address number. Latch circuit 519 combines the latched data to generate an initialization request data packet, and provides the generated data packet externally through signal lines 527. Signal line 521 and signal lines 527 form signal lines 511 (cf. FIG. 26).

Each of pulse cut circuit 515, hardware set unit 517, and latch circuit 519 resets itself in response to a reset signal sent through signal line 151, or a reset signal sent through signal line 314. The reset signal sent through signal line 314 is one request detection unit 501 (cf. FIG. 26) provides in response to a reset initialization request data packet. Pulse cut circuit 515 only resets itself in response to the reset signal sent through signal line 314. Pulse cut circuit 515 does not carry out the above described output of a pulse signal in response to the reset signal sent through signal line 314.

Initialization information read request generation unit 505 starts generation of read request data packets only in response to a request detect signal sent through signal line 315. Control unit 535, counter unit 537 comparison unit 539, and read data packet generation unit 541 included in initialization information read request generation unit 505 reset itself in response to a reset signal sent from request detection unit 501 through signal line 313. The reset signal sent through signal line 313 is sent to control unit 535, counter unit 537, and comparison unit 539 through signal line 351 branching from signal line 313.

Operation of generating read request data packets by control unit 535, counter unit 537, comparison unit 539, and read data packet generation unit 541 after the request detect signal is sent through signal line 315 is similar to generation operation by control unit 331, counter unit 333, comparison unit 335, and read data packet generation unit 337 of the third embodiment. Therefore, the description thereof will not be repeated here.

Referring to FIG. 29, data packets are sent to junction unit 545 from reset request detection unit 383 and initialization request generation unit 503 (cf. FIG. 26) through signal lines 389 and signal lines 511, respectively. When there is no initialization request data packet sent from initialization request generation unit 503 through signal lines 511, junction unit 545 sends data packets sent from reset request detection unit 383 through signal lines 389 to initialization request detection unit 385 through signal lines 547. If an initialization request data packet is sent through signal lines 511, junction unit 545 sends the initialization request data packet to initialization request detection unit 385 through signal lines 547 with priority over the data packets sent through signal lines 389.

Since request detection unit 501 is the same as request detection unit 301 of the third embodiment in the other configuration, the description thereof will not be repeated here.

According to the above configuration, when a reset signal is applied to processor 41 from reset signal input unit 113, the reset signal is sent to initialization request generation unit 503 and request detection unit 501, referring to FIG. 26. Request detection unit 501 sends the sent reset signal to each unit excluding initialization request generation unit 503. Each unit resets itself. In response to the reset signal, initialization request generation unit 503 resets itself. Then, after a prescribed time, initialization request generation unit 503 generates an initialization request data packet. The initialization request data packet is sent to request detection unit 501.

In response to the sent initialization request data packet, request detection unit 501 sends a request detect signal, a start address, and an address number to initialization information read request generation unit 505. Initialization information read request generation unit 505 generates read request data packets based on the sent signals. The generated read request data packets are sent to request detection unit 501, and sent to operation unit 205 from request detection unit 501. The processing after the read request data packets are sent to operation unit 205 is the same as that in the second and third embodiments.

On the other hand, when a reset initialization request instruction is externally applied to processor 41 through signal lines 121, a reset signal sent from request detection unit 501 through signal line 314 is sent to initialization request generation unit 503. The other operation of processor 41 is the same as the case of the third embodiment. Operation of processor 41 when an initialization request is applied through signal lines 121 is the same as the case of the third embodiment.

As described above, in this embodiment, by externally applying a reset signal, the data driven type information processor can internally generate an initialization request data packet, and carry out initialization processing using the initialization request data packet.

[Fifth Embodiment]

The fifth embodiment of the data driven type information processor according to the present invention will now be described. In the fifth embodiment, by examining an end flag (cf. FIG. 11) included in initialization information read out from memory 106, an end timing of generation of initialization data packets is detected. In the following description and figures, components having the same functions as those of the above described fourth embodiment are labeled with the same reference characters.

Figure 30:
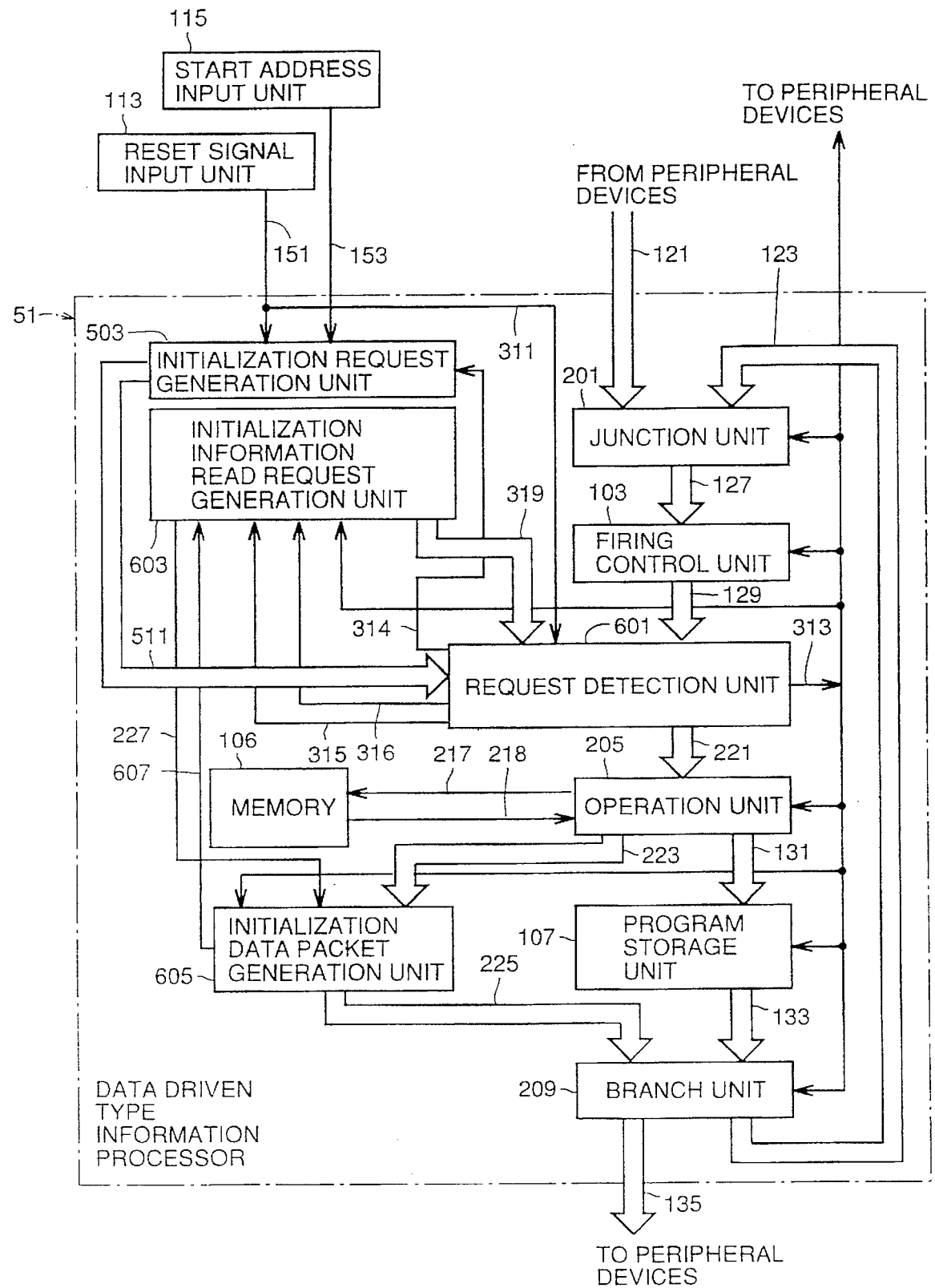
FIG. 30 is a block configuration diagram of a data driven type information processor according to a fifth embodiment of the present invention.

Referring to FIG. 30, a data driven type information processor 51 includes junction unit 201, firing control unit 103, operation unit 205, memory 106, program storage unit 107, branch unit 209, and initialization request generation unit 503. These units are the same as those included in processor 41 (cf. FIG. 26) of the fourth embodiment. Processor 51 further includes a request detection unit 601, an initialization information read request generation unit 603, and an initialization data packet generation unit 605. External to processor 51, reset signal input unit 113 and start address input unit 151 are provided. In this embodiment, address number input unit 117 of the fourth embodiment is not used.

Request detection unit 501 of the fourth embodiment sends an address number to initialization information read request generation unit 505 through signal line 317. However, request detection unit 601 of this embodiment does not have a function of providing an address number. Further, initialization data packet generation unit 605 of this embodiment sends the last word (cf. FIG. 11) of data, that is, data of the eighth word of initialization information to initialization information read request generation unit 603 through a signal line 607.

Initialization information read request generation unit 603 examines an end flag (cf. FIG. 11) of the most significant bit (the eighth bit) of data of the last word sent from initialization data packet generation unit 605. When the end flag is set to "0", initialization information read request generation unit 603 continues generation of read request data packets, and sequentially generates read request data packets for providing the same through signal lines 319. If the end flag is set to "1", initialization information read request generation unit 603 stops generation of read request data packets.

Figure 31:
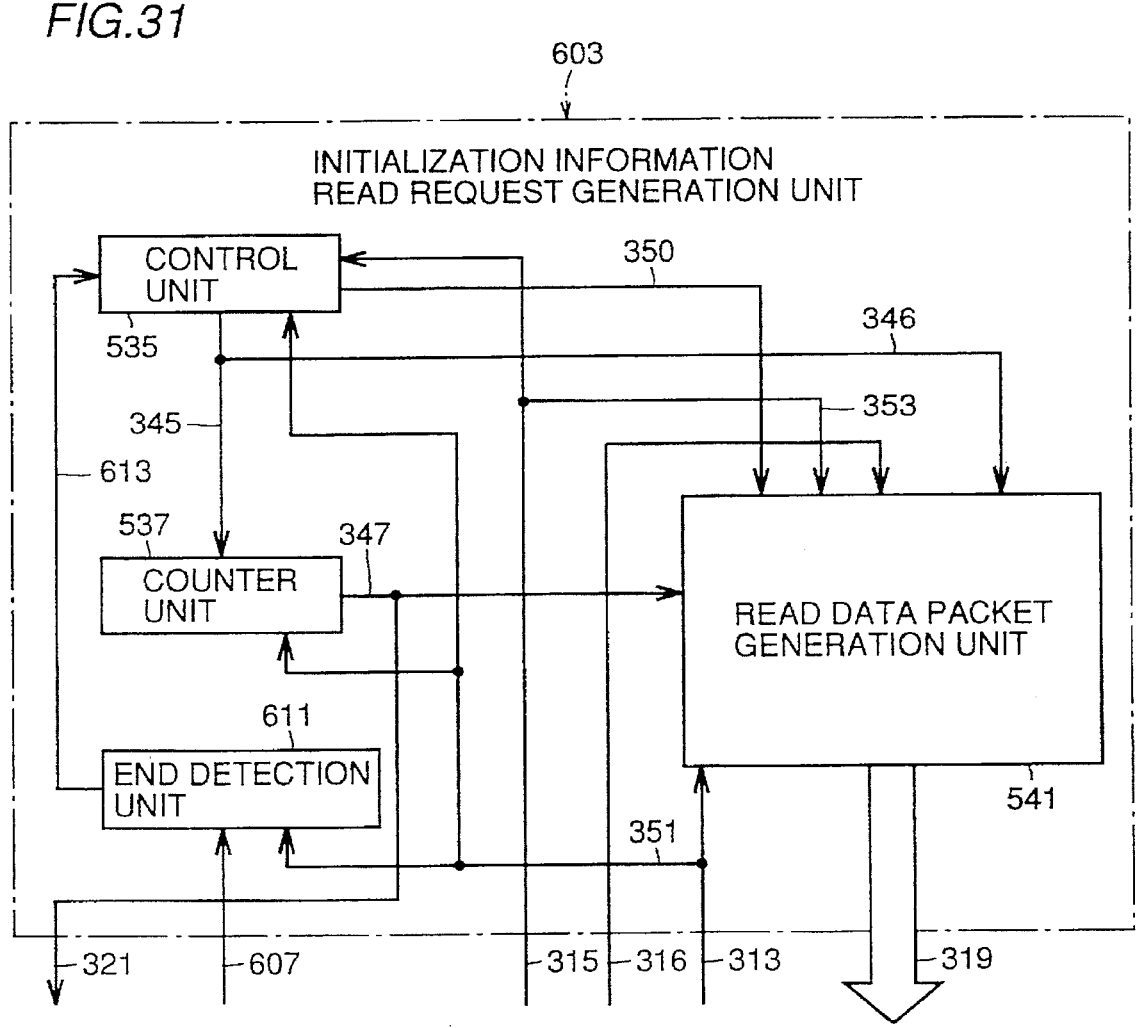
FIG. 31 is a block configuration diagram of an initialization information read request generation unit.

Referring to FIG. 31, initialization information read request generation unit 603 includes control unit 535, counter unit 537, and read data packet generation unit 541. These units are the same as those included in initialization information read request generation unit 505 (cf. FIG. 28) of the fourth embodiment.

Initialization information read request generation unit 603 further includes an end detection unit 611, instead of comparison unit 539 of the fourth embodiment. End detection unit 611 receives data of the last word of initialization information from initialization data packet generation unit 605 through signal line 607. End detection unit 611 examines the end flag of the most significant bit of the sent data. If the end flag is "1", end detection unit 611 sends a signal for stopping output of an initialization clock signal to control unit 535 through a signal line 613. In response to this signal, control unit 535 stops output of an initialization clock signal to counter unit 537 and read data packet generation unit 541. Accordingly, generation of read request data packets by initialization information read request generation unit 603 is stopped.

Request detection unit 601 is the same as request detection unit 501 (cf. FIG. 29) of the fourth embodiment except for the function of providing an address number through signal line 317. The detailed configuration of request detection unit 601 is not shown here.

Initialization data packet generation unit 605 is a modification of initialization data packet generation unit 213 (cf. FIG. 17) of the second to fourth embodiments. In initialization data packet generation unit 605, a signal line branching from the signal line transmitting an output from the eighth latch circuit 286h included in latch circuit group 287 of initialization data packet generation unit 213 is led out to the outside of initialization data packet generation unit 213 as signal line 607, and connected to initialization information read request generation unit 603.

According to the above fifth embodiment, by detecting the end flag included in initialization information to be stored in memory 106, a timing is detected at which generation of an initialization data packet is stopped. Therefore, it is not necessary to apply a signal indicating an address number from the outside of the data driven type information processor, or to store data indicating an address number in an initialization request data packet or a reset initialization request data packet.

As described above, according to one aspect of the present invention, data required for the operation of the operation unit and data for generating an initialization data packet for initializing the firing control unit, the operation unit, and the program storage unit are stored in the same memory space. Therefore, compared to the case where these two kinds of data are stored in separate memories, the data driven type information processor can be implemented in a simpler configuration and in a smaller size.

According to another aspect of the present invention, in response to an initialization request, read data packets are generated each of which stores information requesting to read out data for generating an initialization data packet from the memory, and in response to the generated read data packet, data for generating an initialization data packet is read out from the memory. Therefore, by applying an initialization request without externally applying the read data packet, data for generating an initialization data packet can be read out from the memory, and an initialization data packet can be generated.

According to a further aspect of the present invention, the operation unit reads out data for generating an initialization data packet from the memory in response to the read data packet. Therefore, compared to the case where a unit is separately provided for reading out data for generating an initialization data packet from the memory, the data driven type information processor can be implemented in a simpler configuration and in a smaller size.

According to a further aspect of the present invention, the read data packet includes information requesting to read out data for generating an initialization data packet on the basis of words, and data of a plurality of words read out according to the information are combined to generate an initialization data packet. Therefore, it is possible to store initialization information in the memory on the basis of words, and to use the information for generating an initialization data packet.

According to a further aspect of the present invention, end of generation of an initialization data packet is detected, and in response to the detection output, generation of read data packets is stopped. Therefore, after an initialization request is applied to start generation of an initialization data packet, generation of an initialization data packet can be stopped at an appropriate timing without application of a request to end the generation.

According to a further aspect of the present invention, initialization can be requested to the data driven type information processor by application of a predetermined signal.

According to a further aspect of the present invention, predetermined specific information included in a data packet is read out, and an initialization request is provided to the read data packet generation unit. Therefore, by applying a data packet including predetermined specific information to the data driven type information processor, initialization can be requested to the data driven type information processor.

According to a further aspect of the present invention, predetermined specific information included in a data packet is read out, and to the firing control unit, the program storage unit, the operation unit, and the peripheral devices provided external to the data driven type information processor, there is provided a signal for resetting each of them. After output of the signal is stopped, an initialization request is generated, and provided to the read data packet generation unit. Therefore, application of a data packet including predetermined specific information to the data driven type information processor causes the firing control unit, the program storage unit, the operation unit, and the peripheral devices to reset themselves. Then, the firing control unit, the program storage unit, and the operation unit can be initialized. In addition, a signal for resetting the peripheral devices is provided. Therefore, if a data packet including predetermined specific information is applied to the data driven type information processor in a system, device, or the like incorporating the data driven type information processor, the entire system or the entire device can be reset.

Further, an initialization request is generated a prescribed time after start of an output time of a signal for reset, and an initialization data packet is generated based on the request. Therefore, initialization processing by the initialization data packet can be carried out after a lapse of enough time for all or part of the firing control unit, the program storage unit, the operation unit, and the peripheral devices to be reset.

According to a further aspect of the present invention, the number of generated read data packets is counted and compared with a predetermined number, and end of generation of read data packets is detected when the number of generated read data packets reaches the predetermined number. Therefore, operation for terminating generation of read data packets is not required for the data driven type information processor.

According to a further aspect of the present invention, by including information indicating an end timing in predetermined specific data in initialization information, operation of generating an initialization data packet can be stopped at a desired timing.

As described above, a data driven type information processor can be provided which is implemented in a simple configuration and in a small size, and which can carry out initialization processing without unnecessarily stopping operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processor, comprising:
   a firing control unit connected to receive data packets for matching information included in the data packets required for operation, for detecting operation for which necessary information is available, and for providing a data packet including information required for execution of the operation;
   an operation unit connected to receive data packets from said firing control unit for performing operation according to information included in the data packets, and for storing the operation result in a data packet and outputting the same; and
   program storage means for storing a data flow program for applying to said firing control unit data packets each of which stores one piece of information required for operation according to said data flow program based on information included in the data packet provided from said operation unit,
   wherein each of said firing control unit, said operation unit, and said program storage means has a function of initializing itself in response to an initialization data packet in a specific form, said data driven type information processor further comprising:
- a static memory connected to said operation unit for storing in the same address space data required for said operation and data for generating an initialization data packet for initializing said firing control unit, said operation unit, and said program storage means;
- initialization information read means responsive to an initialization request for generating an initialization data packet based on data for generating an initialization data packet read out from said memory, and for applying the generated data packet to at least one of said firing control unit, said operation unit, and said program storage means;
- a first junction unit for merging externally applied data packets and data packets generated in said data driven type information processor and directed to said data driven type information processor per se for applying the data packets to said firing control unit; and
- a branch unit for providing to said first junction unit or to the outside of said data driven type information processor data packets provided from said program storage unit according to destination information included therein.

2. The data driven type information processor as recited in claim 1, wherein
said initialization information read means includes
- a control unit for generating an initialization clock signal and a control signal for memory access in response to an initialization request,
- a counter which resets itself in response to the initialization request and which counts said initialization clock signal applied from said control unit,
- means for adding an externally applied start address and an output of said counter to generate a read address,
- means responsive to said initialization clock signal for generating an access signal for accessing said memory and outputting the same,
- means for generating an initialization data packet based on read initialization data to apply the same to said first junction unit, and
- means for detecting, according to externally applied information indicating an end condition, whether the output of said counter satisfying said end condition, and stopping, when said end condition is satisfied, generation of said initialization clock signal and said control signal for memory access by said control unit, and said data driven type information processor further includes select means having one input receiving said read address and said access signal and the other input receiving address and access signals provided from said operation unit for selecting signals of said one input when said control signal for memory access assumes a value indicating that an initialization request was made, and otherwise for selecting signals of said other input, to apply the same to said memory.

3. The data driven type information processor as recited in claim 1, wherein
said initialization information read means includes
- an initialization information read request generation unit responsive to an initialization request for generating read data packets each of which contains information requesting to read out data for generating an initialization data packet from said memory,
- a second junction unit provided between an output of said firing control unit and an input of said operation unit for merging data packets from said firing control unit and read data packets from said initialization information read request generation unit to apply the merged packets to said operation unit, said operation unit reading out initialization data from said memory, when a read data packet is applied, according to information stored in the read data packet, and otherwise, carrying out processing designated by the data packet, to provide respective results in a form of a data packet, said initialization information read means further includes a data packet generation unit connected to said operation unit so as to receive data packets generated based on the read data packets provided from said operation unit for generating an initialization data packet based on read data, said branch unit operating to receive also data packets provided from said data packet generation unit to provide the received data packets to said first merge unit.

4. The data driven type information processor as recited in claim 3, wherein
said initialization information read request generation unit includes
- a control unit for generating an initialization clock signal in response to an initialization request,
- a counter resetting itself in response to the initialization request for counting said initialization clock signal applied from said control unit,
- a comparison unit for comparing an externally applied read address number and an output of said counter, for detecting whether the output of said counter being equal to said read address number, and for stopping, when the output of said counter is equal to said read address number, generation of said initialization clock signal by said control unit, and
- a read data packet generation unit for generating read data packets based on an externally applied address signal, the output of said counter, and predetermined fixed information required for reading.

5. The data driven type information processor as recited in claim 4, wherein
said data packet generation unit includes an initialization data packet generation unit for generating an initialization data packet based on initialization data included in data packets said operation unit has generate based on read data packets to apply the same to said branch unit.

6. The data driven type information processor as recited in claim 5, characterized in that
said read data packet stores information requesting to read out data for generating an initialization data packet on the basis of words, and that
said initialization data packet generation unit combines data of a plurality of words read out according to said information requesting to read out data on the basis of words based on the output of said counter to generate an initialization data packet.

7. The data driven type information processor as recited in claim 1, characterized in that said initialization request is represented by termination of a reset signal.

8. The data driven type information processor as recited in claim 2, characterized in that said initialization request is represented by termination of a reset signal.

9. The data driven type information processor as recited in claim 3, characterized in that said initialization request is represented by termination of a reset signal.

10. The data driven type information processor as recited in claim 4, characterized in that said initialization request is represented by termination of a reset signal.

11. The data driven type information processor as recited in claim 5, characterized in that said initialization request is represented by termination of a reset signal.

12. The data driven type information processor as recited in claim 6, characterized in that said initialization request is represented by termination of a reset signal.

13. The data driven type information processor as recited in claim 1, characterized in that said initialization request is represented in a form of a prescribed initialization request data packet.

14. The data driven type information processor as recited in claim 2, characterized in that said initialization request is represented in a form of a prescribed initialization request data packet.

15. The data driven type information processor as recited in claim 3, characterized in that said initialization request is represented in a form of a prescribed initialization request data packet.

16. The data driven type information processor as recited in claim 4, characterized in that said initialization request is represented in a form of a prescribed initialization request data packet.

17. The data driven type information processor as recited in claim 5, characterized in that said initialization request is represented in a form of a prescribed initialization request data packet.

18. The data driven type information processor as recited in claim 6, characterized in that said initialization request is represented in a form of a prescribed initialization request data packet.

19. The data driven type information processor as recited in claim 3, wherein said initialization information read means includes
an initialization information read request generation unit for generating read data packets each of which contains information requesting to read out data for generating an initialization data packet from said memory in response to an initialization request, and
a request detection unit provided between an output of said firing control unit and an input of said operation for merging data packets from said firing control unit and read data packets from said initialization information read request generation unit to apply the merged data packets to said operation unit, and for making, when detecting prescribed specific initialization request information being included in an applied data packet, an initialization request to said initialization information read request generation unit, said operation unit reading out, when a read data packet is applied, initialization data from said memory according to information stored in the read data packet, and otherwise, carrying out processing designated by the data packet, to provide respective results in a form of a data packet, said initialization information read means further includes a data packet generation unit connected to said operation unit so as to receive data packets generated based on the read data packets provided from said operation unit for generating an initialization data packet based on the read data, said branch unit operating to receive also the data packets provided from said data packet generation unit to provide the received data packets to said first merge unit.

20. The data driven type information processor as recited in claim 19, wherein said request detection unit includes
a third merge unit merging data packets from said firing control unit and read data packets from said initialization information read request generation unit, and
an initialization request detection unit having its input connected to an output of said third merge unit and responsive to an initialization request data packet being applied from said third merge unit for making an initialization request to said initialization information read request generation unit, and for directly providing other data packets.

21. The data driven type information processor as recited in claim 20, wherein said request detection unit further includes
a reset request detection unit having its input connected to the output of said third merge unit and its output connected to an input of said initialization request detection unit and responsive to a reset initialization request data packet being applied from said third merge unit for generating an internal reset signal to each unit in said data driven type information processor and to peripheral devices, and then generating an initialization request data packet after a prescribed time for outputting the same, and for directly outputting other data packets.

22. The data driven type information processor as recited in claim 20, wherein said reset request detection unit is connected to receive a reset signal externally, and operates to generate said internal reset signal also when the reset signal is externally applied.

23. The data driven type information processor as recited in claim 22, wherein said reset request detection unit stops output of said internal reset signal a sufficient time for internal units of said data driven type information processor and peripheral devices to be reset after said reset request detection unit provides said internal reset signal, and provides a signal indicating that a prescribed time has passed since output of said internal reset signal was started to said initialization request generation unit, and said initialization request generation unit receives an initialization data packet from said reset request detection unit in response to said signal indicating that a prescribed time has passed, and generates an initialization request.

24. The data driven type information processor as recited in claim 22, wherein said initialization information read request generation unit is connected to receive a reset signal externally, and generates read data packets for outputting the same when said initialization information read request generation unit receives the reset signal externally.

25. The data driven type information processor as recited in claim 24, wherein said reset request detection unit stops output of said internal reset signal a sufficient time for internal units of said data driven type information processor and peripheral devices to be reset after said reset request detection unit provides said internal reset signal, and provides a signal indicating that a prescribed time has passed since output of said internal reset signal was started to said initialization request generation unit, and said initialization request generation unit receives an initialization request data packet from said reset request detection unit in response to said signal indicating that a prescribed time has passed, and generates an initialization request.

26. The data driven type information processor as recited in claim 19, further comprising an initialization request generation unit responsive to an externally applied reset signal for generating an initialization request data packet which contains a prescribed initialization request instruction, an externally applied start address of initialization data to be read out from said memory, and an externally applied number of data to be read out, and for applying the initialization request data packet to said request detection unit, said request detection unit providing, when detecting an applied data packet being an initialization request data packet, a signal indicating an initialization request, and the start address and the number of data stored therein to said initialization information read request generation unit, said initialization information read request generation unit including a control unit for generating an initialization clock signal in response to an initialization request, a counter resetting itself in response to the initialization request for counting said initialization clock signal applied from said control unit, means for adding the start address included in said initialization request data packet applied from said request detection unit and an output of said counter to generate a read address, means responsive to said initialization clock signal for generating an access signal for accessing said memory to output the same, and means for detecting whether the address number included in said initialization request data packet applied from said request detection unit being equal to the output of said counter, and for stopping, when the address number is equal to the output of said counter, generation of said initialization clock signal by said control unit.

27. The data driven type information processor as recited in claim 19, wherein initialization data stored in said memory is divided into a plurality of units each including a plurality of words, and stored in successive addresses, and initialization data of the last address of each of the plurality of units includes end information indicating whether the data is the last initialization data, the data driven type information processor further includes an initialization request generation unit responsive to an externally applied reset signal for generating an initialization request data packet storing a prescribed initialization request instruction and an externally applied start address of initialization data to be read out from said memory to apply the same to said request detection unit, said request detection unit provides, when detecting an applied data packet being an initialization request data packet, a signal indicating an initialization request and the start address stored therein to said initialization information read request generation unit, said initialization data packet generation unit provides end information of the last address of each unit of initialization data read out from said memory to said initialization information read request generation unit, said initialization information read request generation unit includes a control unit for generating an initialization clock signal in response to an initialization request, a counter resetting itself in response to the initialization request for counting said initialization clock signal applied from said control unit, means for adding the start address included in said initialization request data packet applied from said request detection unit and an output of said counter to generate a read address, means responsive to said initialization clock signal for generating an access signal for accessing said memory to output the same, and means for detecting an end flag applied from an initialization data packet generation unit being equal to a value indicating end of initialization data, and for stopping, when the end flag is equal to the value, generation of said initialization clock signal by said control unit.

* * * * *